US009848322B2

(12) United States Patent
Zhang et al.

(10) Patent No.: US 9,848,322 B2
(45) Date of Patent: Dec. 19, 2017

(54) METHOD, APPARATUS AND SYSTEM FOR MANAGING BEARERS IN A WIRELESS COMMUNICATION SYSTEM

(71) Applicant: Intel IP Corporation, Santa Clara, CA (US)

(72) Inventors: Yujian Zhang, Beijing (CN); Ana Lucia A. Pinheiro, Hillsboro, OR (US); Youn Hyoung Heo, Seoul (KR); Candy Yiu, Portland, OR (US); Mo-Han Fong, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 199 days.

(21) Appl. No.: 14/653,221

(22) PCT Filed: Dec. 20, 2013

(86) PCT No.: PCT/US2013/077294
§ 371 (c)(1),
(2) Date: Jun. 17, 2015

(87) PCT Pub. No.: WO2014/113190
PCT Pub. Date: Jul. 24, 2014

(65) Prior Publication Data
US 2015/0351139 A1 Dec. 3, 2015

Related U.S. Application Data

(60) Provisional application No. 61/753,914, filed on Jan. 17, 2013.

(51) Int. Cl.
*H04W 4/00* (2009.01)
*H04W 12/04* (2009.01)
(Continued)

(52) U.S. Cl.
CPC .......... *H04W 12/04* (2013.01); *H04B 7/0417* (2013.01); *H04B 7/0456* (2013.01);
(Continued)

(58) Field of Classification Search
CPC ..................................... H04W 12/04
(Continued)

(56) References Cited

U.S. PATENT DOCUMENTS

2010/0080116 A1 4/2010 Agashe et al.
2011/0310833 A1* 12/2011 Lee ...................... H04L 1/1829
370/329

(Continued)

FOREIGN PATENT DOCUMENTS

WO WO-2008008964 1/2008

OTHER PUBLICATIONS

International Search Report and Written Opinion for PCT Patent Application No. PCT/US2013/077294 dated Apr. 15, 2014, 19 Pages.

(Continued)

*Primary Examiner* — Christopher R Crompton
(74) *Attorney, Agent, or Firm* — Schwabe, Williamson & Wyatt, P.C.

(57) ABSTRACT

Embodiments of the present disclosure describe methods, apparatuses, and systems for managing bearers in a wireless communication system. In some embodiments, an apparatus, to be employed by a user equipment (UE), may comprise a communication module to: communicate with a core network on a first bearer through a master evolved Node B (MeNB); receive, from the MeNB, a first message of reconfiguring a radio resource control (RRC) connection to establish a second bearer between the UE and the core network and through a secondary eNB (SeNB); synchronize, in response to the message, with the SeNB in order to establish (Continued)

the second bearer; and communicate with the core network on the second bearer through the SeNB, and continue communicating with the core network on the first bearer through the MeNB.

14 Claims, 27 Drawing Sheets

(51) Int. Cl.

| | |
|---|---|
| H04L 5/00 | (2006.01) |
| H04B 7/0417 | (2017.01) |
| H04B 7/0456 | (2017.01) |
| H04W 72/02 | (2009.01) |
| H04L 29/06 | (2006.01) |
| H04L 29/08 | (2006.01) |
| H04W 36/22 | (2009.01) |
| H04W 76/04 | (2009.01) |
| H04W 16/32 | (2009.01) |
| H04W 48/16 | (2009.01) |
| H04W 72/04 | (2009.01) |
| H04W 56/00 | (2009.01) |
| H04L 5/22 | (2006.01) |
| H04J 3/00 | (2006.01) |
| H04W 74/00 | (2009.01) |
| H04W 72/12 | (2009.01) |
| H04W 72/00 | (2009.01) |
| H04W 28/02 | (2009.01) |
| H04W 52/02 | (2009.01) |
| H04W 76/02 | (2009.01) |
| H04W 48/20 | (2009.01) |
| H04W 24/02 | (2009.01) |
| H04W 24/10 | (2009.01) |
| H04L 1/18 | (2006.01) |
| H04L 5/14 | (2006.01) |
| H04L 9/14 | (2006.01) |
| H04W 8/00 | (2009.01) |
| H04W 68/02 | (2009.01) |
| H04W 4/06 | (2009.01) |
| H04W 48/08 | (2009.01) |
| H04W 88/06 | (2009.01) |
| H04W 36/00 | (2009.01) |
| H04L 12/26 | (2006.01) |
| H04W 48/10 | (2009.01) |
| H04W 84/12 | (2009.01) |

(52) U.S. Cl.
CPC .............. *H04J 3/00* (2013.01); *H04L 1/1812* (2013.01); *H04L 1/1887* (2013.01); *H04L 5/0051* (2013.01); *H04L 5/0055* (2013.01); *H04L 5/0057* (2013.01); *H04L 5/0062* (2013.01); *H04L 5/0096* (2013.01); *H04L 5/14* (2013.01); *H04L 5/1469* (2013.01); *H04L 5/22* (2013.01); *H04L 9/14* (2013.01); *H04L 43/08* (2013.01); *H04L 63/0428* (2013.01); *H04L 63/30* (2013.01); *H04L 65/1006* (2013.01); *H04L 65/4076* (2013.01); *H04L 65/602* (2013.01); *H04L 65/608* (2013.01); *H04L 65/80* (2013.01); *H04L 67/02* (2013.01); *H04W 4/06* (2013.01); *H04W 8/005* (2013.01); *H04W 16/32* (2013.01); *H04W 24/02* (2013.01); *H04W 24/10* (2013.01); *H04W 28/0231* (2013.01); *H04W 36/0066* (2013.01); *H04W 36/22* (2013.01); *H04W 48/08* (2013.01); *H04W 48/10* (2013.01); *H04W 48/16* (2013.01); *H04W 48/20* (2013.01); *H04W 52/0251* (2013.01); *H04W 56/001* (2013.01); *H04W 68/02* (2013.01); *H04W 72/00* (2013.01); *H04W 72/02* (2013.01); *H04W 72/042* (2013.01); *H04W 72/0406* (2013.01); *H04W 72/046* (2013.01); *H04W 72/0413* (2013.01); *H04W 72/12* (2013.01); *H04W 72/1205* (2013.01); *H04W 72/1263* (2013.01); *H04W 72/1278* (2013.01); *H04W 74/00* (2013.01); *H04W 76/021* (2013.01); *H04W 76/023* (2013.01); *H04W 76/046* (2013.01); *H04W 76/048* (2013.01); *H04W 88/06* (2013.01); *H04L 5/0092* (2013.01); *H04L 5/0094* (2013.01); *H04L 2209/24* (2013.01); *H04L 2209/80* (2013.01); *H04W 84/12* (2013.01); *Y02B 60/50* (2013.01)

(58) Field of Classification Search
USPC ........................................................ 370/329
See application file for complete search history.

(56) References Cited

U.S. PATENT DOCUMENTS

2012/0044836 A1   2/2012  Sivavakeesar et al.
2012/0289231 A1*  11/2012 Balachandran ..... H04W 76/025
                                                           455/436

OTHER PUBLICATIONS

"3GPP TR 36.932 V12.0.0", 3rd Generation Partnership Project; Technical Specification Group Radio Access Network; Scenarios and Requirements for Small Cell Enhancements for E-UTRA and E-UTRAN (Release 12); (http://www.3GPP.org/DynaReport/36932.htm), 14 pages.
Extended European Search Report dated Aug. 12, 2016 from European Patent Application No. 13871565.1, 12 pages.
3GPP, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.9.0 (Dec. 2012); LTE Advanced, 194 pages.
3GPP, "Technical Specification Group Radio Access Network; Evolved Universal Terrestrial Radio Access (E-UTRA); Radio Resource Control (RRC); Protocol specification (Release 10)," 3GPP TS 36.331 V10.8.0 (Dec. 2012); LTE Advanced, 305 pages.
International Preliminary Report on Patentability for PCT Patent Application No. PCT/US2013/077294 dated Jul. 30, 2015, 16 Pages.

* cited by examiner

METHOD, APPARATUS AND SYSTEM FOR MANAGING BEARERS IN A WIRELESS COMMUNICATION SYSTEM

CLAIM OF PRIORITY

This application is a U.S. National Phase application under 35 U.S.C. §371 of International Application No. PCT/US2013/077294, filed Dec. 20, 2013, entitled "METHOD, APPARATUS AND SYSTEM FOR MANAGING BEARERS IN A WIRELESS COMMUNICATION SYSTEM," which claims priority to U.S. Provisional Patent Application No. 61/753,914, filed Jan. 17, 2013, the entire disclosure of which is hereby incorporated by reference.

FIELD

Embodiments of the present disclosure generally relate to the field of wireless communication systems, and more particularly, to bearer management in the wireless communication systems.

BACKGROUND

With explosion of mobile broadband data, advent of a small cell, also known as a pico cell, may help to increase service coverage and/or mobile network capacities. The small cell may provide radio coverage from several meters to several kilometers. However, coexistence of macro cells and small cells in the network and frequent handovers between the macro cell and the small cell when a user equipment (UE) moves into or out of the small cell, may create a big challenge to current wireless standard technologies, such as 3rd Generation Partnership Project (3GPP) Long Term Evolution (LTE) project.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

Figure 1:
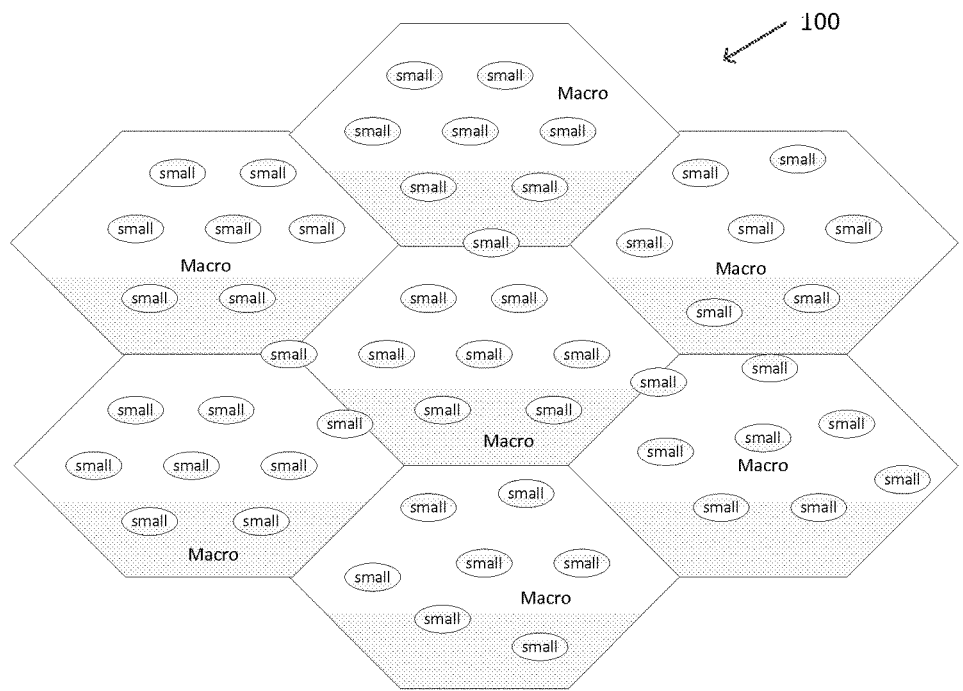
FIG. 1 illustrates an embodiment of a wireless communication network having coverage from a number of macro cells and small cells.

FIG. 1 illustrates an embodiment of a wireless communication network 100 that may operate in compliance with Long Term Evolution (LTE) standards of 3rd Generation Partnership Project (3GPP). The wireless communication network 100 may have coverage from a number of macro cells and small cells. As illustrated in the FIG. 1, a hexagon cell may represent a macro cell, and an elliptical cell may represent a small cell. In various embodiments, the small cell may be placed inside of the macro cells or on a border of the macro cell. The small cell, also known as the pico cell, may provide radio coverage from several meters to several kilometers. On the contrary, in some cases, the macro cell may have radio coverage of a few tens of kilometers.

Figure 2:
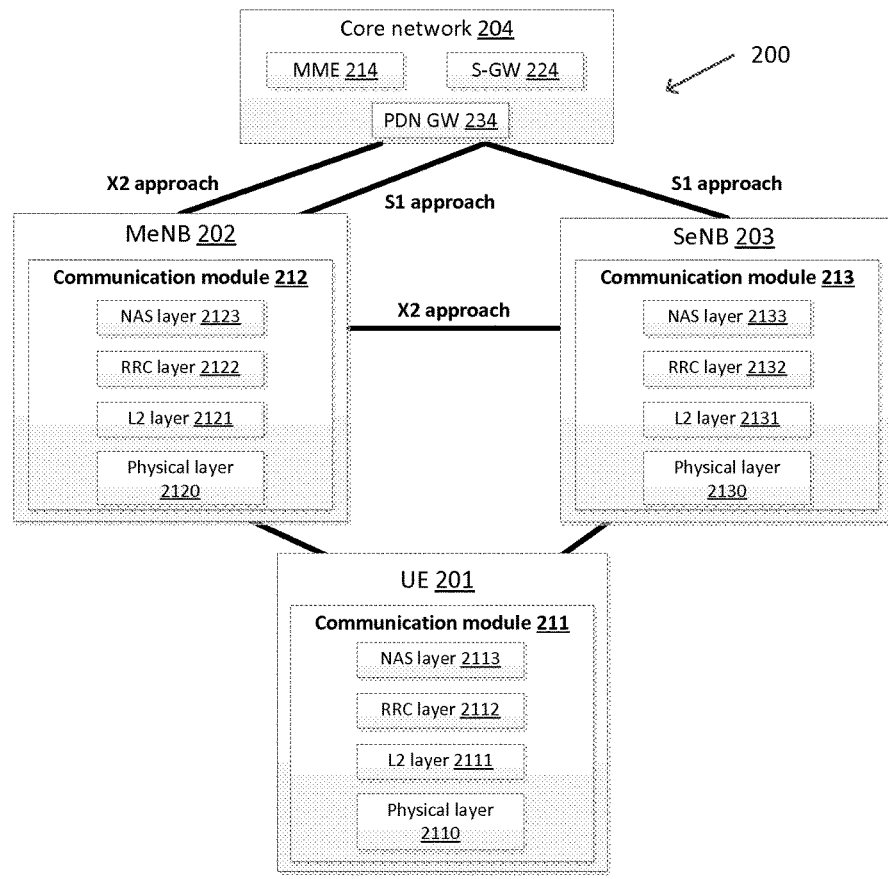
FIG. 2 illustrates an embodiment of a wireless communication system that may operate in compliance with the 3GPP LTE project along with any amendments, updates and/or revisions.

FIG. 2 illustrates an embodiment of a wireless communication system 200 that may operate in compliance with the 3GPP LTE project along with any amendments, updates, and/or revisions (e.g., LTE-Advanced (LTE-A), etc.). The wireless communication system 200 may comprise a user equipment (UE) 201, a master evolved Node B (MeNB) 202 for the macro cell, a secondary evolved Node B (SeNB) 203 for the small cell, and a core network system 204, wherein the UE 201 may be dual-connected with the MeNB 202 and the SeNB 203 according to a S1 approach or an X2 approach. Other embodiments may implement other modifications and variations on the MeNB 202 and/or the SeNB 203. For example, the MeNB 202 may be designed for another small cell. Similarly, the SeNB 203 may be designed for another macro cell.

The UE 201 may be embodied as, without limitation, a smart phone, a cellular telephone, a tablet, a consumer electronic device, a laptop computer, a notebook computer, a mobile computing system, a processor-based system, and/or any other mobile communication device configured to communicate with the core network system 204 via the MeNB 202 and/or the SeNB 203. The core network system 204 may be embodied as an evolved packet core (EPC) which may comprise, a mobility management entity (MME) 214, a serving gateway (S-GW) 224, a packet data network gateway (PDN GW) 234, and others.

Under the dual connectivity, bearers carrying data flows between the UE 201 and the core network system 204 may split between the MeNB 202 and the SeNB 203, for example, the bearers through the MeNB 202 and the bearers through the SeNB 203. Examples for the bearers may include evolved packet system (EPS) bearers. In some embodiments, the EPS bearer may comprise a bearer between the UE 201 and the MeNB 202 such as a data radio bearer (DRB), a bearer between the MeNB 202 and the S-GW 224 such as a S1 bearer, a bearer between S-GW 224 and PDN GW 234 such as S5/S8 bearer, and/or others. In some embodiments, an Evolved Universal Terrestrial Radio Access Network (EUTRAN) radio access bearer (E-RAB) between the UE 201 and the S-GW 224 may identify the concatenation of the corresponding DRB and the S1 bearer.

According to the S1 approach, the MeNB 202 and the SeNB 203 may connect directly with the core network system 204 via a S1 interface and the bearers for different eNBs may be split at the core network system 204. According to the X2 approach, the SeNB 203 may indirectly connect with the core network system 204, namely, through an X2 interface of the MeNB 202. Therefore, the bearers may be split at the MeNB 202.

As illustrate in FIG. 2, in various embodiments, the UE 201 may include a communication module 211, and/or others. The communication module 211 may receive or transmit a signalling/packet from/to the MeNB 202 and/or SeNB 203 in the wireless communication system 200. In some embodiments, the communication module 211 may further generate, process and/or control the signalling/packet and/or other communications from/to the UE 201. Details about functionalities of the communication module 211 may be provided in the following descriptions. The communication module 211 may include several layer implementations, such as a physical layer module 2110, a L2 layer module 2111, a radio resource communication (RRC) layer module 2112, a non-access stratum (NAS) layer module 2113, and/or others.

In various embodiments, the MeNB 202 may include a communication module 212, and/or others. The communication module 212 may receive or transmit a signalling/packet from/to the UE 201, SeNB 203 and/or core network system 204 in the wireless communication system 200. In some embodiments, the communication module 212 may further generate, process and/or control the signalling/packet and/or other communications from/to the MeNB 202. Details about functionalities of the communication module 212 may be provided in the following descriptions. The communication module 212 may include several layer implementations, such as a physical layer module 2120, a L2 layer module 2121, a radio resource communication (RRC) layer module 2122, a non-access stratum (NAS) layer module 2123, and/or others.

In various embodiments, the SeNB 203 may include a communication module 213, and/or others. The communication module 213 may receive or transmit a signalling/packet from/to the UE 201, MeNB 202 and/or core network system 204 of the wireless communication system 200. In some embodiments, the communication module 213 may further generate, process and/or control the signalling/packet and/or other communications from/to the SeNB 203. Details about functionalities of the communication module 213 may be provided in the following descriptions. The communication module 213 may include several layer implementations, such as a physical layer module 2130, a L2 layer module 2131, a radio resource communication (RRC) layer module 2132, a non-access stratum (NAS) layer module 2133, and/or others.

Figure 3:
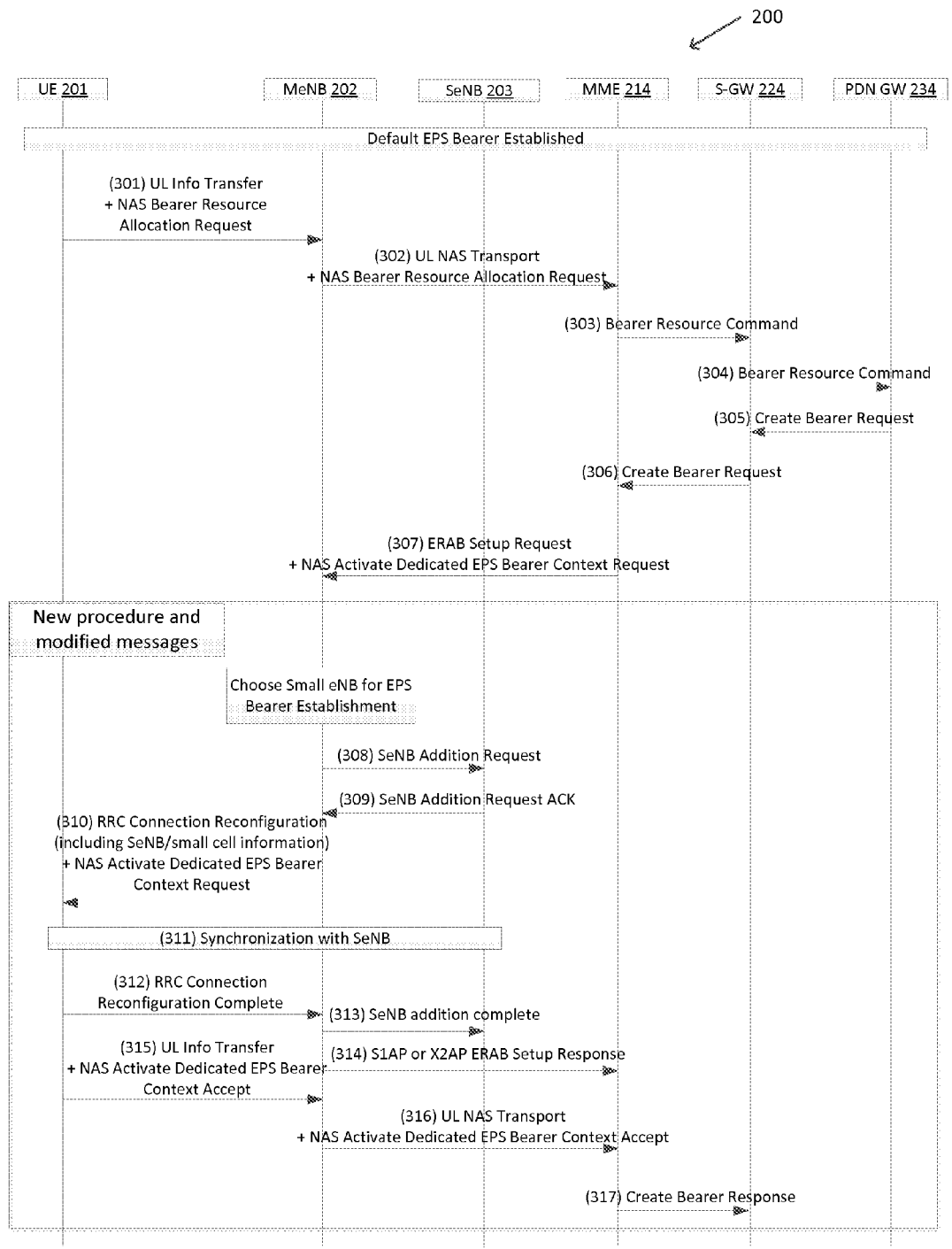
FIG. 3 illustrates an embodiment of a signalling procedure for the wireless communication system to add a new bearer through a secondary evolved Node B (SeNB) of the wireless communication system.

FIG. 3 illustrates an embodiment of a signalling procedure for the wireless communication system 200 to add SeNB resources by adding a new bearer through the SeNB 203, such as a new EPS bearer between the UE 201 and the core network system 204 and through the SeNB 203 for the small cell. In various embodiments, the UE 201 may communicate with the core network system 204 via a default bearer (e.g., a default EPS bearer) established through the MeNB 202 for the macro cell. In order to create the new bearer through the SeNB 203, during the signalling procedure as depicted in FIG. 3, the UE 201 may transmit a request to the MeNB 202 to request allocation of a new bear resource for a traffic flow aggregation (signalling 301). In some embodiments, the UE 201 may move into the small cell which may trigger a determination of requesting the allocation of the new bearer resource.

The request may be embodied as, without limitation, an uplink information transfer and a non-access stratum (NAS) bearer resource allocation request, and may include a specific quality of service (QoS) demand, a guaranteed bit rate (GBR) requirement for a new traffic flow aggregate and/or other information related to a dedicated EPS bearer context.

In some embodiments, the MeNB 202 may transport the request to the MME 214 (signalling 302), which may then transmit a bearer resource command to the S-GW 224 in response to a determination that the request is acceptable (signalling 303). However, in response to a determination that the request is not acceptable, the MME 214 may reject the request by transmitting a rejection message. In some embodiments, the bearer resource command may be further forwarded to the PDN GW 234 (signalling 304). In response to a determination that the bearer resource command may be acceptable, the PDN GW 234 may transmit a create bearer request to the S-GW 224 (signalling 305), which may then forward the request to the MME 214 (signalling 306). However, in response to a determination that the bearer resource command may be unacceptable, the PDN GW 234 may transmit a rejection message to the S-GW 224 and then indirectly to the MME 214.

Upon receiving the create bearer request, the MME 214 may initiate a dedicated bearer context activation procedure by transmitting a request to setup the new bearer with dedicated bearer context (signalling 307). The request may be embodied as E-RAB setup request and NAS activate dedicated EPS bearer context request.

Upon receipt of the request from MME 214, the MeNB 202 may select a small cell or a SeNB through which the new bearer can be established. In some embodiments, the MeNB 202 may select the small cell or the SeNB based on a UE measurement report related to a UE communication quality. The MeNB 202 may further transmit a request of adding the small cell or the SeNB by establishing the new bearer through the selected SeNB 203 (signalling 308). The request may be embodied as a SeNB addition request or a small cell addition request (not illustrated in FIG. 3) and may include, without limitation, information element (IE) such as cause for the the SeNB addition or the small cell addition, a list of E-RABs to be setup, characteristics of the new bearer (such as E-RAB parameters, transport network layer (TNL) address information, and/or others), UE security capabilities for S1 approach, security context for S1 approach, and/or others.

In response to a determination that the request from MeNB 202 is acceptable, such as when the QoS requirement of the new bearer can be satisfied, the SeNB 203 may transmit a message, e.g., a SeNB addition request acknowledgement (ACK) or a small cell addition request ACK (not illustrated in FIG. 3), to the MeNB 202 (signalling 309). The SeNB addition request ACK or the small cell addition request ACK may include, without limitation, a list of admitted E-RABs including TNL address information for the respective E-RAB, a list of not admitted E-RABs, a transparent container to be sent to the UE for the small cell addition or the SeNB addition, and/or others. The transparent container may include, without limitation, a new cell-radio network temporary identifier (C-RNTI) for identifying the UE 201 by the SeNB 203, secondary eNB security algorithm identifiers for selected security algorithms, a dedicated random access channel (RACH) preamble, access parameters, system information blocks (SIBs) parameters, and/or others. However, in response to a determination that the request from MeNB 202 is unacceptable, the SeNB 203 may transmit a rejection message to the MeNB 202.

Upon receipt of the acknowledgement message, the MeNB 202 may transmit a request to the UE 201 to request reconfiguring a radio resource control (RRC) connection to establish the new bearer through the SeNB 203 for the small cell (signalling 310). The request may be embodied as, without limitation, a RRC connection reconfiguration (i.e., RRCconnectionreconfiguration) and NAS activate dedicated EPS bearer context request, and may include information such as C-RNTI, security algorithm identifiers, dedicated RACH preamble for the small cell, and/or others. In some embodiments, the C-RNTI may not be needed if the UE 201 is allocated with the same C-RNTI in the macro cell and the small cell, and the security algorithm identifiers may not be needed if X2 approach is used.

Based on the information in the RRCconnectionreconfiguration and NAS activate dedicated EPS bearer request, the UE 201 may perform uplink and downlink synchronization with the SeNB 203 in order to reconfigure the RRC connection to establish the new bearer with the dedicated EPS bearer context (signalling 311). For example, the UE 201 may perform the synchronization to the SeNB 203 and access the small cell via RACH, following a contention-free or contention-based procedure depending on whether a dedicated preamble was indicated or not. In some embodiments, the UE 201 may meanwhile keep the default bearer through the MeNB 202 as well as a signalling radio bearer (SRB) through the MeNB 202. In this way, the UE 201 may be dual-connected with the MeNB 202 and the SeNB 203. Then, the UE 201 may transmit a RRC connection reconfiguration complete message (i.e., RRCconnectionreconfigurationcomplete) to the MeNB 202 (signalling 312), and the MeNB 202 may further transmit a SeNB addition complete message or a small cell addition complete message (not illustrated in FIG. 3) to the SeNB 203 (Signalling 313). Alternatively, the UE 201 may transmit the RRCconnectionreconfigurationcomplete message to the MeNB 202 as well as the SeNB 203. The UE 201 may be ready to communicate with the new bearer through the SeNB 203, and SeNB 203 may buffer packet data received from the UE 201 until a connection with the S-GW 224 is established.

In some embodiments, the MeNB 202 may then transmit an E-RAB setup response to the E-RAB setup request from MME 214 (signalling 314). The E-RAB setup response may be embodied as, without limitation, a S1 application protocol (S1AP) E-RAB setup response for the S1 approach or an X2 application protocol (X2AP) E-RAB setup response for the X2 approach. The E-RAB setup response may inform the MME 214 that the new bearer was created and was re-directed to the SeNB 203 and may include an indicator that the E-RAB may be handled by the SeNB, an IP addresses of the SeNB, and/or others.

The UE 201 may further transmit a message informing the MeNB 202 that the dedicated bearer context is accepted, such as a NAS activate dedicated EPS bearer context accept message to the MeNB 202 (signalling 315). This message may be transmitted in response to the above-stated NAS activate dedicated EPS bearer context request. The MeNB 202 may further forward the message to the MME 214 (signalling 316).

Upon receipt of the E-RAB setup response and the NAS activate dedicated EPS bearer context accept message, the MME 214 may transmit a create bearer response to the S-GW 224 (signalling 317), which may be the response to the above-stated create bearer request from the S-GW 224. In this way, the connection between the SeNB 203 and the S-GW 224 may be established, resulting in the establishment of the new bearer between the UE 201 and the S-GW 224.

Other embodiments may implement other modifications and variations to on the signalling procedure as depicted in FIG. 3. For example, although FIG. 3 illustrates the signalling procedure of adding the new cell as initiated by the UE 201, it should be understood that a similar procedure as initiated by the network 204 can accomplish the similar result.

Figure 4:
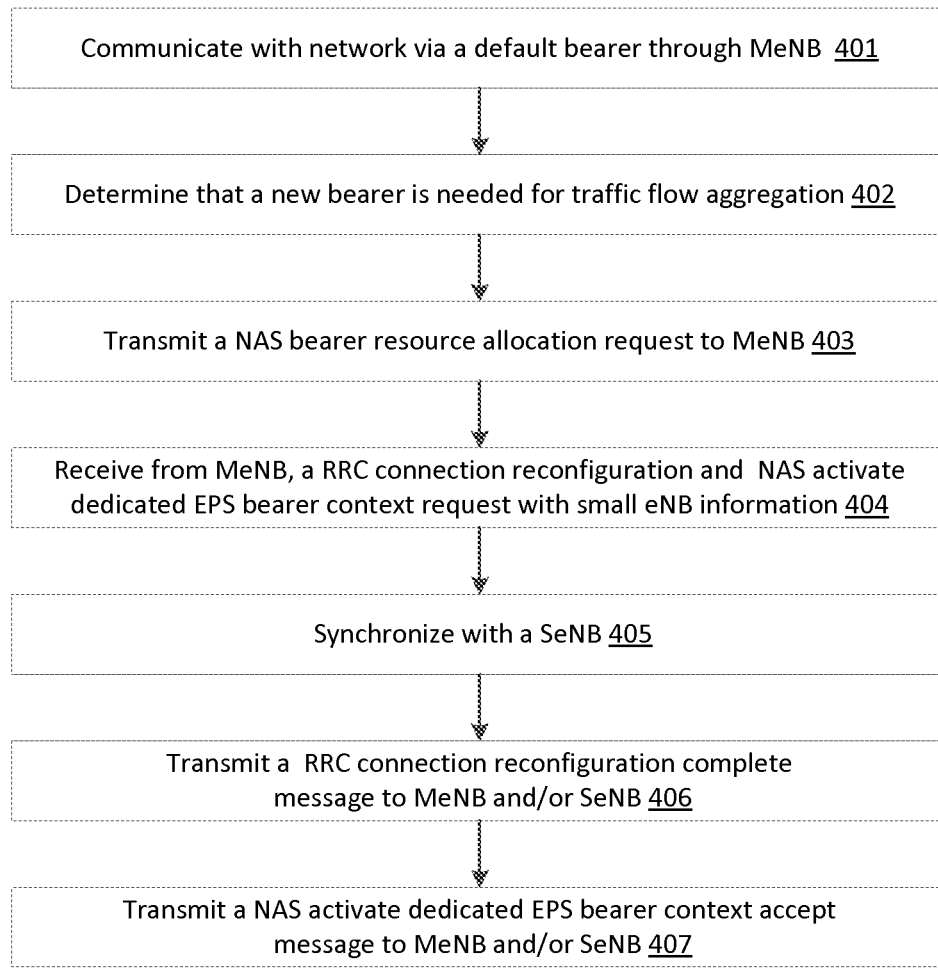
FIG. 4 illustrates an embodiment of a method for a user equipment (UE) of the wireless communication system to add the new bearer.

FIG. 4 illustrates an embodiment of a method for the UE 201 to add the SeNB resources by adding the new bearer through the SeNB 203 for the small cell. In block 401, the communication module 211 or other device of the UE 201 may communicate with the core network system 204 on the default bearer, such as the default EPS bearer through the MeNB 202. In block 402, the communication module 211 or other device may determine that the new bearer is needed for the traffic flow aggregation. In some embodiments, the UE 201 may move into the small cell which may trigger the determination for the new bearer through the small cell. In block 403, the communication module 211 (e.g., NAS layer module 2113) or other device may transmit the NAS bearer resource allocation request to the MeNB 202. In block 404, the communication module 211 (e.g., RRC layer module 2112) or other device may receive, from the MeNB 202, the request of adding the new bearer through the SeNB 203 for the small cell. The request may be embodied as the RRCconnectionreconfiguration and NAS activate dedicated EPS bearer context request, and may include information such as C-RNTI, security algorithm identifiers, dedicated RACH preamble for the small cell, and/or others. In some embodiments, the C-RNTI may not be needed if the UE 201 is allocated with the same C-RNTI in the macro cell and the small cell, and the security algorithm identifiers may not be needed if X2 approach is used.

In block 405, the communication module 211 (e.g., the RRC layer 2112) or other device may synchronize with the SeNB 203 to reconfigure the RRC connection for the new bearer establishment. In some embodiments, the UE 201 may perform uplink and downlink synchronization based on the information contained in the request. In some embodiments, the UE 201 may meanwhile keep the default bearer through the MeNB 202 as well as a signalling radio bearer (SRB) through the MeNB 202. Thus, the UE 201 may be dual-connected with the MeNB 202 and the SeNB 203.

In block 406, the communication module 211 (e.g., the RRC layer 2112) or other device may transmit the RRCconnectionreconfigurationcomplete message to the MeNB 202. In some embodiments, the message may be further transmitted to the SeNB 203. In block 407, the communication module 211 (e.g., the NAS layer 2113) or other device may transmit the NAS activate dedicated EPS bearer context accept message to the MeNB 202.

Other embodiments may implement other modifications and variations to on the method as depicted in FIG. 4. For example, although FIG. 4 illustrates the method of adding the new bearer as initiated by the UE 201, it should be understood that a similar procedure as initiated by the network 204 can accomplish the similar result.

Figure 5:
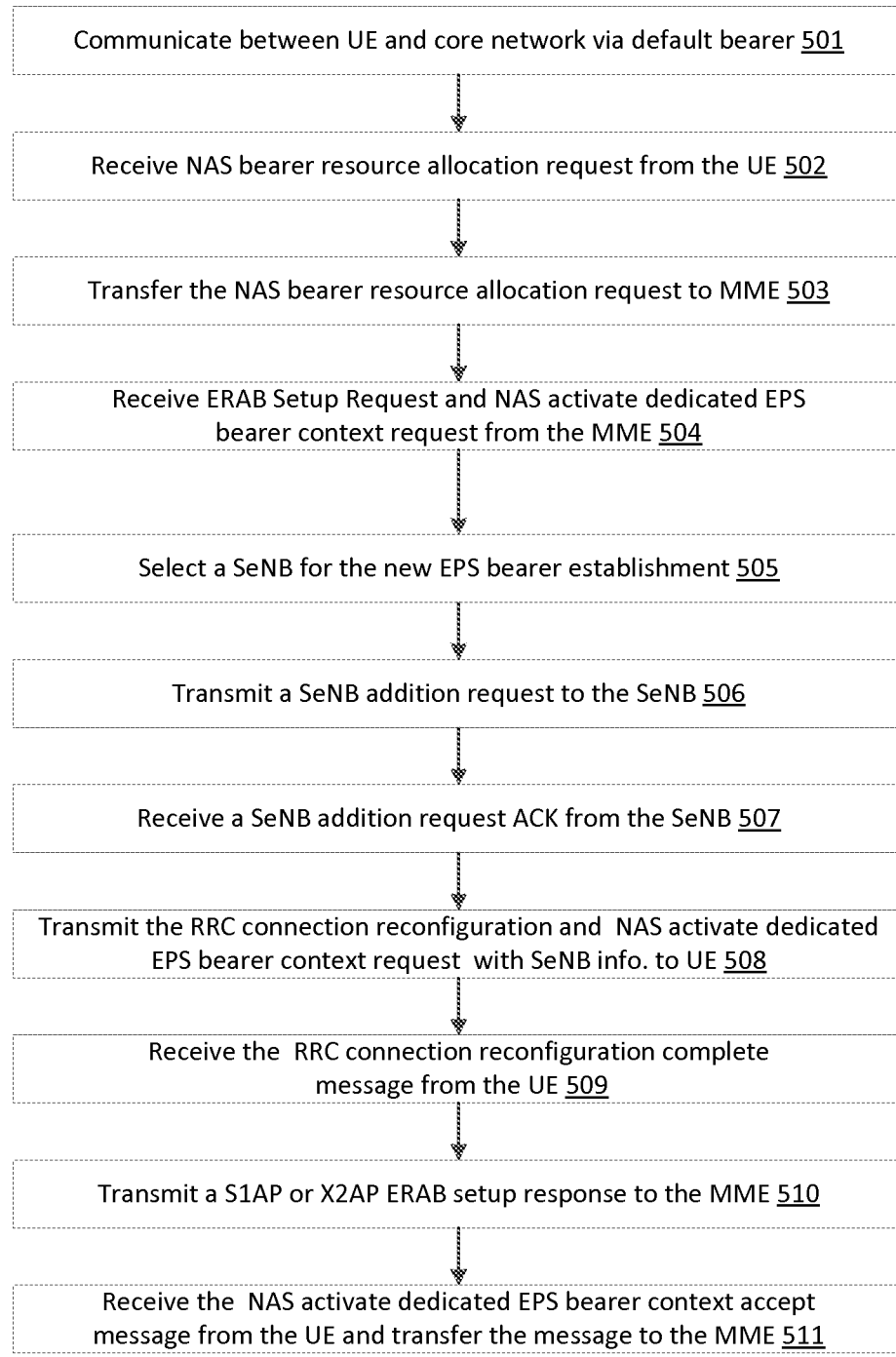
FIG. 5 illustrates an embodiment of a method for a master evolved Node B (MeNB) of the wireless communication system to add the new bearer.

FIG. 5 illustrates an embodiment of a method for the MeNB 202 of the wireless communication network 200 to add the SeNB resources by adding the new bearer through the SeNB 203 for the small cell. In block 501, the communication module 212 or other device of the MeNB 202 may communicate with the UE 201 on the default bearer through the macro cell, such as the EPS bearer. In block 502, the communication module 212 (e.g., NAS layer 2123) or other device may receive the NAS bearer resource allocation request from the UE 201. In block 503, the communication module 212 (e.g., NAS layer 2123) or other device may forward the NAS bearer resource allocation request to the MME 214. In block 504, the communication module 212 (e.g., NAS layer 2123) or other device may receive the E-RAB setup request and NAS activate dedicated EPS bearer context request from the MME 214, as a part of the dedicated bearer context activation procedure. In block 505, the communication module 212 or other device may select the small cell or the SeNB through which the new bearer can be established. In some embodiments, the MeNB 202 may select the small cell or the SeNB based on the UE measurement report related to the UE communication quality.

In block 506, the communication module 212 or other device may further transmit to the SeNB 203 the request of adding the new bearer. The request may be embodied as the SeNB addition request or the Small Cell addition request and may include, without limitation, information element (IE) such as cause for the SeNB addition, a list of E-RABs to be setup, characteristics of the new bearer, UE security capabilities for S1 approach, security context for S1 approach, and/or others.

In block 507, the communication module 212 or other device may receive, from the SeNB 203, the acknowledgement message such as the SeNB addition request ACK or the small cell addition request ACK (not illustrated in FIG. 5), if the SeNB 203 determines that the SeNB addition request or the small cell addition request is acceptable. The SeNB addition request ACK the small cell addition request ACK may include, without limitation, a list of admitted E-RABs including TNL address information for the respective E-RAB, a list of not admitted E-RABs, a transparent container to be sent to the UE for SeNB addition or small cell addition, and/or others. The transparent container may include, without limitation, a new cell-radio network temporary identifier (C-RNTI) for identifying the UE 201 by the SeNB 203, secondary eNB security algorithm identifiers for selected security algorithms, a dedicated random access channel (RACH) preamble, access parameters, system information blocks (SIBs) parameters, and/or others. However, the communication module 212 or other device may receive the rejection message, if the SeNB 203 determines that the SeNB addition request or the small cell addition request is unacceptable.

In block 508, the communication module 212 (e.g., RRC layer 2122) or other device may transmit the RRCconnectionreconfiguration and NAS activate dedicated EPS bearer context request to the UE 201 to request reconfiguring the RRC connection to establish the new bearer through the SeNB 203. In some embodiments, the RRCconnectionreconfiguration and NAS activate dedicated EPS bearer context request may include information such as C-RNTI, security algorithm identifiers, dedicated RACH preamble for the small cell, and/or others. In some embodiments, the C-RNTI may not be needed if the UE 201 is allocated with the same C-RNTI in the macro cell and the small cell, and the security algorithm identifiers may not be needed if X2 approach is used.

In some embodiments, the communication module 212 (e.g., RRC layer 2122) or other device may receive the RRC connection reconfiguration complete message from the UE 201 in block 509, and may transmit to MME 214 an E-RAB setup response to the E-RAB setup request in block 510. The E-RAB setup response may be embodied as, without limitation, a S1 application protocol (S1AP) E-RAB setup response for the S1 approach or an X2 application protocol (X2AP) E-RAB setup response for the X2 approach. The E-RAB setup response may inform the MME 214 that the new bearer was created and was re-directed to the SeNB 203.

In block 511, the communication module 212 (e.g., NAS layer 2123) or other device may further receive the NAS activate dedicated EPS bearer context accept message from the UE 201, which may be transmitted in response to the above-stated NAS activate dedicated EPS bearer context request. The communication module 212 (e.g., NAS layer 2123) or other device may further forwarded the message to the MME 214.

Other embodiments may implement other modifications and variations to on the method as depicted in FIG. 5. For example, although FIG. 5 illustrates the method of adding the new bearer as initiated by the UE 201, it should be understood that a similar procedure as initiated by the network 204 can accomplish the similar result.

Figure 6:
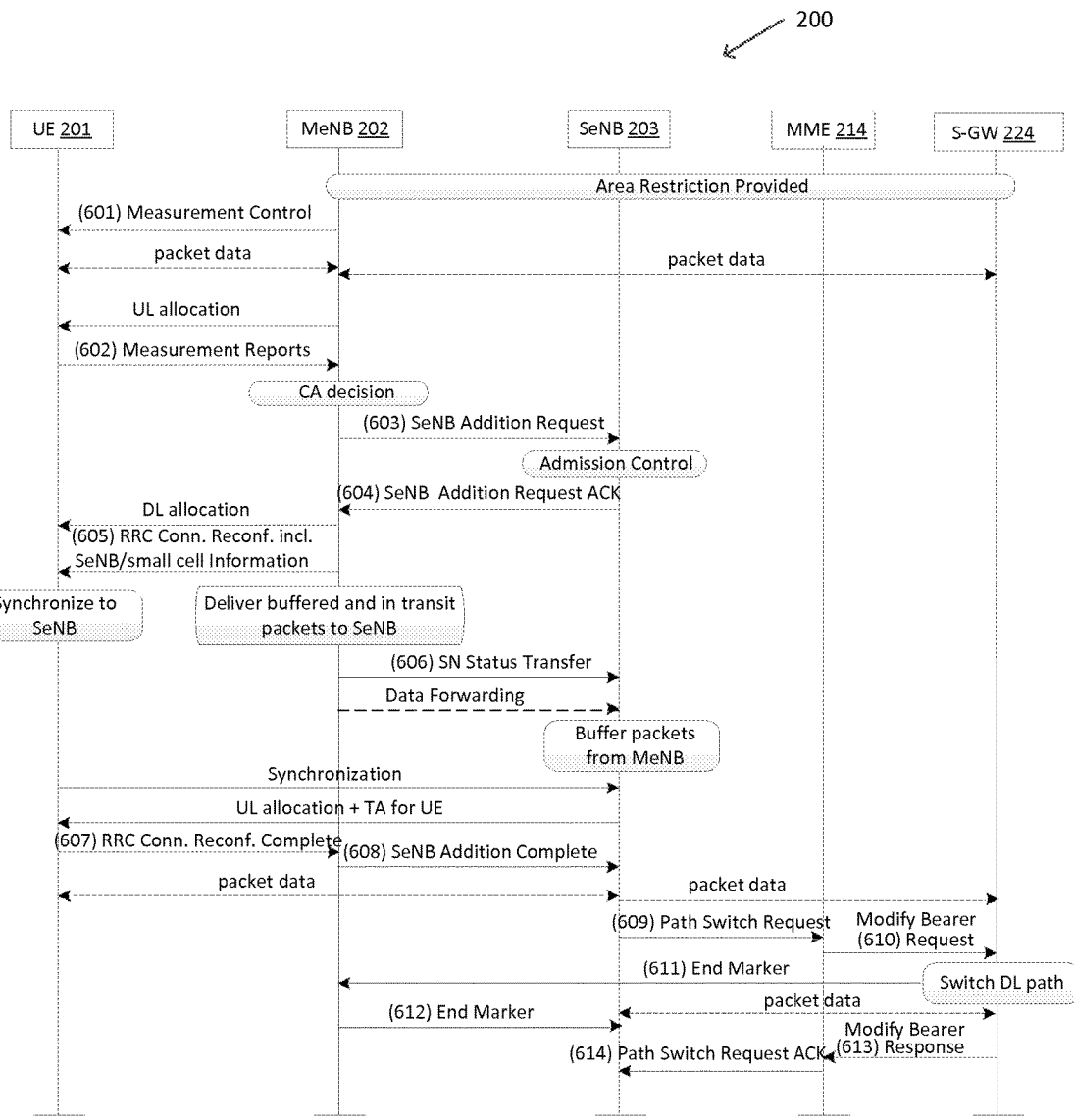
FIG. 6 illustrates an embodiment of a signalling procedure to switch a bearer from the MeNB to the SeNB of the wireless communication system, based on a S1 approach.

FIG. 6 illustrates an embodiment of a signalling procedure to adding the SeNB resources by switching a bearer from the MeNB 202 to the SeNB 203 of the wireless communication system 200, based on the S1 approach.

As illustrated in FIG. 6, based on the S1 approach, the UE 201 may communication with the core network system 204 over a DRB of an EPS bearer established through the MeNB 202 for the macro cell. The MeNB 202 may transmit a message related to measurement control to the UE 201 (signalling 601). In some embodiments, the message may configure the UE measurement procedures according to area restriction information. Measurements provided by the MeNB 202 may assist the function controlling the UE's connection mobility. In response to the message, the UE 201 may perform the measurement procedures and transmit a measurement report to the MeNB 202 (signalling 602). Based on the measurement report, the MeNB 202 may make a decision of switching the DRB from the macro cell to the small cell. This may happen under certain circumstances, such as when the UE 201 moving into the coverage of the small cell. As illustrated in FIG. 6, the decision may be called as a carrier aggregation (CA) decision. On the other hand, although not being illustrated in FIG. 6, it should be understood that the MeNB 202 may make a decision of not adding the small cell, for example, when the measurement report indicates that the radio quality in the small cell is not good enough.

The MeNB 202 may send a request of adding the small cell to the SeNB 203 for the small cell (signalling 603). The request may be embodied as a SeNB addition request or a small cell addition request (not illustrated in FIG. 6), and may include, without limitation, information element (IE) such as cause for the SeNB addition or the small cell addition, a list of E-RABs to be setup, characteristics of the DRB (such as DRB parameters, TNL address information and/or others), UE security capabilities for S1 approach, security context for S1 approach, and/or others.

Then, the SeNB 203 may perform an admission control to determine whether the request is acceptable or not. In response to a determination that the request is acceptable, the SeNB 203 may send a message to the MeNB 202, such as a SeNB addition request ACK or a small cell addition request ACK (not illustrated in FIG. 6) (signalling 604). The SeNB addition request ACK or the SeNB addition request or the small cell addition request ACK may include, without limitation, a list of admitted E-RABs including TNL address information for the respective E-RAB, a list of not admitted E-RABs, a transparent container to be sent to the UE for the SeNB addition or the small cell addition, and/or others. The transparent container may include, without limitation, a new C-RNTI for identifying the UE 201 by the SeNB 203, secondary eNB security algorithm identifiers for selected security algorithms, a dedicated random access channel (RACH) preamble, access parameters, system information blocks (SIBs) parameters, and/or others.

Upon receipt of the acknowledgment message, the MeNB 202 may transmit to the UE 201 a message of reconfiguring the RRC connection to switch the DRB from the MeNB 202 to the SeNB 203 (signalling 605). The message may be embodied as, without limitation, a RRCconnectionreconfiguration message, and may include information related to the small cell or the SeNB 203 such as the new C-RNTI, SeNB security algorithm identifiers and optionally dedicated RACH preamble, SeNB system information blocks (SIBs), and/or others.

In some embodiments, the MeNB 202 may start to deliver buffered and in transit packet data to the SeNB 203. Before forwarding the packet data, the MeNB 202 may transfer serial number (SN) status to the SeNB 203 (signalling 606). In some embodiments, the MeNB 202 may convey uplink PDCP (packet data convergence protocol) SN receiver status and/or downlink PDCP SN transmitter status of E-RABs for which PDCP status preservation applies. The SeNB 203 may buffer the packet data received from the MeNB 202, such as a memory or a data storage of the SeNB 203.

Based on the information in the RRCconnectionreconfiguration message, the UE 201 may perform uplink and/or downlink synchronization with the SeNB 203 in order to reconfigure the RRC connection to switch the DRB from the macro cell to the small cell. For example, the UE 201 may perform the synchronization to the SeNB 203 and access the small cell via RACH, following a contention-free or contention-based procedure depending on whether a dedicated preamble was indicated or not. In some embodiments that the UE 201 may communication with the MeNB 202 on more than one DRBs, after switching the DRB from the macro cell to the small cell, the UE 201 may still keep remaining DRB bearer(s) (i.e., unswitched DRB(s)) with the MeNB 202 as well as a SRB with the MeNB 202. In this way, the UE 201 may be dual-connected with the MeNB 202 and the SeNB 203.

After synchronizing with the SeNB 203 and being able to access the small cell, the UE 201 may transmit a RRCconnectionreconfigurationcomplete message to the MeNB 202 to inform that the RRC connection reconfiguration has been completed and the small cell has been successfully added (signalling 607). The MeNB 202 may then transmit a small cell addition complete message to the SeNB 203 (Signalling 608). Alternatively, the UE 201 may transmit the RRCconnectionreconfigurationcomplete message to the MeNB 202 as well as the SeNB 203.

In some embodiments, after the UE 201 can access the small cell, it may transmit an uplink packet to the SeNB 203 over the DRB through the small cell, which may be transferred by the SeNB 203 to the core network system 204. The SeNB 203 may further transmit a path switch request to the MME 214 to request switching a downlink path of the EPS bearer from between the MeNB 202 and the core network system 204 to between the SeNB 203 and the core network system 204 (signalling 609), wherein the DRB of the EPS bearer has already been switched from the MeNB 202 to the SeNB 203. The path switch request may include a list of the EPS bearer(s) whose DRB(s) have been switched. In some embodiments, the path switch request may further indicate to keep other bearer(s) unreleased, wherein the other bearer(s) may include those not listed in the request, such as the DRBs related to the MeNB 202 but not switched to the SeNB 203, and/or the SRBs related to the MeNB 202. In this way, the UE 201 may still be connected to the MeNB 202 while communicating with the SeNB 203. Alternatively, the MeNB 202 may send a separate request of keeping the other bearer(s) unreleased to the MME 214.

Upon receipt of the path switch request, the MME 214 may transmit a modify bearer request to the S-GW 224 to request modifying the downlink path of the listed EPS bearer(s) to go through the SeNB 203 (signalling 610). In response to the request, the S-GW 224 may switch the downlink path, so that the downlink packet data can be transmitted from the core network system 204 to the UE 201 through the SeNB 203. In some embodiments, the S-GW 224 may further send an End Marker to the MeNB 202 indicating an end of downlink packet data transmission on the old path to the MeNB 202 (signalling 611). The MeNB 202 may send another End Marker to the SeNB 203 indicating an end of data forwarding from the MeNB 202 to the SeNB 203 (signalling 612).

After the completion of the bearer modification, the S-GW 224 may send with a modify bearer response to the MME 214 (signalling 613), which may trigger the MME 214 to transmit an acknowledgement message to the SeNB 203, such as a path switch request ACK (signalling 614).

Other embodiments may implement other modifications and variations to on the method as depicted in FIG. 6. For example, more than one DRBs may be switched from the MeNB 202 to the SeNB 203 in order to add the SeNB resources. For another example, the path switch request may be transmitted by the MeNB 202, rather than by the SeNB 203 to the MME 214.

Figure 7:
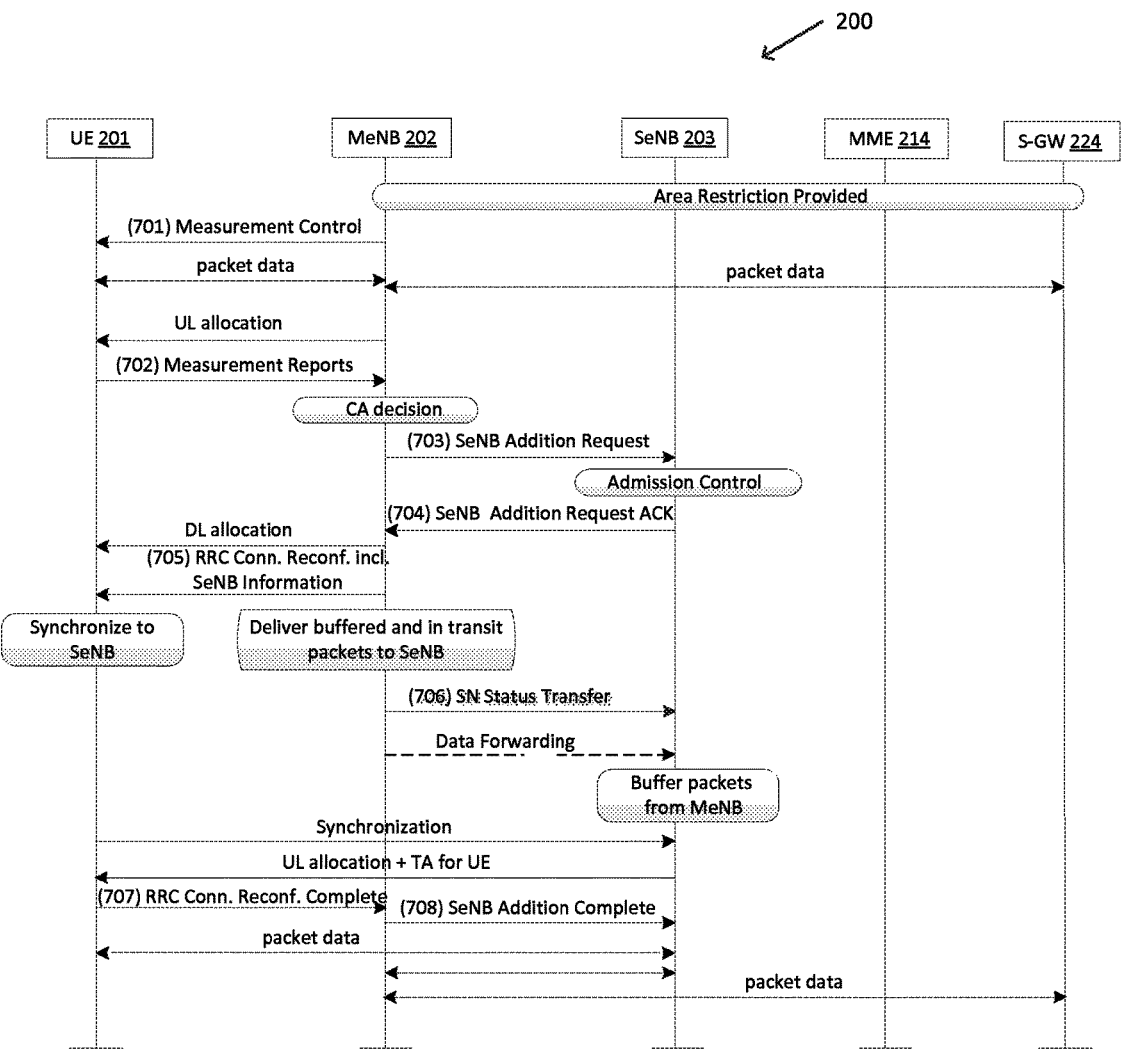
FIG. 7 illustrates an embodiment of a signalling procedure to switch the bearer from the MeNB to the SeNB of the wireless communication system, based on an X2 approach.

FIG. 7 illustrates an embodiment of a signalling procedure to add the SeNB resources by switching the bearer from the MeNB 202 to the SeNB 203 of the wireless communication system 200, based on the X2 approach. In some embodiments, the signalling procedure of FIG. 7 may be similar as that of FIG. 6. However, due to the X2 approach, after the completion of RRC connection reconfiguration to switch the DRB(s) of the EPS bearer(s) from the MeNB 202 to the SeNB 203 (signalling 708), the transmissions of the packet data over the EPS bearer(s) may have to go through the SeNB 203 and then through the MeNB 202, namely, the UE 201 may receive/transmit the packet data from/to the SeNB 203, which may further communicate the packet data from/to the core network system 204 through the MeNB 202. In this way, there may be no need to request the core network system 204 to modify the downlink path of the EPS bearer(s) from the MeNB 202 to the SeNB 203.

Figure 8:
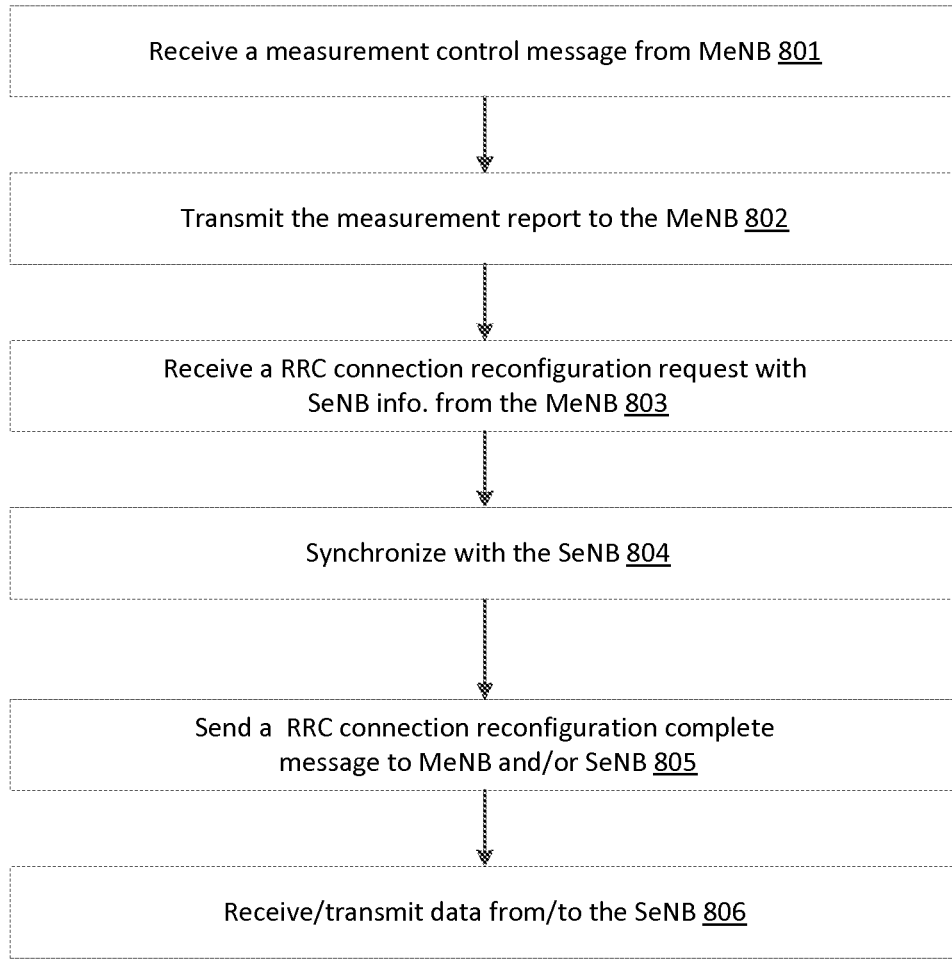
FIG. 8 illustrates an embodiment of a method for the UE of the wireless communication system to switch the bearer from the MeNB to the SeNB.

FIG. 8 illustrates an embodiment of a method for the UE 201 of the wireless communication system 200 to adding the SeNB resources by switching the bearer from the MeNB 202 to the SeNB 203. In some embodiments, the UE 201 may communication with the core network system 204 over the DRB of the EPS bearer established through the MeNB 202 for the macro cell. In block 801, the communication module 211 or other device of UE 201 may receive, from the MeNB 201, the message related to the measurement control which may configure the UE measurement procedures. Measurements provided by the MeNB 202 may assist the function controlling the UE's connection mobility. In response to the message, in block 802, the communication module 211 or other device of the UE 201 may perform the measurement and transmit the measurement report to the MeNB 202. Based on the measurement report, the MeNB 202 may make the decision of adding the small cell by switching the DRB from the MeNB 202 to the SeNB 203. This may happen under certain circumstances, such as when the UE 201 moving into the coverage of the small cell. However, it should be understood that the MeNB 202 may make a decision of not adding the small cell, for example, when the measurement report indicates that the radio quality in the small cell is not good enough.

In response to the decision of adding the small cell, in block 803, the communication module 211 (e.g., RRC layer 2112) or other device may receive a message of reconfiguring the RRC connection to add the small cell by switching the DRB from the MeNB 202 to the SeNB 203. The message may be embodied as, without limitation, a RRCconnectionreconfiguration message, and may include information related to the small cell such as the new C-RNTI, SeNB security algorithm identifiers and optionally dedicated RACH preamble, SeNB system information blocks (SIBs), and/or others.

In block 804, based on the information in the RRCconnectionreconfiguration message, the communication module 211 (e.g., RRC layer 2112) or other device may perform the uplink and/or downlink synchronization with the SeNB 203 in order to reconfigure the RRC connection to switch the DRB from the MeNB 202 to the SeNB 203. For example, the communication module 211 may perform the synchronization to the SeNB 203 and access the small cell via RACH, following a contention-free or contention-based procedure depending on whether a dedicated preamble was indicated or not. In some embodiments that the UE 201 may communication with the MeNB 202 on more than one DRBs, after switching the DRB from the macro cell to the small cell, the UE 201 may still keep the remaining DRB bearer(s) (i.e., the unswitched DRB(s)) with the MeNB 202 as well as the SRB with the MeNB 202. In this way, the UE 201 may be dual-connected with the MeNB 202 and the SeNB 203.

In block 805, after synchronizing with the SeNB 203 and being able to access the small cell, the communication module 211 (e.g., RRC layer 2112) or other device may transmit the RRCconnectionreconfigurationcomplete message to the MeNB 202 and/or SeNB 203 to inform that the RRC connection reconfiguration has been completed and the small cell has been successfully added. In block 806, the communication module 211 or other device may receive/transmit the packet data from/to the SeNB 203.

Other embodiments may implement other modifications and variations to on the method as depicted in FIG. 8. For example, more than one DRBs may be switched from the MeNB 202 to the SeNB 203 in order to add the SeNB resources.

Figure 9:
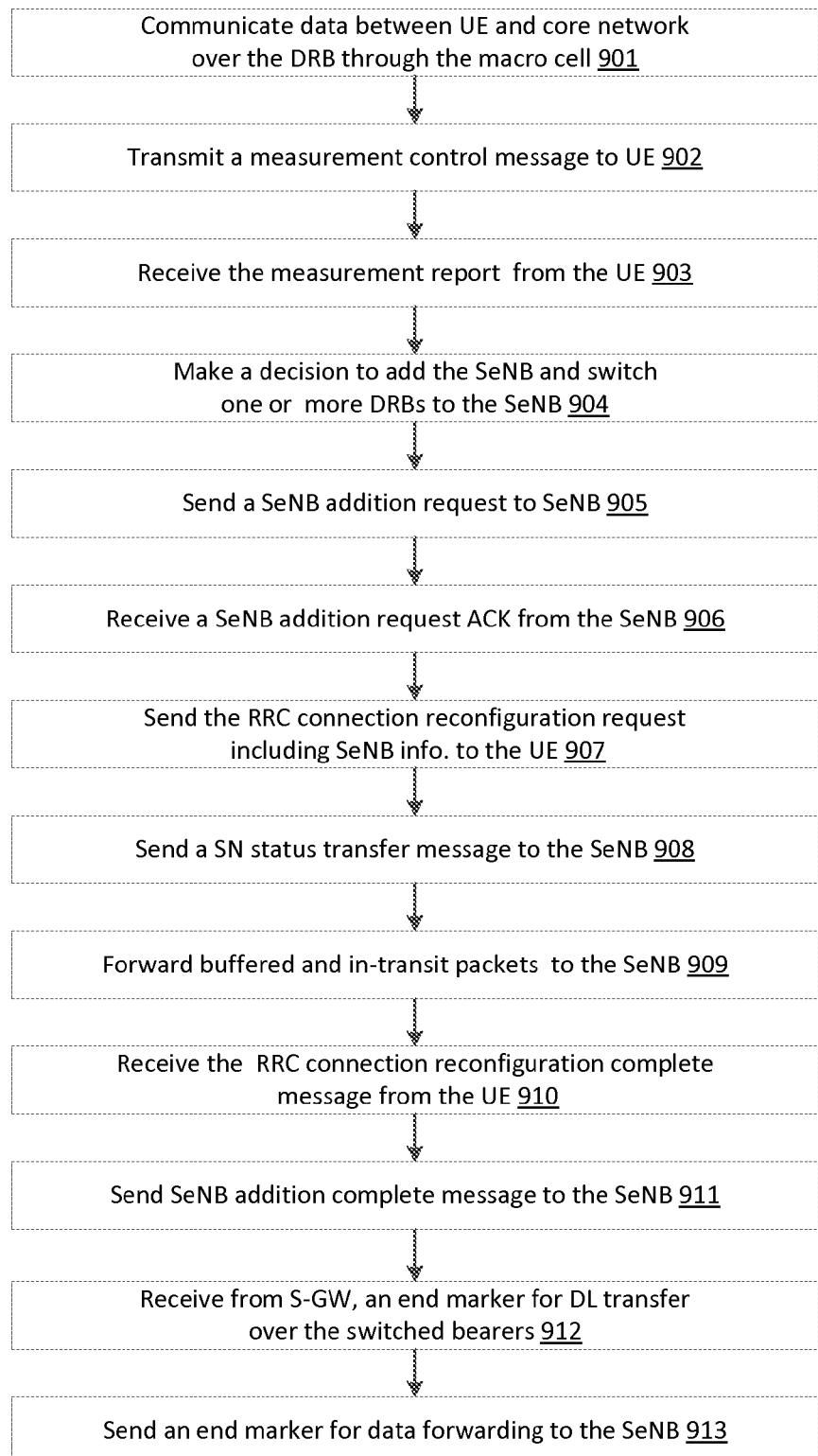
FIG. 9 illustrates an embodiment of a method for the MeNB of the wireless communication system to switch the bearer from the MeNB to the SeNB, based on the S1 approach.

FIG. 9 illustrates an embodiment of a method for the MeNB 202 of the wireless communication system 200 to add the SeNB resources by switching the bearer from the MeNB 202 to the SeNB 203, based on the S1 approach. According to the S1 approach, in block 901, the communication module 212 or other device of MeNB 202 may communicate the packet data between the UE 201 and the core network system 204 over the DRB of the EPS bearer established through the macro cell. In block 902, the communication module 212 or other device may transmit the message related to the measure control to the UE 201. In some embodiments, the message may configure the UE measurement procedures according to area restriction information. Measurements provided by the MeNB 202 may assist the function controlling the UE's connection mobility.

In block 903, the communication module 212 or other device may receive the measurement report from the UE 201. In block 904, based on the measurement report, the communication module 212 or other device may make the decision of adding the SeNB resources by switching the DRB from the MeNB 202 to the SeNB 203. On the other hand, although not being illustrated in FIG. 9, the communication module 212 or other device may make the decision of not adding the small cell.

In response to the decision of adding the SeNB resources, the communication module 212 or other device may send to the SeNB 203 the request of adding the SeNB resources by switching the DRB from the MeNB 202 to the SeNB 203, in block 905. In some embodiments, the request may be embodied as a SeNB addition request or a small cell addition request (not illustrated in FIG. 9), and may include, without limitation, information element (IE) such as cause for the SeNB addition or small cell addition, the list of E-RABs to be setup, characteristics of the DRB, UE security capabilities for S1 approach, security context for S1 approach, and/or others.

In block 906, the communication module 212 or other device may receive, from the UE 201, the acknowledgement message such as the SeNB addition request ACK or the small cell addition request ACK (not illustrated in FIG. 9). In some embodiments, the SeNB addition request ACK or the small cell addition request ACK may include, without limitation, the list of admitted E-RABs (such as E-RAB parameters, TNL address information, and/or others), the list of not admitted E-RABs, a transparent container to be sent to the UE for the SeNB addition or the small cell addition, and/or others. The transparent container may include, without limitation, the new C-RNTI for identifying the UE 201 by the SeNB 203, SeNB security algorithm identifiers for selected security algorithms, the dedicated RACH preamble, access parameters, SIBs parameters, and/or others.

Upon receipt of the acknowledgment message, in block 907, the communication module 212 (e.g., RRC layer 2122) or other device may transmit to the UE 201 the message of reconfiguring the RRC connection to add the SeNB resources by switching the DRB from the MeNB 202 to the SeNB 203. The message may be embodied as, without limitation, the RRCconnectionreconfiguration message, and may include information related to the small cell or the SeNB 203 such as the new C-RNTI, SeNB security algorithm identifiers and optionally dedicated RACH preamble, SeNB system information blocks (SIBs), and/or others. In some embodiments that the UE 201 may communication with the MeNB 202 on more than one DRBs, after switching the DRB from the MeNB 202 to the SeNB 203, the UE 201 may still keep the remaining DRB bearer (i.e., the unswitched DRB) with the MeNB 202 as well as the SRB with the MeNB 202. In this way, the UE 201 may be dual-connected with the MeNB 202 and the SeNB 203.

Then, the MeNB 202 may start to deliver the buffered and in transit packet data to the SeNB 203. Before forwarding the packet data in block 909, the communication module 212 or other device may transfer the serial number (SN) status to the SeNB 203 in block 908. In some embodiments, the MeNB 202 may convey uplink PDCP (packet data convergence protocol) SN receiver status and/or downlink PDCP SN transmitter status of E-RABs for which PDCP status preservation applies. The SeNB 203 may buffer the packet data received from the MeNB 202, for example, in the memory or the data storage of the SeNB 203.

After the UE 201 synchronizing with the SeNB 203 and being able to access the small cell, in block 910, the communication module 212 (e.g., RRC layer 2122) or other device may receive, from the UE 201, the RRCconnectionreconfigurationcomplete message which may inform that the RRC connection reconfiguration has been completed and the SeNB resources has been successfully added. In some embodiments, the communication module 212 or other device may then transmit the SeNB addition complete message or small cell addition complete message (not illustrated in FIG. 9) to the SeNB 203, in block 911. However, in other embodiments that the UE 201 transmits the RRC-connectionreconfigurationcomplete message to the MeNB 202 and the SeNB 203, the block 911 may be omitted.

In block 912, the communication module 212 or other device may send a S1 or X2 message to the S-GW 224, in order to keep the bearer(s) unreleased, which bearer(s) are related to the MeNB 202 and haven't been switched to the SeNB 203. The bearer(s) may include DRB(s) and/or SRB(s). In this way, the UE 201 may still connect with the MeNB 202. In some embodiments, the similar message may be conveyed to the S-GW 224 by the SeNB 203. In such case, block 912 may be omitted.

In block 912, the communication module 212 or other device may receive from the core network system (e.g., S-GW 224), the end marker indicating the end of downlink packet data transmissions from the core network system to the MeNB 202 over the old path. In block 913, the communication module 212 or other device may transmit, to the SeNB 203, the end marker indicating the end of data forwarding from the MeNB 202 to the SeNB 203.

Other embodiments may implement other modifications and variations to on the method as depicted in FIG. 9. For example, the communication module 212 or other device may further transmit, to the MME 214, the path switch request to request switching the downlink path of the EPS bearer from between the MeNB 202 and the core network system 204 to between the SeNB 203 and the core network system 204, wherein the DRB of the EPS bearer has already been switched from the MeNB 202 to the SeNB 203. The path switch request may include the list of the EPS bearer(s) whose DRB(s) have been switched. In some embodiments, the path switch request may further indicate to keep other bearer(s) unreleased, wherein the other bearer(s) may include those not listed in the request, such as the DRBs related to the MeNB 202 but not switched to the SeNB 203, and/or the SRBs related to the MeNB 202. In this way, the UE 201 may still be connected to the MeNB 202 while communicating with the SeNB 203. Alternatively, the SeNB 203 may send a separate request of keeping the other bearer(s) unreleased to the MME 214.

Figure 10:
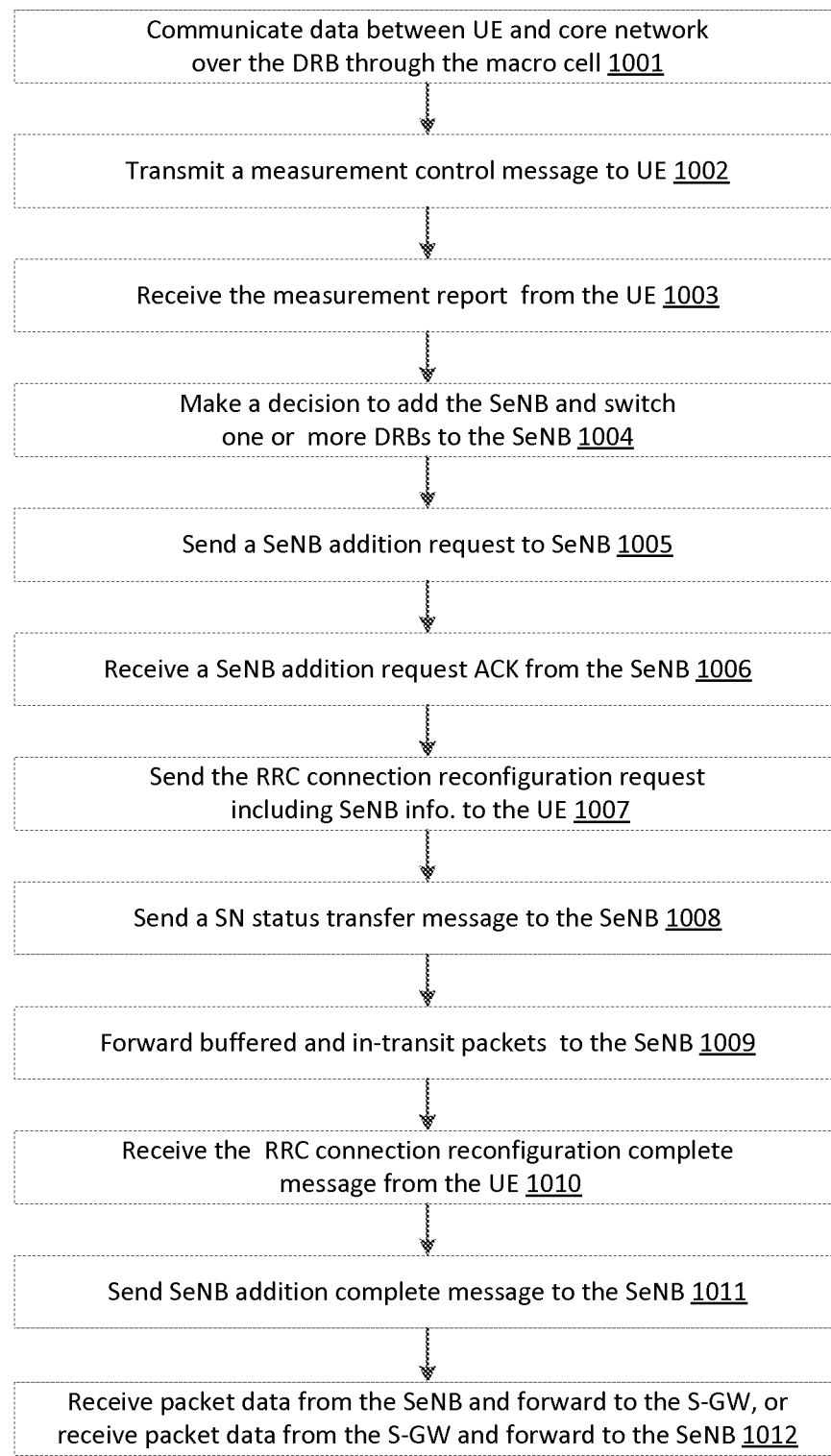
FIG. 10 illustrates an embodiment of a method for the MeNB of the wireless communication system to switch the bearer from the MeNB to the SeNB, based on the X2 approach.

FIG. 10 illustrates an embodiment of a method for the MeNB 202 of the wireless communication system 200 to add the SeNB resources by switching the bearer from the MeNB 202 to the SeNB 203, based on the X2 approach.

In some embodiments, blocks 1001 to 1011 are similar to blocks 901 to 9011 and may not be reiterated for simplicity. In block 1012, based on X2 approach, the MeNB 202 may deliver the packet data received from the SeNB 203 to the core network system 204, and vice versa.

Other embodiments may implement other modifications and variations to on the method as depicted in FIG. 10. For example, the communication module 212 or other device may further transmit the path switch request to the MME 214 to request switching the downlink path of the EPS bearer from between the MeNB 202 and the core network system 204 to between the SeNB 203 and the core network system 204, wherein the DRB of the EPS bearer has already been switched from the MeNB 202 to the SeNB 203. The path switch request may include the list of the EPS bearer(s) whose DRB(s) have been switched. In some embodiments, the path switch request may further indicate to keep other bearer(s) unreleased, wherein the other bearer(s) may include those not listed in the request, such as the DRBs related to the MeNB 202 but not switched to the SeNB 203, and/or the SRBs related to the MeNB 202. In this way, the UE 201 may still be connected to the MeNB 202 while communicating with the SeNB 203. Alternatively, the SeNB 203 may send a separate request of keeping the other bearer(s) unreleased to the MME 214.

Figure 11:
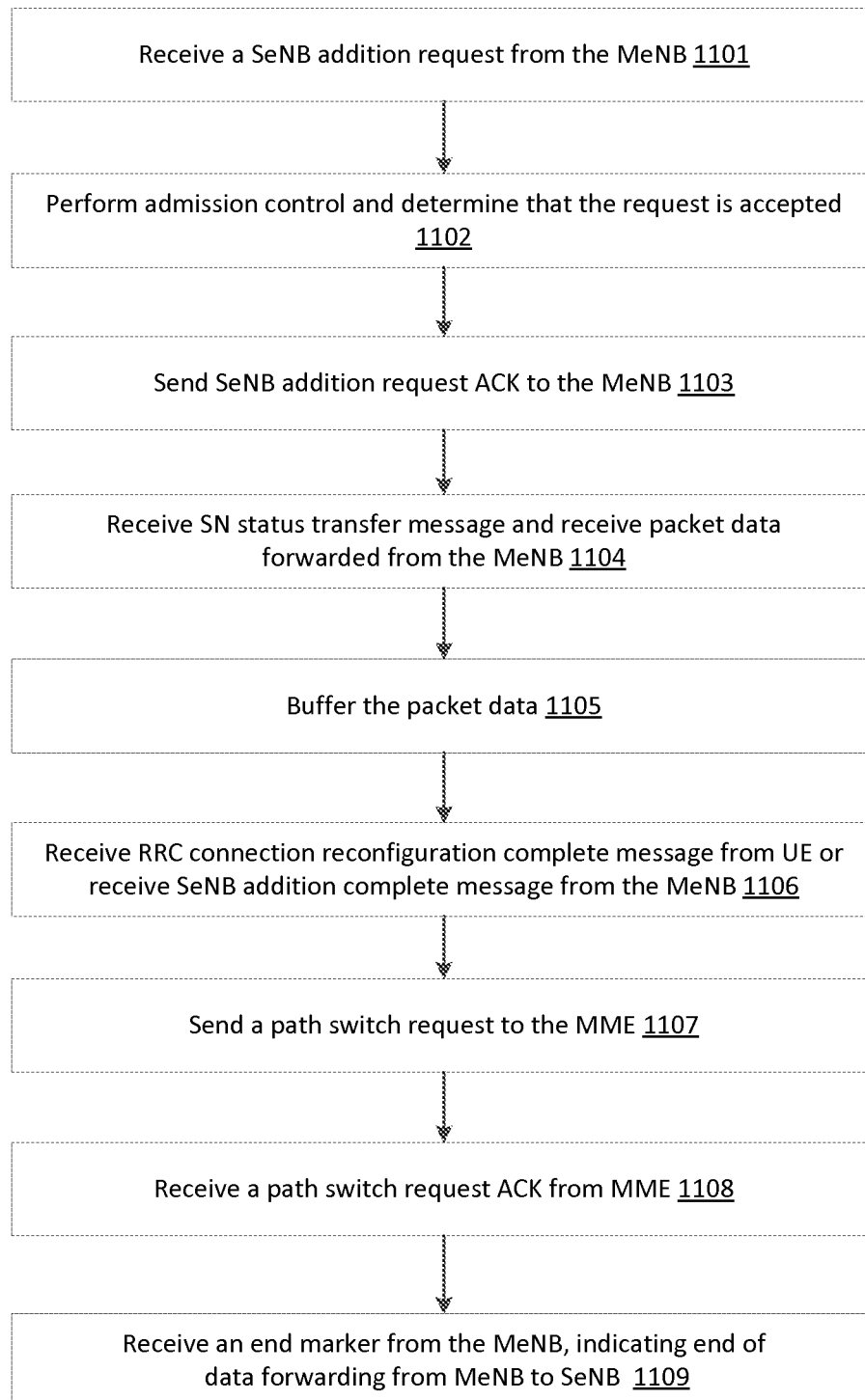
FIG. 11 illustrates an embodiment of a method for the SeNB of the wireless communication system to switch the bearer from the MeNB to the SeNB based on the S1 approach.

FIG. 11 illustrates an embodiment of a method for the SeNB 203 of the wireless communication system 200 to add the SeNB resources by switching the bearer from the MeNB 202 to the SeNB 203 based on the S1 approach.

In some embodiments, according to the S1 approach, the UE 201 may communication with the core network system 204 over the DRB of the EPS bearer established through the MeNB 202 for the macro cell. Under some circumstances such as when the UE 201 moving into the small cell, the MeNB 202 may make the decision of adding the SeNB resources by switching the DRB from the MeNB 202 to the SeNB 203.

In block 1101, the communication module 213 or other device of SeNB 203 may receive the request of adding the SeNB resources from the MeNB 202. The request may be embodied as the SeNB addition request or the small cell addition request (not illustrated in FIG. 11), and may include, without limitation, information element (IE) such as cause for the SeNB addition or the small cell addition, a list of E-RABs to be setup, characteristics of the DRB, UE security capabilities for S1 approach, security context for S1 approach, and/or others. In block 1102, the communication module 213 or other device may perform the admission control to determine whether the request is acceptable or not. In response to the determination that the request is acceptable and relevant E-RAB bearer recourses can be granted, in block 1103, the communication module 213 may send the acknowledgement message to the MeNB 202, such as the SeNB addition request ACK or the small cell addition request ACK (not illustrated in FIG. 11). The SeNB addition request ACK or the small cell addition request ACK may include, without limitation, a list of admitted E-RABs, a list of not admitted E-RABs, a transparent container to be sent to the UE for the SeNB addition or the small cell addition, and/or others. The transparent container may include, without limitation, a new C-RNTI for identifying the UE 201 by the SeNB 203, secondary eNB security algorithm identifiers for selected security algorithms, a dedicated random access channel (RACH) preamble, access parameters, system information blocks (SIBs) parameters, and/or others.

In block 1104, the communication module 213 or other device may receive the SN status transfer message and packet data forwarded from the MeNB 202. In some embodiments, the MeNB 202 may convey uplink PDCP (packet data convergence protocol) SN receiver status and/or downlink PDCP SN transmitter status of E-RABs for which PDCP status preservation applies. In block 1105, the communication module 213 or other device may buffer the packet data received from the MeNB 202, for example, in the memory or the data storage of the SeNB 203.

After UE 201 synchronizing with the SeNB 203 and being able to access the small cell, in block 1106, the communication module 213 (e.g., RRC layer 2132) or other device may receive the RRCconnectionreconfigurationcomplete message from the UE 201. Alternatively, the communication module 213 (e.g., RRC layer 2132) may receive the SeNB addition complete message or the small cell addition complete message (not illustrated in FIG. 11) from the MeNB 202, either of which may inform the SeNB 203 of the completion of adding the SeNB resources.

When the UE 201 can access the small cell, it may transmit the uplink packet to the SeNB 203 over the DRB through the small cell, which may be transferred by the SeNB 203 to the core network system 204. In block 1107, the communication module 213 or other device may transmit the path switch request to the MME 214 to request switching the downlink path of the EPS bearer from between the MeNB 202 and the core network system 204 to between the SeNB 203 and the core network system 204, wherein the DRB of the EPS bearer has already been switched from between the MeNB 202 to the SeNB 203. The path switch request may include the list of the EPS bearer(s) whose DRBs have been switched. In some embodiments, the path switch request may further indicate to keep other bearer(s) unreleased, wherein the other bearer(s) may include those not listed in the request, such as the DRBs related to the MeNB 202 and not switched to the SeNB 203, and/or the SRBs related to the MeNB 202. In this way, the UE 201 may still be connected to the MeNB 202 while communicating with the SeNB 203. Alternatively, the MeNB 202 may send the separate request of keeping the other bearer(s) unreleased, in which case the block 1107 may be omitted.

After the core network system 204 switches the downlink path of the EPS bearer from the MeNB 202 to the SeNB 203, in block 1108, the communication module 213 or other device may receive the acknowledgement message from the core network system 204 (e.g., the MME 214), such as the path switch request ACK. In block 1109, the communication module 213 or other device may receive the end marker from the MeNB 202 indicating the end of data forwarding from the MeNB 202 to the SeNB 203.

After completion of switching the DRB and adding the SeNB resources, based on the S1 approach, the UE 201 may communicate with the core network system 204 over the DRB through the SeNB 203.

Figure 12:
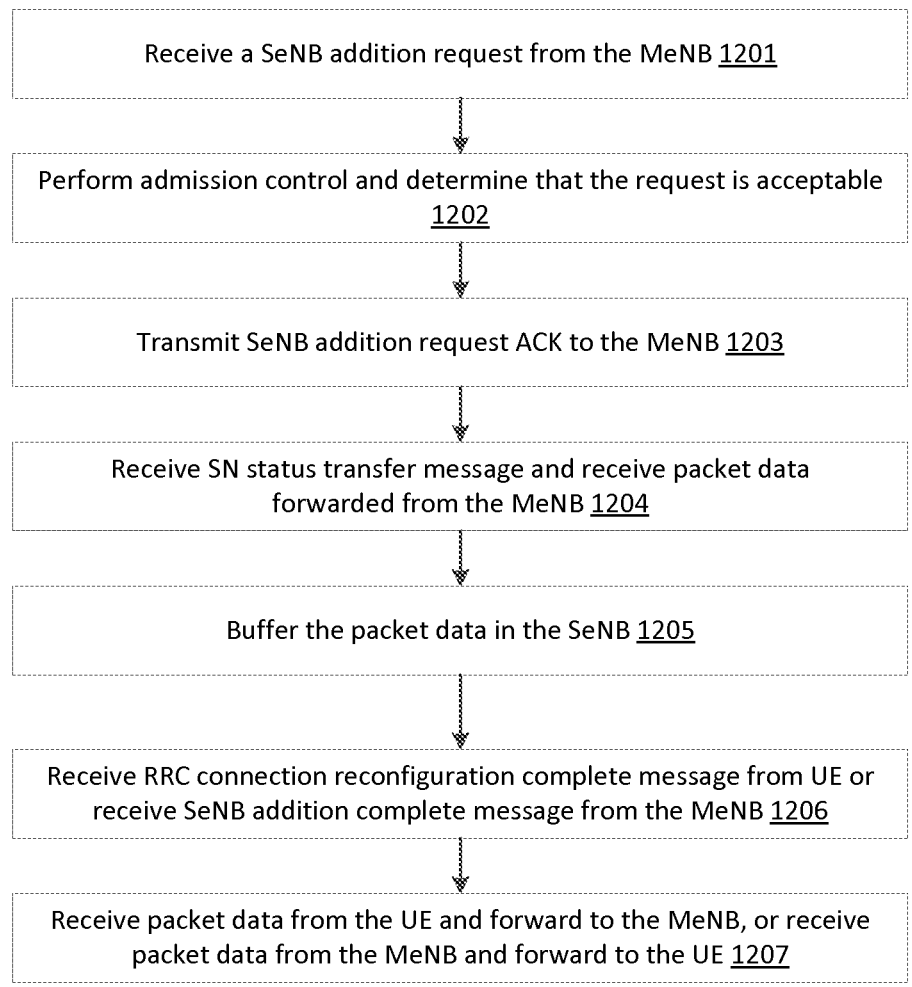
FIG. 12 illustrates an embodiment of a method for the SeNB of the wireless communication system to switch the bearer from the MeNB to the SeNB based on the X2 approach.

FIG. 12 illustrates an embodiment of a method for the SeNB 203 of the wireless communication system 200 to add the SeNB resources by switching the bearer from the MeNB 202 to the SeNB 203 based on the X2 approach.

In some embodiments, blocks 1201 to 1206 are similar to blocks 1101 to 1106 and may not be reiterated for simplicity. In block 1207, after completion of switching the DRB and adding the SeNB resources, based on the X2 approach, the UE 201 may communicate with the SeNB 203 over the DRB through the small cell, which may further connect with the core network 204 via the MeNB 202. In other words, based on the X2 approach, the communication module 213 or other device may forward the packet data, which was received from the UE 201, to the MeNB 202 for further transmission to the core network 204, and vice versa.

Figure 13:
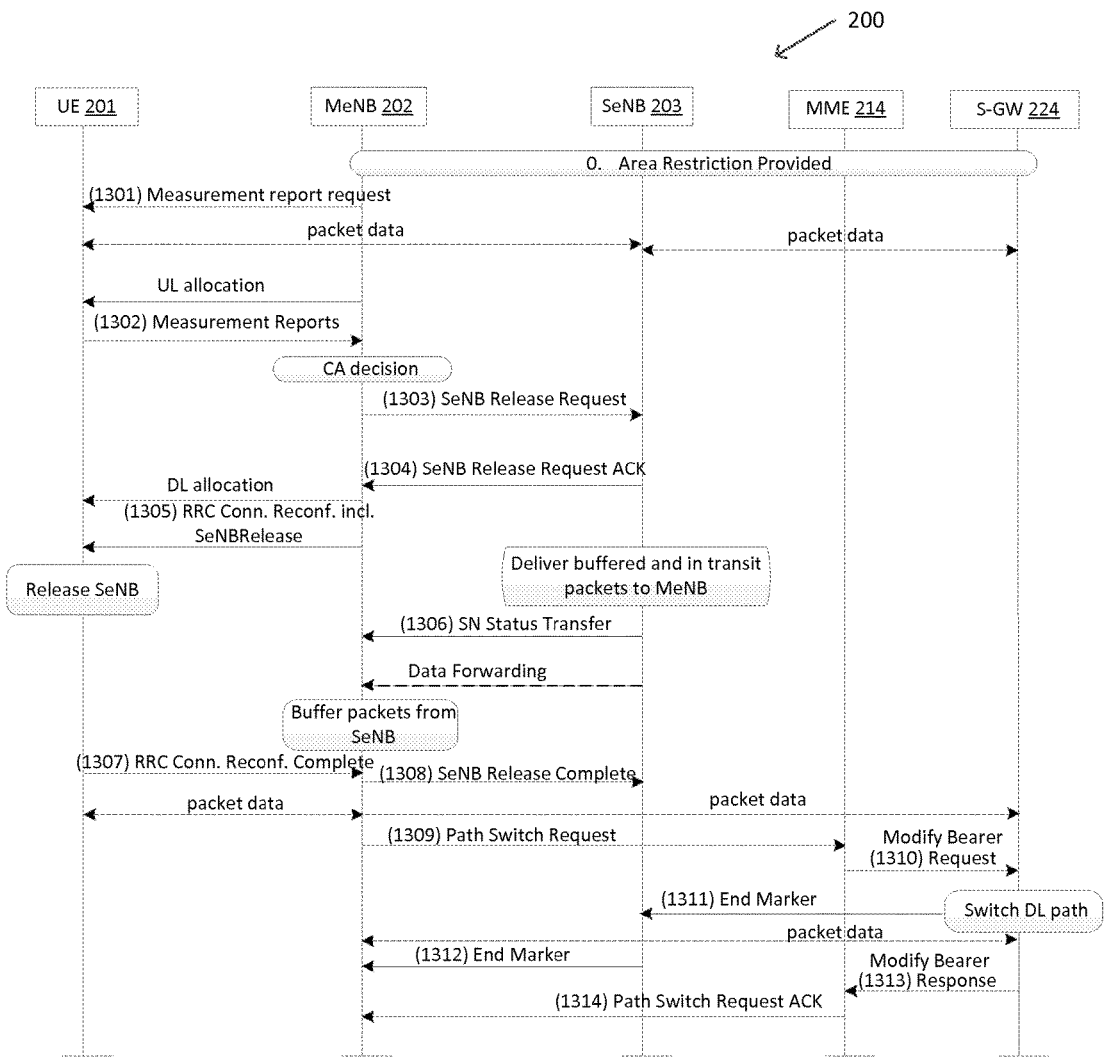
FIG. 13 illustrates an embodiment of a signalling procedure for the wireless communication system to switch a bearer from the SeNB to the MeNB, based on the S1 approach.

FIG. 13 illustrates an embodiment of a signalling procedure for the wireless communication system 200 to release SeNB resources by switching a bearer from the SeNB 203 to the MeNB 202, based on the S1 approach.

As illustrated in FIG. 13, based on the S1 approach, the UE 201 may communicate packet data with the core network system 204 over a DRB of an EPS bearer through the SeNB 203 for the small cell. Under the dual connectivity, the UE 201 may communicate another packet data with the MeNB 202 over another DRB of another EPS bearer or communicate a signalling with the MeNB 202 over a SRB through the MeNB 202.

In some embodiments, the MeNB 202 may transmit a message related to measurement control to the UE 201 (signalling 1301). In some embodiments, the message may configure the UE measurement procedures according to area restriction information. Measurements provided by the MeNB 202 may assist the function controlling the UE's connection mobility. In response to the message, the UE 201 may perform the measurement procedures and transmit a measurement report to the MeNB 202 (signalling 1302).

Based on the measurement report, the MeNB 202 may make a decision of releasing the SeNB resources by switching the DRB from the SeNB 203 to the MeNB 202. This may happen under certain circumstances, such as when the UE 201 moving out of the coverage of the small cell. As illustrated in FIG. 13, the decision may be called as a carrier aggregation (CA) decision. On the other hand, although not being illustrated in FIG. 13, it should be understood that the MeNB 202 may make a decision of not releasing the SeNB resources, for example, when the measurement report indicates that the radio quality in the small cell is good enough.

In response to the decision of releasing the SeNB resources, the MeNB 202 may send to the SeNB 203 for the small cell a request of releasing the SeNB resources (signalling 1303). The request may be embodied as a SeNB release request or a small cell release request (not illustrated in FIG. 13), and may include, without limitation, information necessary for preparing the DRB switch, such as elements (IE) like cause for the SeNB release or the small cell release, a list of E-RABs to be switched, characteristics of the DRB (such as DRB parameters, TNL address information, and/or others), UE C-RNTI in the small cell, UE security capabilities for S1 approach, security context for S1 approach, and/or others. Then, the SeNB 203 may perform an admission control to determine whether the request is acceptable or not. In response to a determination that the request is acceptable, the SeNB 203 may send an acknowledgement message to the MeNB 202, such as a small cell release request ACK (signalling 1304). The SeNB release request ACK or the small cell release request ACK may include, without limitation, information such as the C-RNTI, the cause for the SeNB release or the small cell release, a list of admitted E-RABs including TNL address information for the respective E-RAB, a list of not admitted E-RABs, a transparent container to be sent to the UE for the SeNB release or the small cell release, and/or others.

Upon receipt of the acknowledgment message, the MeNB 202 may transmit to the UE 201 a message of reconfiguring the RRC connection to release the SeNB resources by switching the DRB from the SeNB 203 to the MeNB 202 (signalling 1305). The message may be embodied as, without limitation, a RRCconnectionreconfiguration message and may include SeNB release information or small cell release information (i.e., SeNB release information) to inform the UE 201 that the SeNB resources are going to be released.

The SeNB 203 may deliver buffered and in transit packet data to the MeNB 202. Before forwarding the packet data, the SeNB 203 may transfer SN status message to the MeNB 202 (signalling 1306). In some embodiments, the SeNB 203 may convey uplink PDCP (packet data convergence protocol) SN receiver status and/or downlink PDCP SN transmitter status of E-RABs for which PDCP status preservation applies. The MeNB 202 may buffer the packet data received from the SeNB 203 in a memory or a data storage of the MeNB 202.

In some embodiments, based on the information in the RRCconnectionreconfiguration message, the UE 201 may reconfigure the DRB to detach from the SeNB 203 in order to release the SeNB resources. Then, the UE 201 may transmit a RRCconnectionreconfigurationcomplete message to the MeNB 202 to inform that the RRC connection reconfiguration has been completed and the SeNB resources have been successfully released (signalling 1307). The MeNB 202 may then transmit a SeNB resources complete message or a SeNB release complete message or a small cell release complete message (not illustrated in FIG. 13) to the SeNB 203, which may include a UE identifier, a transaction identifier, and/or others (Signalling 1308).

When the UE 201 can access the macro cell over the DRB, based on the S1 approach, it may transmit an uplink packet to the MeNB 202 over the DRB, which may be transferred by the MeNB 203 to the core network system 204. The MeNB 202 may further transmit a path switch request to the MME 214 to request switching a downlink path of the EPS bearer from between the SeNB 203 and the core network system 204 to between the MeNB 202 and the core network system 204 (signalling 1309), wherein the DRB of the EPS bearer has already been switched from the SeNB 203 to the MeNB 202. The path switch request may include a list of the EPS bearer(s) whose DRB(s) have been switched. In some embodiments, the path switch request may further indicate to keep other bearer(s) unreleased, wherein the other bearer(s) may include those not listed in the request, such as the DRBs and/or the SRBs related to the MeNB 202. Alternatively, the MeNB 202 may send a separate request of keeping the other bearer(s) unreleased to the MME 214. In other embodiments, it may be the SeNB 203, rather than the MeNB 202, which may send the path switch request to the MME 214.

Upon receipt of the path switch request, the MME 214 may transmit a modify bearer request to the S-GW 224 to request modifying the downlink path of the listed EPS bearer(s) to go through the MeNB 202 (signalling 1310). In response to the request, the S-GW 224 may switch the downlink path, so that the downlink packet data can be transmitted from the core network system 204 to the UE 201 through the MeNB 202 for the macro cell, based on the S1 approach. In some embodiments, the S-GW 224 may further send an End Marker to the SeNB 203 indicating an end of downlink packet data transmission on the old path (signalling 1311). The SeNB 203 may send another End Marker to the MeNB 202 indicating an end of data forwarding from the SeNB 203 to the MeNB 202 (signalling 1312).

After the completion of the bearer modification, the S-GW 224 may send with a modify bearer response to the MME 214 (signalling 1313), which may trigger the MME 214 to transmit an acknowledgement message to the MeNB 202, such as a path switch request ACK (signalling 1314).

Other embodiments may implement other modifications and variations to on the method as depicted in FIG. 13. In some embodiments, it may be the SeNB 203 which makes the decision of releasing the SeNB resources. In such case, the SeNB release request or the small cell release request may be sent from the SeNB 203 to MeNB 202, and the SeNB release request ACK or the small cell release request ACK may be sent from the MeNB 202 to the SeNB 203.

Figure 14:
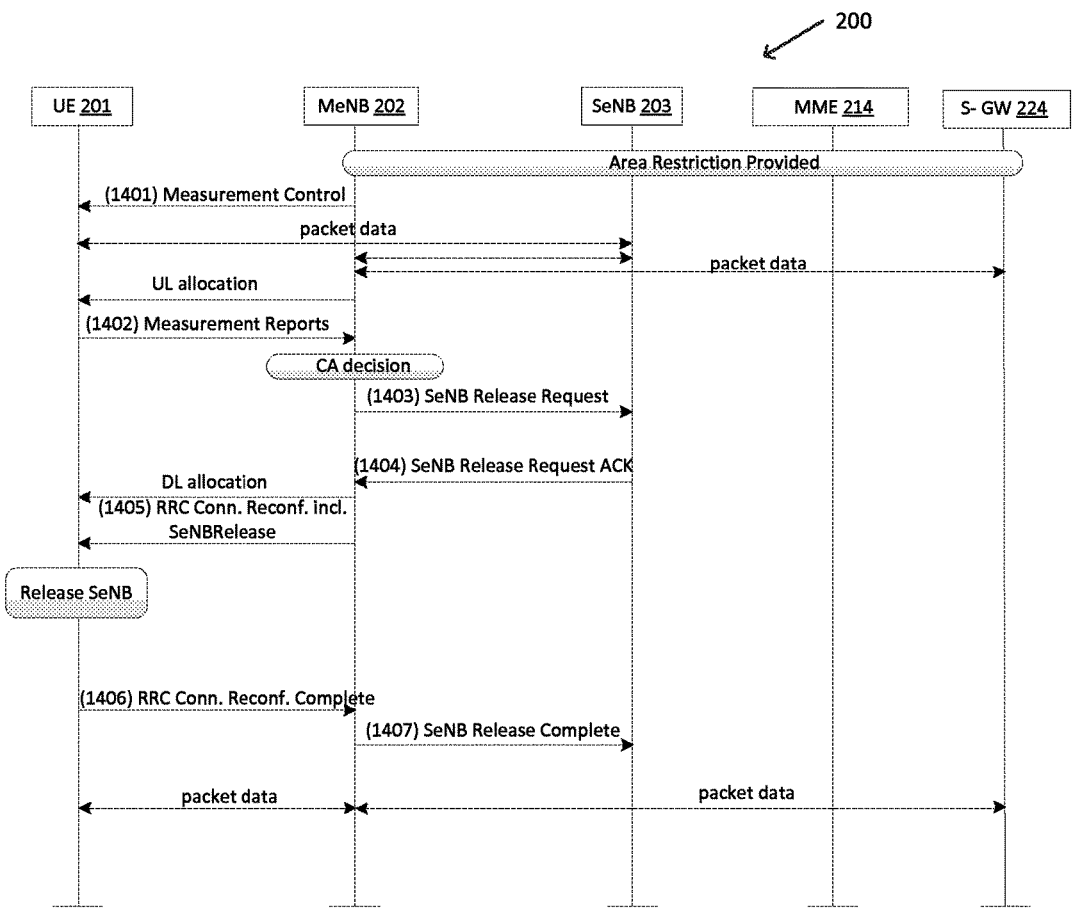
FIG. 14 illustrates an embodiment of a signalling procedure for the wireless communication system to switch the bearer from the SeNB to the MeNB, based on the X2 approach.

FIG. 14 illustrates an embodiment of a signalling procedure for the wireless communication system 200 to release the SeNB resources by switching the bearer from the SeNB 203 to the MeNB 202, based on the X2 approach.

In some embodiments, the signalling procedure of FIG. 14 may be similar as that of FIG. 13. However, due to the X2 approach, before releasing the SeNB resources, the UE 201 may receive/transmit the packet data from/to SeNB 203 over the DRB of the EPS bearer, and the SeNB 203 may then communicate the packet data with the core network system 204 through the MeNB 202. In view of this, based on the X2 approach, there may be no need for the SeNB 203 to deliver the buffered and in transit packet data to the MeNB 202.

Moreover, in some embodiments, after the completion of the RRC connection reconfiguration to switch the DRB from the SeNB 203 to the MeNB 202 (signalling 1406), the transmissions of the packet data between the UE 201 and the core network system 204 over the EPS bearer may only need to go through the MeNB 202. In this way, there may be no need to request the core network system 204 to modify the downlink path of the EPS bearer from the SeNB 203 to the MeNB 202.

Other embodiments may implement other modifications and variations to on the method as depicted in FIG. 14. In some embodiments, it may be the SeNB 203 which makes the decision of releasing the SeNB resources. In such case, the SeNB release request or the small cell release request may be sent from the SeNB 203 to MeNB 202, and the SeNB release request ACK or the small cell release request ACK may be sent from the MeNB 202 to the SeNB 203.

Figure 15:
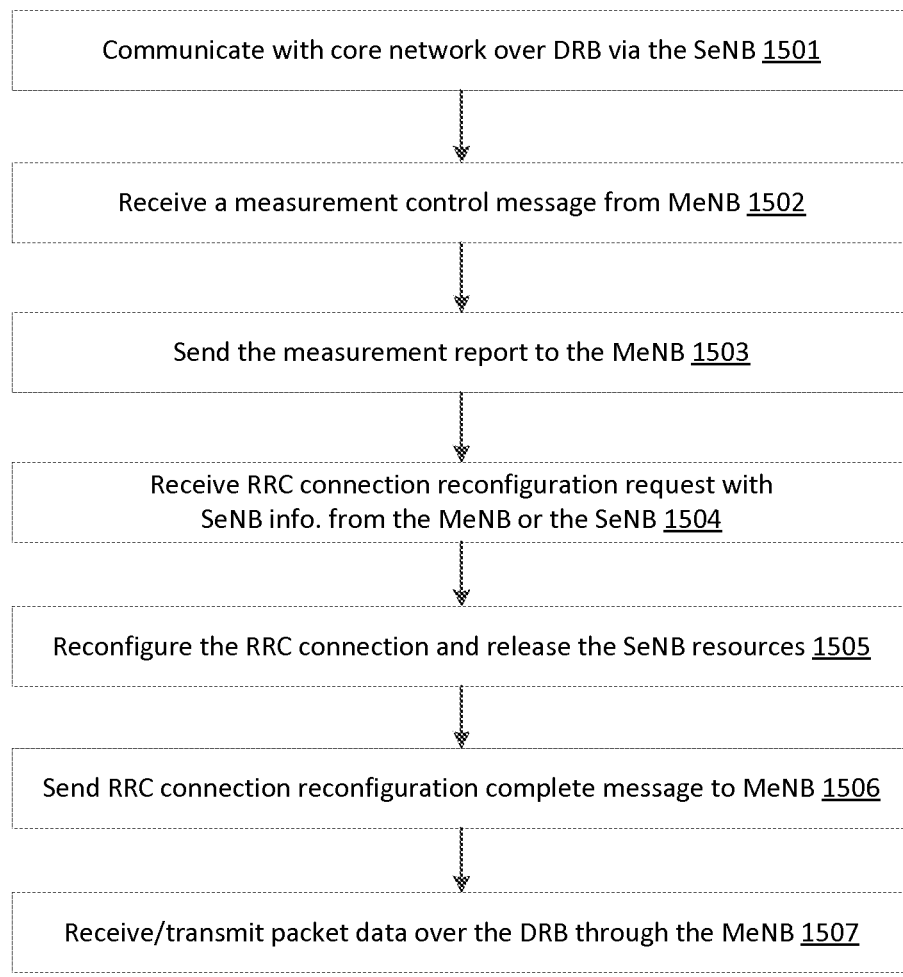
FIG. 15 illustrates an embodiment of a method for the UE of the wireless communication system to switch the bearer from the SeNB to the MeNB.

FIG. 15 illustrates an embodiment of a method for the UE 201 of the wireless communication system 200 to release the SeNB resources by switching the bearer from the SeNB 203 to the MeNB 202.

In block 1501, the communication module 211 or other device of the UE 201 may communicate with the core network system 204 over the DRB of the EPS bearer through the SeNB 203 for the small cell. Under the dual connectivity, the communication module 211 or other device may communicate another packet data with the MeNB 202 over another DRB of another EPS bearer through the MeNB 202 or communicate the signalling with the MeNB 202 over the SRB through the MeNB 202.

In block 1502, the communication module 211 or other device may receive the message related to the measurement control from the MeNB 202. In some embodiments, the message may configure the UE measurement procedures according to area restriction information. Measurements provided by the MeNB 202 may assist the function controlling the UE's connection mobility. In response to the message, the communication module 211 or other device may perform the measurement and may transmit the measurement report to the MeNB 202 in block 1503. Based on the measurement report, the MeNB 202 may make the decision of releasing the SeNB resources by switching the DRB from the SeNB 203 to the MeNB 202. This may happen under certain circumstances, such as when the UE 201 moving out of the coverage of the small cell. On the other hand, although not being illustrated in FIG. 15, it should be understood that the MeNB 202 may make the decision of not releasing the SeNB resources, for example, when the measurement report indicates that the radio quality in the small cell is good enough.

In response to the decision of releasing the small cell, the communication module 211 (e.g., RRC layer 2112) or other device may receive, from the MeNB 202 or SeNB 203, the message of reconfiguring the RRC connection to release the small cell by switching the DRB from the SeNB 203 to the MeNB 202, in block 1504. The request may be embodied as, without limitation, a RRCconnectionreconfiguration message and may include small cell release information (i.e., SeNB release information or small cell release information) to inform the UE 201 that the small cell is going to be released.

In some embodiments, based on the information in the RRC connection reconfiguration message, the communication module 211 (e.g., RRC layer 2112) or other device may reconfigure the DRB to detach from the SeNB 203 in order to release the SeNB resources. After detaching from the SeNB 203, the communication module 211 (e.g., RRC layer 2112) or other device may transmit the RRCconnectionreconfigurationcomplete message to the MeNB 202 to inform that the RRC connection reconfiguration has been completed and the SeNB resources has been successfully released, in block 1506. In block 1507, the communication module 211 or other device may start to communicate the packet data with the core network system 204 over the DRB through the MeNB 202.

Figure 16:
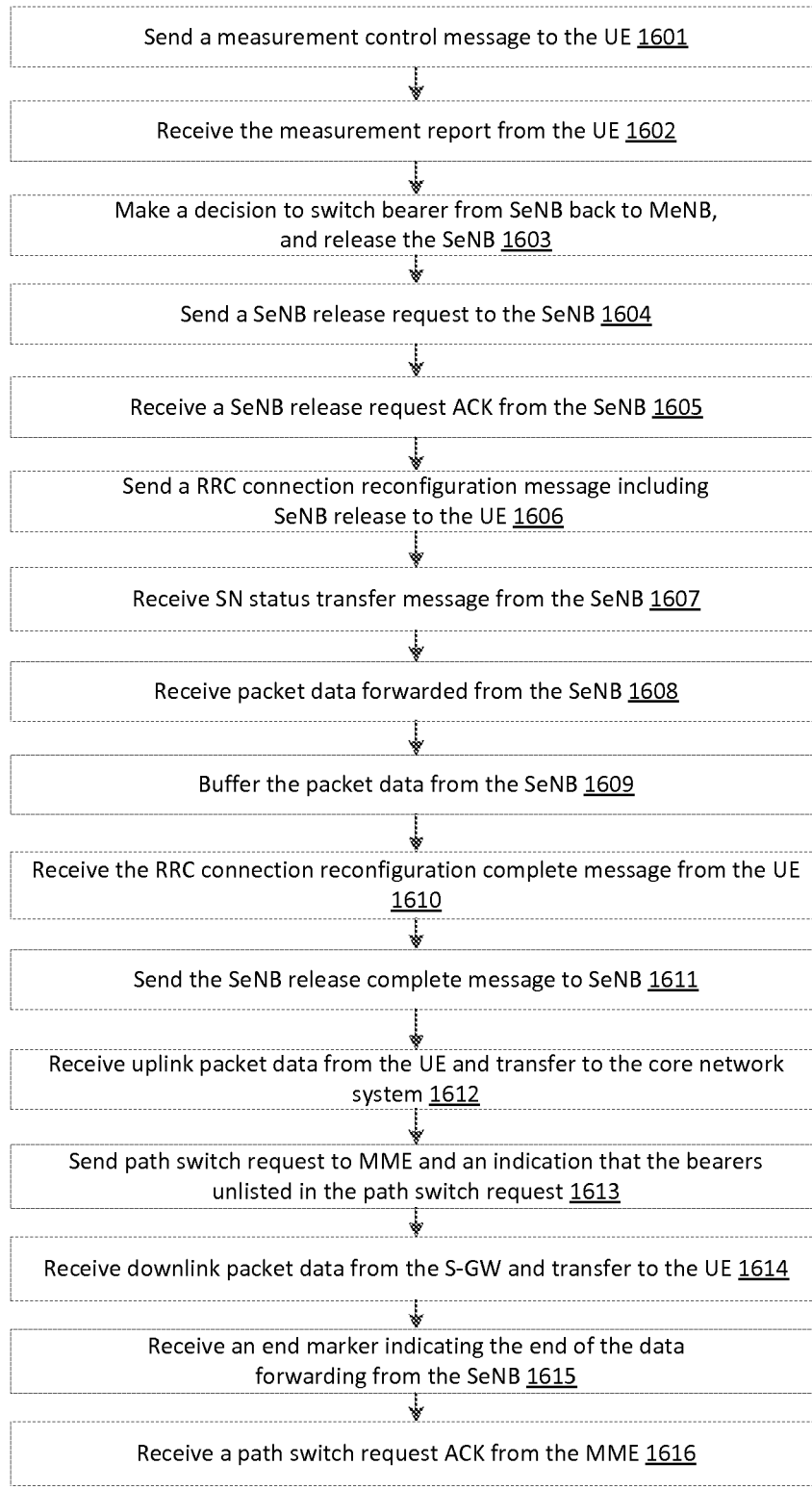
FIG. 16 illustrates an embodiment of a method for the MeNB of the wireless communication system to switch the bearer from the SeNB to the MeNB, based on the S1 approach.

FIG. 16 illustrates an embodiment of a method for the MeNB 202 of the wireless communication system 200 to release the SeNB resources by switching the bearer from the SeNB 203 to the MeNB 202, based on the S1 approach.

In some embodiments, based on the S1 approach, the UE 201 may communication with the core network system 204 over the DRB of the EPS bearer through the SeNB 203 for the small cell. Under the dual connectivity, the UE 201 may communicate another packet data with the MeNB 202 over another DRB of another EPS bearer or communicate the signalling with the MeNB 202 over the SRB.

As illustrated in FIG. 16, in some embodiments, the communication module 212 or other device of the MeNB 202 may transmit the message related to the measurement control to the UE 201. In some embodiments, the message may configure the UE measurement procedures according to area restriction information. Measurements provided by the MeNB 202 may assist the function controlling the UE's connection mobility. In response to the message, the UE 201 may perform the measurement procedures. In block 1602, the communication module 212 or other device may receive the measurement report from the UE 201. In block 1603, based on the measurement report, the communication module 212 or other device may make the decision of releasing the SeNB resources by switching the DRB from the SeNB 203 to the MeNB 202. This may happen under certain circumstances, such as when the UE 201 moving out of the coverage of the small cell. On the other hand, although not being illustrated in FIG. 16, it should be understood that the MeNB 202 may make the decision of not releasing the SeNB resources, for example, when the measurement report indicates that the radio quality in the small cell is not good enough.

In some embodiments, in response to the decision of releasing the SeNB resources, the communication module 212 or other device may send the request of releasing the SeNB resources to the SeNB 203, in block 1604. The request may be embodied as the SeNB release request or the small cell release request (not illustrated in FIG. 16), and may include, without limitation, information necessary for preparing the DRB switch, such as elements (IE) like cause for the SeNB release request or the small cell release, a list of E-RABs to be switched, characteristics of the DRB, UE C-RNTI in the small cell, UE security capabilities for S1 approach, security context for S1 approach, and/or others.

In block 1605, the communication module 212 or other device may receive the acknowledgement message from the SeNB 203, if the SeNB 203 decides that the SeNB release request or the small cell release request is acceptable. The acknowledgement message may be embodied as the SeNB release request ACK or the small cell release request ACK, and may include, without limitation, information such as the C-RNTI, the cause for the SeNB release or the small cell release, a list of admitted E-RABs, a list of not admitted E-RABs, a transparent container to be sent to the UE for SeNB release or the small cell release, and/or others.

In some embodiments, upon receipt of the acknowledgment message, the communication module 212 (e.g., RRC layer 2122) or other device may transmit to the UE 201 the message of reconfiguring the RRC connection to release the SeNB resources by switching the DRB from the small cell to the macro cell, in block 1606. The message may be embodied as, without limitation, a RRCconnectionreconfiguration message and may include the SeNB release information or the small cell release information (e.g., SeNB release information) to inform the UE 201 that the small cell is going to be released.

In some embodiments, before the SeNB 203 begins to deliver the buffered and in-transit packet data to the MeNB 202, the communication module 212 or other device may receive the SN status transfer message from the SeNB 203, in block 1607. In some embodiments, the SeNB 203 may convey uplink PDCP (packet data convergence protocol) SN receiver status and/or downlink PDCP SN transmitter status of E-RABs for which PDCP status preservation applies. The communication module 212 or other device may receive the packet data forwarded from the SeNB 203 in block 1608, and may buffer the packet data in the MeNB 202 in block 1609, for example, in the memory or the data storage of the MeNB 202.

After the UE 201 detaches from the SeNB 203, the communication module 212 (e.g., RRC layer 2122) or other device may receive, from the UE 201, the RRCconnectionreconfigurationcomplete message informing that the RRC connection reconfiguration has been completed and the SeNB resources have been successfully released, in block 1610. In block 1611, the communication module 212 or other device may transmit the SeNB release request complete message or the small cell release complete message (not illustrated in FIG. 16) to the SeNB 203.

When the UE 201 can access the macro cell over the DRB, based on the S1 approach, the communication module 212 or other device may receive the uplink packet data from the UE 201 and then transfer it to the core network system 204 over the uplink path of the EPS bearer in block 1612. In block 1613, the communication module 212 or other device may further transmit the path switch request to the MME 214 to request switching the downlink path of the EPS bearer from between the SeNB 203 and the core network system 204 to between the MeNB 202 and the core network system 204, wherein the DRB of the EPS bearer has already been switched from the SeNB 203 to the MeNB 202. The path switch request may include the list of the EPS bearer(s) whose DRB(s) have been switched. In some embodiments, the path switch request may further indicate to keep other bearer(s) unreleased, wherein the other bearer(s) may include those not listed in the request, such as the DRBs and/or the SRBs related to the MeNB 202. Alternatively, the MeNB 202 may send a separate request of keeping the other bearer(s) unreleased to the MME 214. In other embodiments, it may be the SeNB 203, rather than the MeNB 202, which may send the path switch request to the MME 214.

After the S-GW 224 modifies the downlink path of the EPS bearer to go through the MeNB 202, based on the S1 approach, the communication module 212 or other device may receive the downlink packet data from the core network system 204 and then transfer it to the UE 201 over the downlink path of the EPS bearer, in block 1614. In block 1615, the communication module 212 or other device may receive the End Marker from the SeNB 203, which may indicate the end of data forwarding from the SeNB 203 to the MeNB 202. In block 1616, the communication module 212 or other device may receive from MME 224 the acknowledgement message to the patch switch request, such as the path switch request ACK.

Other embodiments may implement other modifications and variations to on the method as depicted in FIG. 16. In some embodiments, it may be the SeNB 203 which may make the decision of releasing the SeNB resources. In such case, the SeNB release request or the small cell release request may be sent from the SeNB 203 to MeNB 202, rather than from the MeNB 202 to the SeNB 203, and the SeNB release request ACK or the small cell release ACK may be sent from the MeNB 202 to the SeNB 203, rather than from the SeNB 203 to the MeNB 202.

Figure 17:
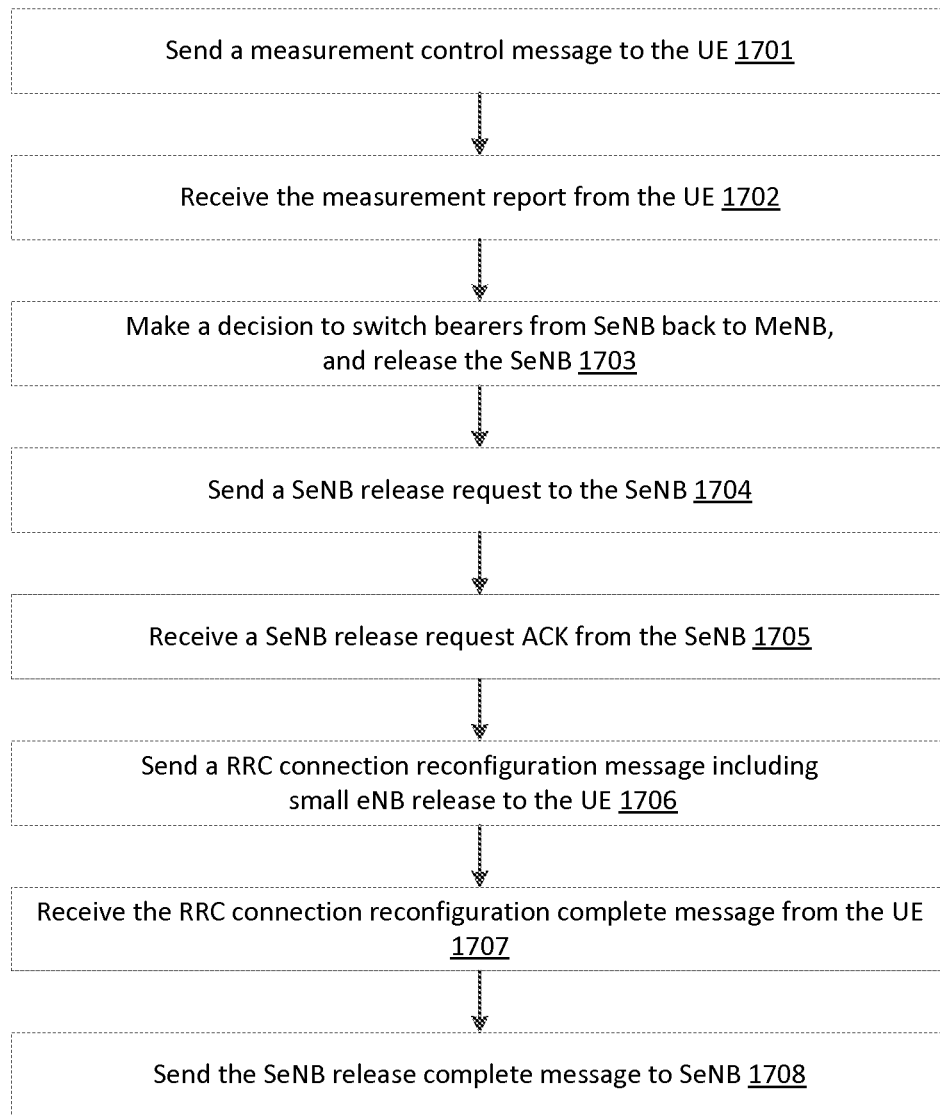
FIG. 17 illustrates an embodiment of a method for the MeNB of the wireless communication system to switch the bearer from the SeNB to the MeNB, based on the X2 approach.

FIG. 17 illustrates an embodiment of the method for the MeNB 202 of the wireless communication system 200 to release the SeNB resources by switching the bearer from the SeNB 203 to the MeNB 202, based on the X2 approach.

In some embodiments, the method of FIG. 17 may be similar as that of FIG. 16, for example, blocks 1701 to 1706 may be similar as the blocks 1601 to 1606, and blocks 1707 to 1708 may be similar as blocks 1610 to 1611. However, due to the X2 approach, before releasing the SeNB resources, the UE 201 may receive/transmit the packet data from/to SeNB 203 over the DRB of the EPS bearer, and the SeNB 203 may transmit/receive the packet data to/from the core network system 204 through the MeNB 202. In view of this, based on the X2 approach, there may be no need for the SeNB 203 to deliver the buffered and in transit packet data to the MeNB 202.

In some embodiments, after the completion of the RRC connection reconfiguration to switch the DRB from the SeNB 203 to the MeNB 202, the transmissions of the packet data between the UE 201 and the core network system 204 over the EPS bearer may only need to go through the MeNB 202. In this case, there may be no need to request the core network system 204 to modify the downlink path of the EPS bearer from the SeNB 203 to the MeNB 202.

Other embodiments may implement other modifications and variations to on the method as depicted in FIG. 17. In some embodiments, it may be the SeNB 203 which may make the decision of releasing the SeNB resources. In such case, the SeNB resources release request or the small cell release request (not illustrated in FIG. 17) may be sent from the SeNB 203 to MeNB 202, rather than from the MeNB 202 to the SeNB 203, and the SeNB release request ACK or the small cell release ACK (not illustrated in FIG. 17) may be sent from the MeNB 202 to the SeNB 203, rather than from the SeNB 203 to the MeNB 202.

Figure 18:
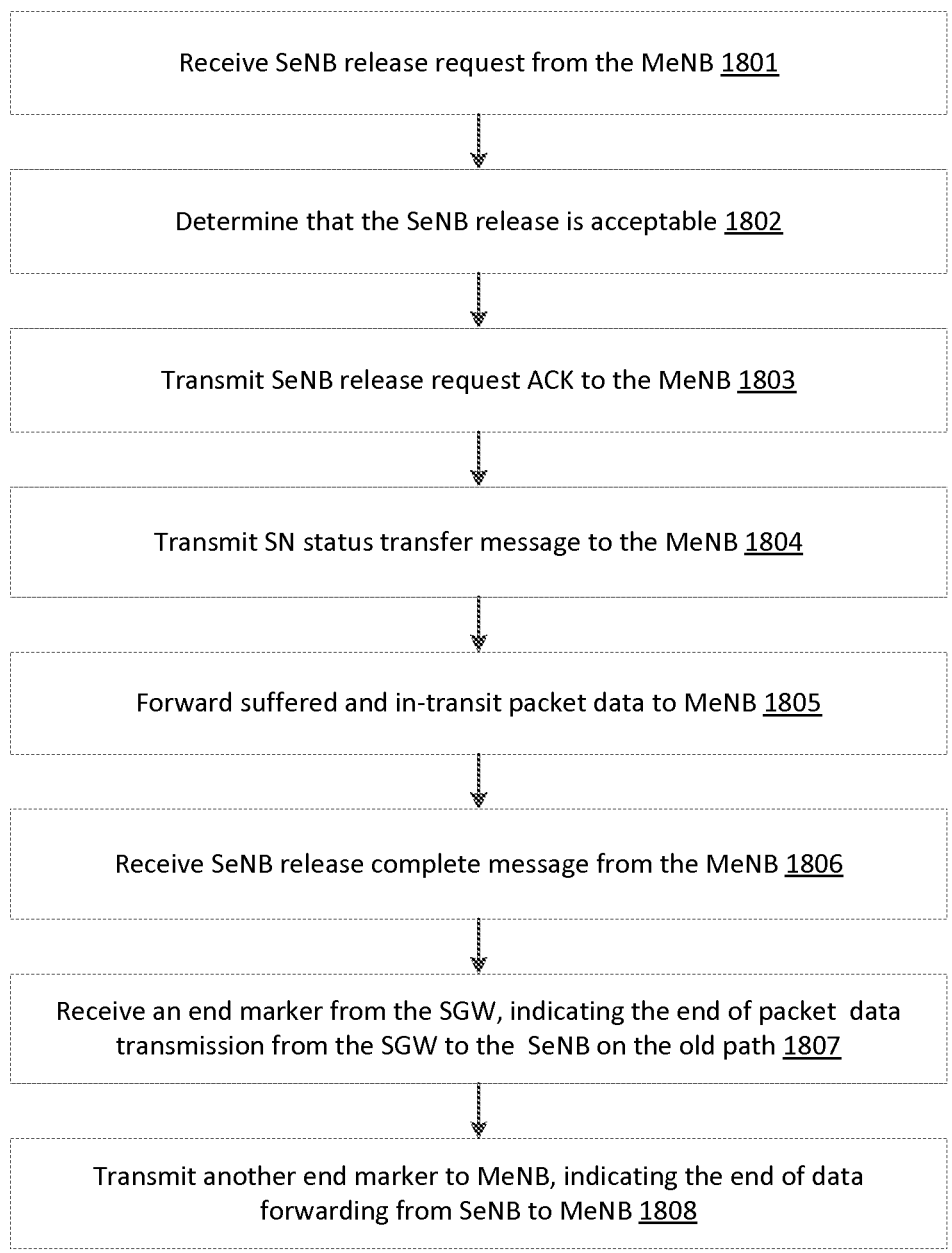
FIG. 18 illustrates an embodiment of a method for the SeNB of the wireless communication system to switch the bearer from the SeNB to the MeNB, based on the S1 approach.

FIG. 18 illustrates an embodiment of a method for the SeNB 203 of the wireless communication system 200 to release the SeNB resources by switching the bearer from the SeNB 203 to the MeNB 202, based on the S1 approach.

In some embodiments, based on the S1 approach, the UE 201 may communication with the core network system 204 over the DRB of the EPS bearer through the SeNB 203 for the small cell. Under the dual connectivity, the UE 201 may communicate another packet data with the MeNB 202 over another DRB of another EPS bearer or communicate a signalling with the MeNB 202 over a SRB. In certain circumstances, such as when the UE 201 moving out of the coverage of the small cell back, it may be decided to release the SeNB resources by switching the DRB from the small cell to the macro cell.

In block 1801, the communication module 213 or other device of the SeNB 203 may receive from the MeNB 202 the request of releasing the SeNB resources. The request may be embodied as a SeNB release request or the small cell release request, and may include, without limitation, information necessary for preparing the DRB switch, such as elements (IE) like cause for the SeNB release or the small cell release, a list of E-RABs to be switched, characterisitics of the DRB, UE C-RNTI in the small cell, UE security capabilities for S1 approach, security context for S1 approach, and/or others.

In block 1802, the communication module 213 or other device of the SeNB 203 may perform the admission control to determine that the request is acceptable. However, although not being illustrated in FIG. 18, in certain circumstances, it may be determined that the request is unacceptable. In block 1803, in response to the determination that the SeNB release request or the small cell release request (not illustrated in FIG. 18) is acceptable, the communication module 213 or other device may transmit the SeNB release request ACK or the small cell release request ACK to the MeNB 202. The SeNB release request ACK or the small cell release request ACK may include, without limitation, information such as the C-RNTI, the cause for the SeNB release or the small cell release, a list of admitted E-RABs, a list of not admitted E-RABs, a transparent container to be sent to the UE for the SeNB release or the small cell release, and/or others.

Before delivering the buffered and in-transmit packet data, the communication module 213 or other device may transfer SN status message to the MeNB 202, in block 1804. In some embodiments, the SeNB 203 may transfer uplink PDCP (packet data convergence protocol) SN receiver status and/or downlink PDCP SN transmitter status of E-RABs for which PDCP status preservation applies. In block 1805, the communication module 213 or other device may deliver the buffered and in transit packet data to the MeNB 202.

In some embodiments, after the UE 201 reconfigures the RRC connection to detach from the SeNB 203 in order to release the SeNB resources, the communication module 213 or other device may receive the SeNB release complete message or the small cell release complete message from the MeNB 202.

In some embodiments, after the downlink path of the EPS bearer is switched from between the SeNB 203 and the core network system 204 to between the MeNB 202 and the core network system 204, the communication module 213 or other device may receive the End Marker from the S-GW 224 indicating the end of downlink packet data transmission on the old path, in block 1807. In block 1808, the communication module 213 may send the another End Marker to the MeNB 202 indicating the end of data forwarding from the SeNB 203 to the MeNB 202.

Other embodiments may implement other modifications and variations to on the method as depicted in FIG. 18. In some embodiments, it may be the SeNB 203 which may make the decision of releasing the SeNB resources. In such case, the SeNB release request or the small cell release request may be sent from the SeNB 203 to MeNB 202, rather than from the MeNB 202 to the SeNB 203, and the SeNB release request ACK or the small cell release ACK may be sent from the MeNB 202 to the SeNB 203, rather than from the SeNB 203 to the MeNB 202. In some embodiments, the communication module 213 or other device may further transmit to the MME 214 the path switch request of switching the downlink path of the EPS bearer from between the SeNB 203 and the core network system 204 to between the MeNB 202 and the core network system 204, wherein the DRB of the EPS bearer has already been switched from the SeNB 203 to the MeNB 202. The path switch request may include the list of the EPS bearer(s) whose DRB(s) have been switched. In some embodiments, the path switch request may further indicate to keep other bearer(s) unreleased, wherein the other bearer(s) may include those not listed in the request, such as the DRBs and/or the SRBs related to the MeNB 202.

Figure 19:
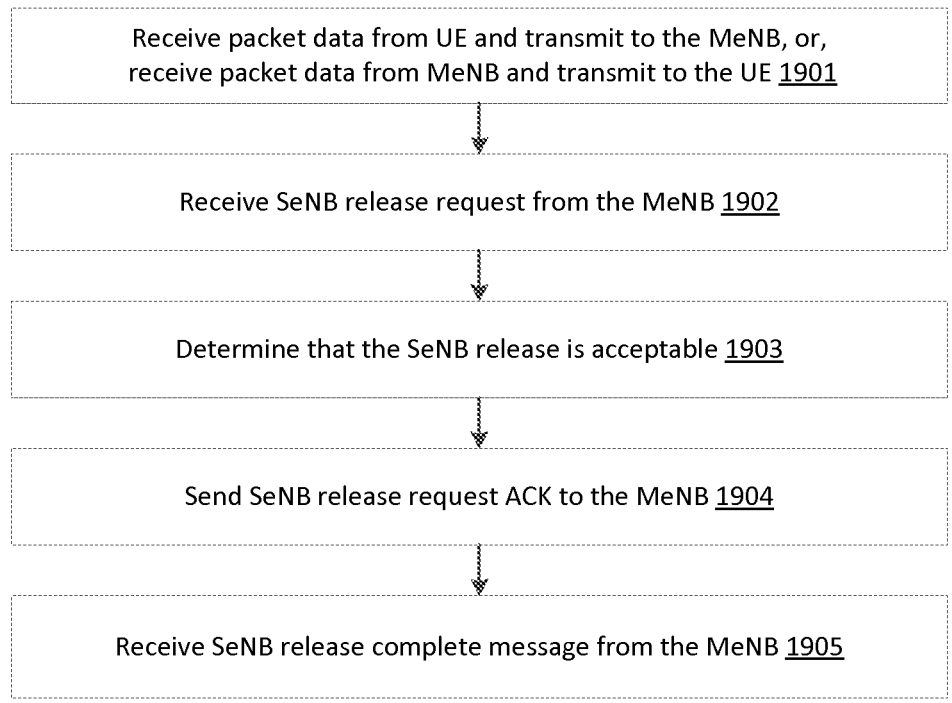
FIG. 19 illustrates an embodiment of a method for the SeNB of the wireless communication system to switch the bearer from the SeNB to the MeNB, based on the X2 approach.

FIG. 19 illustrates an embodiment of a method for the SeNB 203 of the wireless communication system 200 to release the SeNB resources by switching the bearer from the SeNB 203 to the MeNB 202, based on the X2 approach.

In some embodiments, the method of FIG. 19 may be similar as that of FIG. 18. For example, blocks 1902 to 1904 may be similar as the blocks 1801 to 1803, and block 1905 may be similar as block 1806. However, due to the X2 approach, before releasing the SeNB resources, the communication module 213 or other device may receive/transmit the packet data from/to UE 201 over the DRB of the EPS bearer, and then may communicate the packet data with the core network system 204 through the MeNB 202, in block 1901. In view of this, based on the X2 approach, there may be no need for the SeNB 203 to deliver the buffered and in transit packet data to the MeNB 202.

Moreover, in some embodiments, after the completion of the RRC connection reconfiguration to switch the DRB from the SeNB 203 to the MeNB 202, the transmissions of the packet data between the UE 201 and the core network system 204 over the EPS bearer may only need to go through the MeNB 202. In this way, there may be no need to request the core network system 204 to modify the downlink path of the EPS bearer from the SeNB 203 to the MeNB 202.

Other embodiments may implement other modifications and variations to on the method as depicted in FIG. 19. In some embodiments, it may be the SeNB 203 which may make the decision of releasing the SeNB resources. In such case, the SeNB resources release request or the small cell release request (not illustrated in FIG. 19) may be sent from the SeNB 203 to MeNB 202, rather than from the MeNB 202 to the SeNB 203, and the SeNB resources release request ACK or the small cell release request ACK (not illustrated in FIG. 19) may be sent from the MeNB 202 to the SeNB 203, rather than from the SeNB 203 to the MeNB 202.

Figure 20:
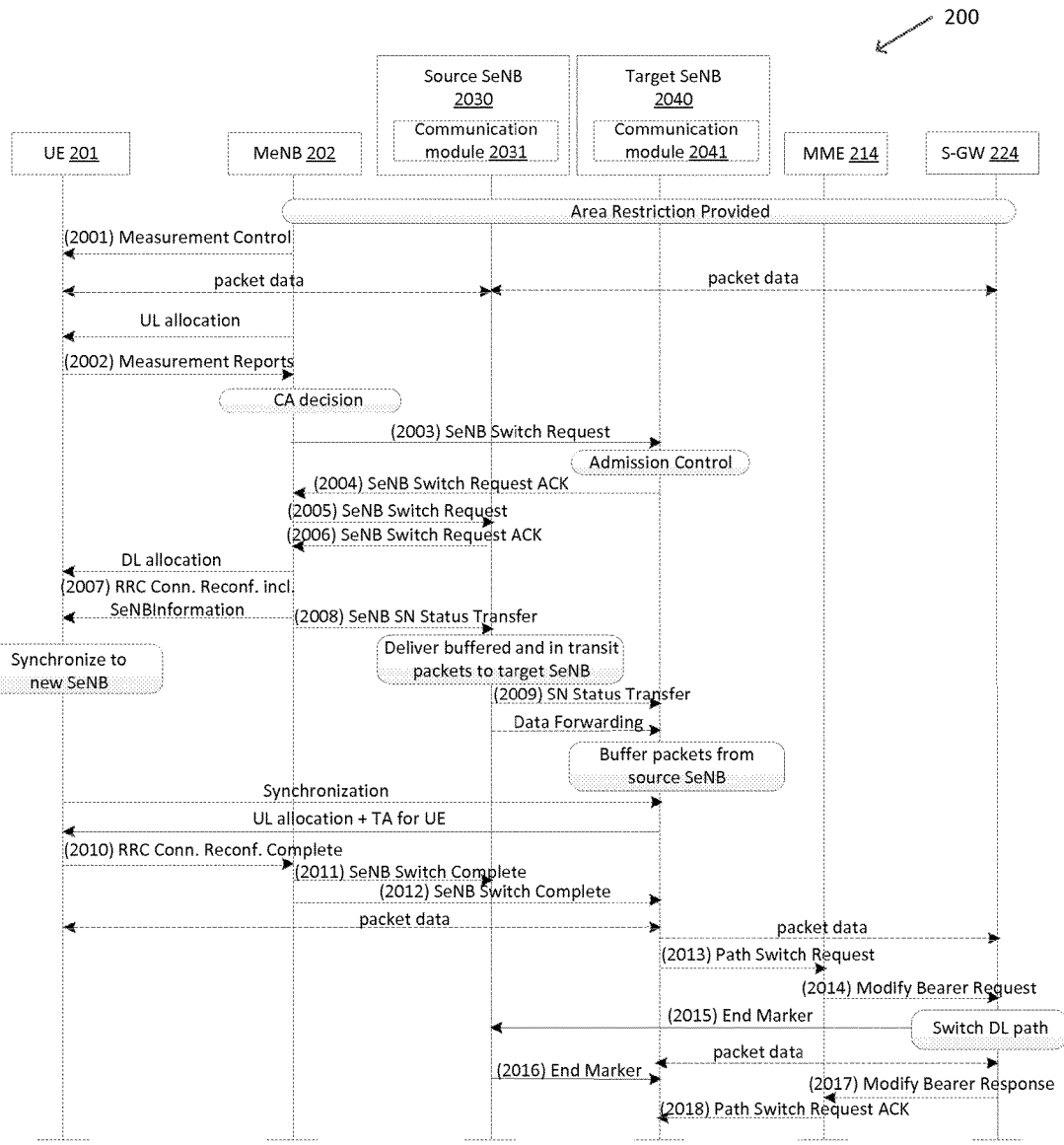
FIG. 20 illustrates an embodiment of a signalling procedure for the wireless communication system to switch a bearer from a source SeNB to a target SeNB, based on the S1 approach.

FIG. 20 illustrates an embodiment of a signalling procedure for the wireless communication system 200 to switch the SeNB resources by switching a bearer from a source SeNB to a target SeNB, based on the S1 approach.

As illustrated in FIG. 20, the wireless communication system 200 may comprise the UE 201, the MeNB 202, a source SeNB 2030 for a source small cell, a target SeNB 2040 for a target small cell, and the core network system 204 made up by the MME 214, the S-GW 224 and others. In some embodiments, based on the S1 approach, the UE 201 may be dual-connected with the MeNB 202 and the source SeNB 2030. Similarly as the SeNB 203, the source SeNB 2030 may include a communication module 2031, and/or others. The communication module 2031 may receive or transmit a signalling/packet from/to the UE 201, MeNB 202, target SeNB 2040 and/or the core network system 204 of the wireless communication system 200. In some embodiments, the communication module 2031 may further generate, process and/or control the signalling/packet and/or other communications from/to the source SeNB 2030. Details about functionalities of the communication module 2031 may be provided in the following descriptions. Although not being illustrated in FIG. 20, the communication module 2031 may further include several layer implementations, such as a physical layer module, a L2 layer module, a radio resource communication (RRC) layer module, a non-access stratum (NAS) layer module, and/or others.

Similarly, the target SeNB 2040 may include a communication module 2041, and/or others. The communication module 2041 may receive or transmit a signalling/packet from/to the UE 201, MeNB 202, source SeNB 2030 and/or the core network system 204 of the wireless communication system 200. In some embodiments, the communication module 2041 may further generate, process and/or control the signalling/packet and/or other communications from/to the source SeNB 2030. Details about functionalities of the communication module 2041 may be provided in the following descriptions. Although not being illustrated in FIG. 20, the communication module 2041 may further include several layer implementations, such as a physical layer module, a L2 layer module, a radio resource communication (RRC) layer module, a non-access stratum (NAS) layer module, and/or others.

In some embodiments, based on the S1 approach, the UE 201 may communicate packet data from/to the source SeNB 2030 for the source small cell over a DRB of an EPS bearer. Under the dual-connectivity, the UE 201 may communicate another packet data from/to the MeNB 202 on another DRB of another EPS bearer, or communicate signalling with the MeNB 202 on a SRB.

The MeNB 202 may transmit a message related to measurement control to the UE 201 (signalling 2001). In some embodiments, the message may configure the UE measurement procedures according to area restriction information. Measurements provided by the MeNB 202 may assist the function controlling the UE's connection mobility. In response to the message, the UE 201 may perform the measurement procedures and transmit a measurement report to the MeNB 202 (signalling 2002).

Based on the measurement report, the MeNB 202 may make a decision of switching the SeNB resources by switching the DRB from the source SeNB 2030 to the target SeNB 2040. This may happen under certain circumstances, such as when the UE 201 moving from the source small cell to the target small cell. As illustrated in FIG. 20, the decision may be called as a carrier aggregation (CA) decision. On the other hand, although not being illustrated in FIG. 20, it should be understood that the MeNB 202 may make a decision of not switching the SeNB resources, for example, when the measurement report indicates that the radio quality in the source small cell is good enough.

In response to the decision of switching the SeNB resources, the MeNB 202 may send a request of switching the SeNB resources to the target SeNB 2040 for the target small cell (signalling 2003), as well as to the source SeNB 2040 for the source small cell (signalling 2005). The request may be embodied as a SeNB switch request or a small cell switch request (not illustrated in FIG. 20), and may include, without limitation, information necessary for preparing the DRB switch, such as elements (IE) like TYPE field indicating whether the SeNB receiving the message may add the DRB (i.e., the target SeNB) or release the DRB (i.e., the source SeNB), cause for the SeNB switch or the small cell switch, a list of E-RABs to be setup or released, characteristics of the DRB (such as DRB parameters, TNL address information, and/or others), a UE C-RNTI in the source small cell or the target small cell, UE security capabilities for S1 approach, security context for S1 approach, and/or others.

In response to the SeNB switch request or the small cell switch request, the target SeNB 2040 may perform an admission control to determine whether the request is acceptable or not, namely, whether it is admittable to add the DRB into the target small cell. In response to a determination that the request is acceptable, the target SeNB 2040 may send a message to the MeNB 202, such as a SeNB switch request ACK or a small cell switch request ACK (not illustrated in FIG. 20) (signalling 2004). The SeNB switch request ACK or the small cell switch request ACK may include, without limitation, information such as the C-RNTI, the cause for the SeNB switch or the small cell switch, a list of admitted E-RABs including TNL address information for the respective E-RAB, a list of not admitted E-RABs, a transparent container to be sent to the UE for SeNB release or the small cell release, and/or others.

On the other hand, the source SeNB 2030 may perform another admission control to determine whether the SeNB switch request or the small cell switch request is acceptable or not, namely, whether it is admittable to release the DRB from the source small cell. In response to a determination that the request is acceptable, the source SeNB 2030 may send a message to the MeNB 202, such as a SeNB switch request ACK or a small cell switch request ACK (not illustrated in FIG. 20) (signalling 2006). The SeNB switch request ACK or the small cell switch request ACK may include, without limitation, information such as the C-RNTI, the cause for the SeNB switch or the small cell switch, a list of admitted E-RABs including TNL address information for the respective E-RAB, a list of unadmitted E-RABs, a transparent container to be sent to the UE for the SeNB release or the small cell release, and/or others.

Upon receipt of the acknowledgment messages from the source SeNB 2030 and the target SeNB 2040, the MeNB 202 may transmit to the UE 201 a message of reconfiguring the RRC connection to switch the SeNB resources by switching the DRB from the source small cell to the target small cell (signalling 2007). The request may be embodied as, without limitation, a RRCconnectionreconfiguration message and may include information necessary for switching the small cell, such as the sources SeNB information, the source small cell information, the target SeNB information, target small cell information and/or others.

In some embodiments, in order to trigger the delivery of buffered and in-transit packet data from the source SeNB 2030 to the target SeNB 2040, the MeNB 202 may transmit a SeNB SN status transfer message or a small cell SN status transfer message (not illustrated in FIG. 20) to the source SeNB 2030 to request it to transfer the buffered and in-transit packet data to the target SeNB 2040 (signalling 2008). The SeNB SN status transfer message or the small cell SN status transfer message may include, without limitation, the UE RNTI in the target small cell, the target SeNB information such as a target SeNB identifier, the target small cell information such as a target small cell identifier, and others. Then, the source SeNB 2030 may start to deliver the buffered and in-transit packet data to the target SeNB 2040. Before forwarding the packet data, the source SeNB 2030 may transfer a SN status message to the target SeNB 2040 (signalling 2009). In some embodiments, the source SeNB 2030 may convey uplink PDCP (packet data convergence protocol) SN receiver status and/or downlink PDCP SN transmitter status of E-RABs for which PDCP status preservation applies. The target SeNB 2040 may buffer the packet data received from the SeNB 203, for example, in a memory or data storage of the target SeNB 2040.

In some embodiments, based on the information in the RRCconnectionreconfiguration message, the UE 201 may reconfigure the RRC connection to detach from the source SeNB 2030 and synchronize to the target SeNB 2040 in order to switch from the source SeNB 2030 to the target SeNB 2040. For example, the UE 201 may perform the synchronization to the target SeNB 2040 and access the target small cell via RACH, following a contention-free or contention-based procedure depending on whether a dedicated preamble was indicated or not.

After synchronizing with the target SeNB 2040 and being able to access the target small cell, the UE 201 may transmit a RRC connection reconfiguration complete message to the MeNB 202 to inform that the RRC connection reconfiguration has been completed and the SeNB resources or the small cell have been successfully switched (signalling 2010). The MeNB 202 may then transmit a SeNB switch complete message or a small cell switch complete message (not illustrated in FIG. 20) to the source SeNB 2030 (signalling 2011) and the target SeNB 2040 (signalling 2012). Alternatively, the UE 201 may send the RRCconnectionreconfigurationcomplete message to the MeNB 202 as well as the target SeNB 2040, so that the SeNB switch complete message or the small cell switch complete message from the MeNB 202 to the target SeNB 2040 can be omitted.

When the UE 201 can access the target small cell, based on the S1 approach, it may transmit an uplink packet to the target SeNB 2040 over the DRB, which may be transferred by the target SeNB 2040 to the core network system 204. The target SeNB 2040 may further transmit a path switch request to the MME 214 to request switching a downlink path of the EPS bearer from between the source SeNB 2030 and the core network system 204 to between the target SeNB 2040 and the core network system 204 (signalling 2013), wherein the DRB of the EPS bearer has already been switched from the source SeNB 2030 to the target SeNB 2040. The path switch request may include a list of the EPS bearer(s) whose DRB(s) have been switched. In some embodiments, the path switch request may further indicate to keep other bearer(s) unreleased, wherein the other bearer(s) may include those not listed in the request, such as the DRBs and/or the SRBs related to the MeNB 202. Alternatively, the MeNB 202 may send a separate request of keeping the other bearer(s) unreleased to the MME 214. In other embodiments, it may be the MeNB 202 rather than the target SeNB 2040 which may send the path switch request to the MME 214.

Upon receipt of the path switch request, the MME 214 may transmit a modify bearer request to the S-GW 224 to request modifying the downlink path of the listed EPS bearer(s) to go through the target SeNB 2040 (signalling 2014). In response to the request, the S-GW 224 may switch the downlink path, so that the downlink packet data can be transmitted from the core network system 204 to the UE 201 through the target SeNB 2040, based on the S1 approach. In some embodiments, the S-GW 224 may further send an End Marker to the source SeNB 2030 indicating an end of downlink packet data transmission on the old path (signalling 2015). The source SeNB 2030 may send an End Marker to the target SeNB 2040 indicating an end of data forwarding from the source SeNB 2030 to the target SeNB 2040 (signalling 2016).

After the completion of the bearer modification, the S-GW 224 may send with a modify bearer response to the MME 214 (signalling 2017), which may trigger the MME 214 to transmit an acknowledgement message to the target SeNB 2040, such as a path switch request ACK (signalling 2018).

Other embodiments may implement other modifications and variations to on the method as depicted in FIG. 20. In some embodiments, it may be the source SeNB 2030 rather than the MeNB 202 which makes the decision of switching the SeNB resources or the small cell. In such case, the SeNB switch request or the small cell switch request may be sent from the source SeNB 2030 to MeNB 202 as well as the target SeNB 2040, and the SeNB switch request ACK or the small cell switch request ACK may be sent from the MeNB 202 and the target SeNB 2040 to the source SeNB 2030.

Figure 21:
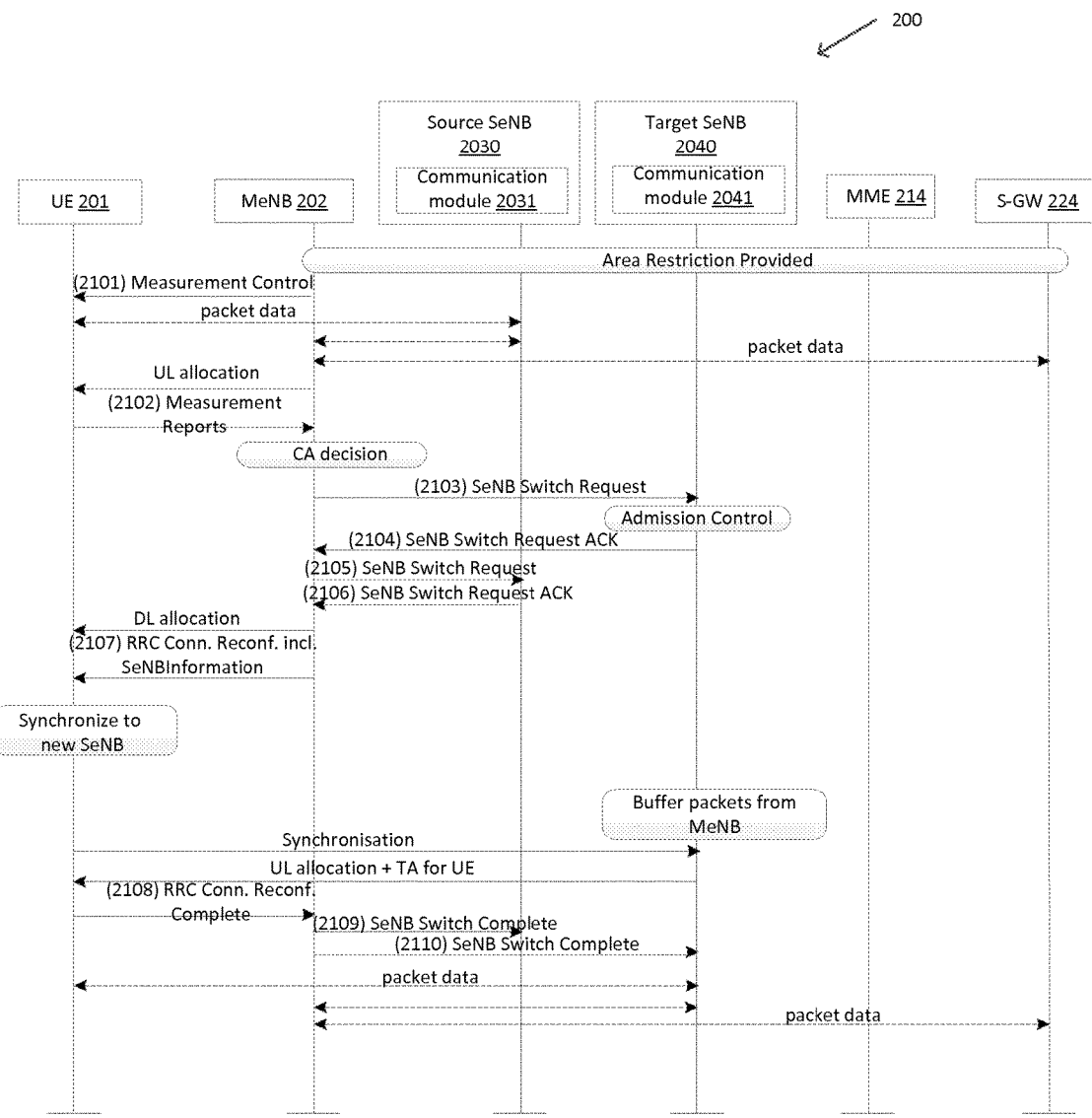
FIG. 21 illustrates an embodiment of a signalling procedure for the wireless communication system to switch the bearer from the source SeNB to the target SeNB, based on the X2 approach.

FIG. 21 illustrates an embodiment of a signalling procedure for the wireless communication system 200 to switch the SeNB resources by switching the bearer from the source SeNB 2030 to the target SeNB 2040, based on the X2 approach.

In some embodiments, the signalling procedure of FIG. 21 may be similar as that of FIG. 20. For example, signalling 2101 to 2107 may be similar as signalling 2001 to 2007, and signalling 2109 to 2111 may be similar as signalling 2010 to 2012. However, due to the X2 approach, before switching the DRB of the EPS bearer from the source SeNB 2030 to the target SeNB 2040, the source SeNB 2030 may communicate the packet data with the core network system 204 through the MeNB 202. Moreover, in some embodiments, after the completion of the RRC connection reconfiguration to switch the DRB from the source SeNB 2030 to the target SeNB 2040, the transmissions of the packet data between the target SeNB 2040 and the core network system 204 over the EPS bearer may still need to go through the MeNB 202. In this way, there may be no need to request the core network system 204 to modify the downlink path of the EPS bearer from the SeNB 2030 to the target SeNB 2040. In other words, the signalling 2013 to 2018 in FIG. 20 may be omitted from the FIG. 21.

Other embodiments may implement other modifications and variations to on the method as depicted in FIG. 21. In some embodiments, it may be the source SeNB 2030 rather than the MeNB 202 which makes the decision of switching the SeNB resources or the small cell. In such case, the SeNB release request or the small cell release request may be sent from the source SeNB 2030 to MeNB 202 as well as the target SeNB 2040, and the the SeNB release request ACK or the small cell release request ACK may be sent from the MeNB 202 and the target SeNB 2040 to the source SeNB 2030.

Figure 22:
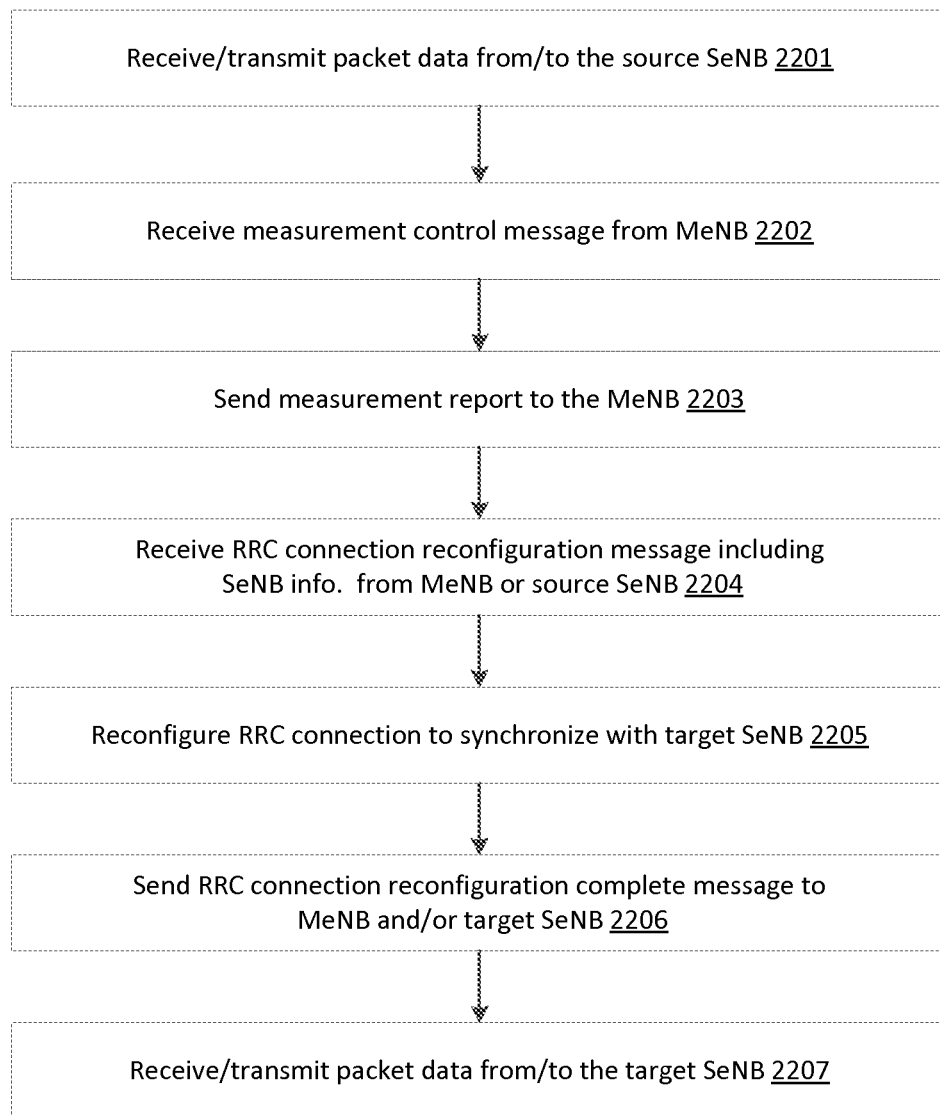
FIG. 22 illustrates an embodiment of a method for the UE of the wireless communication system to switch the bearer from the source SeNB to the target SeNB.

FIG. 22 illustrates an embodiment of a method for the UE 201 of the wireless communication system 200 to switch the SeNB resources or the small cell by switching the bearer from the source SeNB 2030 to the target SeNB 2040.

In some embodiments, in block 2201, the communication module 211 or other device of the UE 201 may communicate packet data from/to the source SeNB 2030 of the source small cell over the DRB of the EPS bearer. Under the dual connectivity, the communication module 211 or other device may communicate another packet data from/to the MeNB 202 over another DRB of another EPS bearer or communicate the signalling with the MeNB 202 over the SRB.

In block 2202, the communication module 211 or other device may receive a message related to the measurement control from the MeNB 202. In some embodiments, the message may configure the UE measurement procedures according to area restriction information. Measurements provided by the MeNB 202 may assist the function controlling the UE's connection mobility. In response to the message, the communication module 211 or other device of UE 201 may perform the measurement and may transmit the measurement report to the MeNB 202 in block 2203. Based on the measurement report, the MeNB 202 or source SeNB 2030 may make the decision of switching the SeNB resources or the small cell by switching the DRB from the source SeNB 2030 for the source small cell to the target SeNB 2040 for the target small cell. This may happen under certain circumstances, such as when the UE 201 moving from the source small cell to the target small cell. On the other hand, although not being illustrated in FIG. 22, it should be understood that the MeNB 202 may make a decision of not switching the SeNB resources or the small cell, for example, when the measurement report indicates that the radio quality in the source small cell is good enough.

In response to the decision of switching the SeNB resources or the small cell, the communication module 211 (e.g., RRC layer) or other device may receive, from the MeNB 202, the message of reconfiguring the RRC connection to switch the SeNB resources or the small cell by switching the DRB from the source SeNB 2030 to the target SeNB 2040, in block 2204. The request may be embodied as, without limitation, a RRCconnectionreconfiguration message and may include information necessary for switching the SeNB resources or the small cell, such as the source SeNB information, source small cell information, the target SeNB information, the target small cell information, and/or others.

In some embodiments, based on the information in the RRCconnectionreconfiguration message, the communication module 211 or other device may reconfigure the RRC connection to detach from the source SeNB 2030 and synchronize with the target SeNB 2040 in order to switch the small cell, in block 2205. For example, the UE 201 may perform the synchronization to the target SeNB 2040 and access the target small cell via RACH, following a contention-free or contention-based procedure depending on whether a dedicated preamble was indicated or not.

After synchronizing with the target SeNB 2040 and being able to access the target small cell, the communication module 211 (e.g., RRC layer) or other device may transmit the RRCconnectionreconfigurationcomplete message to the MeNB 202 and/or the target SeNB 2040 to inform that the RRC connection reconfiguration has been completed and the SeNB resources or the small cell has been successfully switched, in block 2206. In block 2207, the communication module 211 or other device may communicate the packet data with the core network system 204 over the DRB through the target SeNB 2040.

Figure 23:
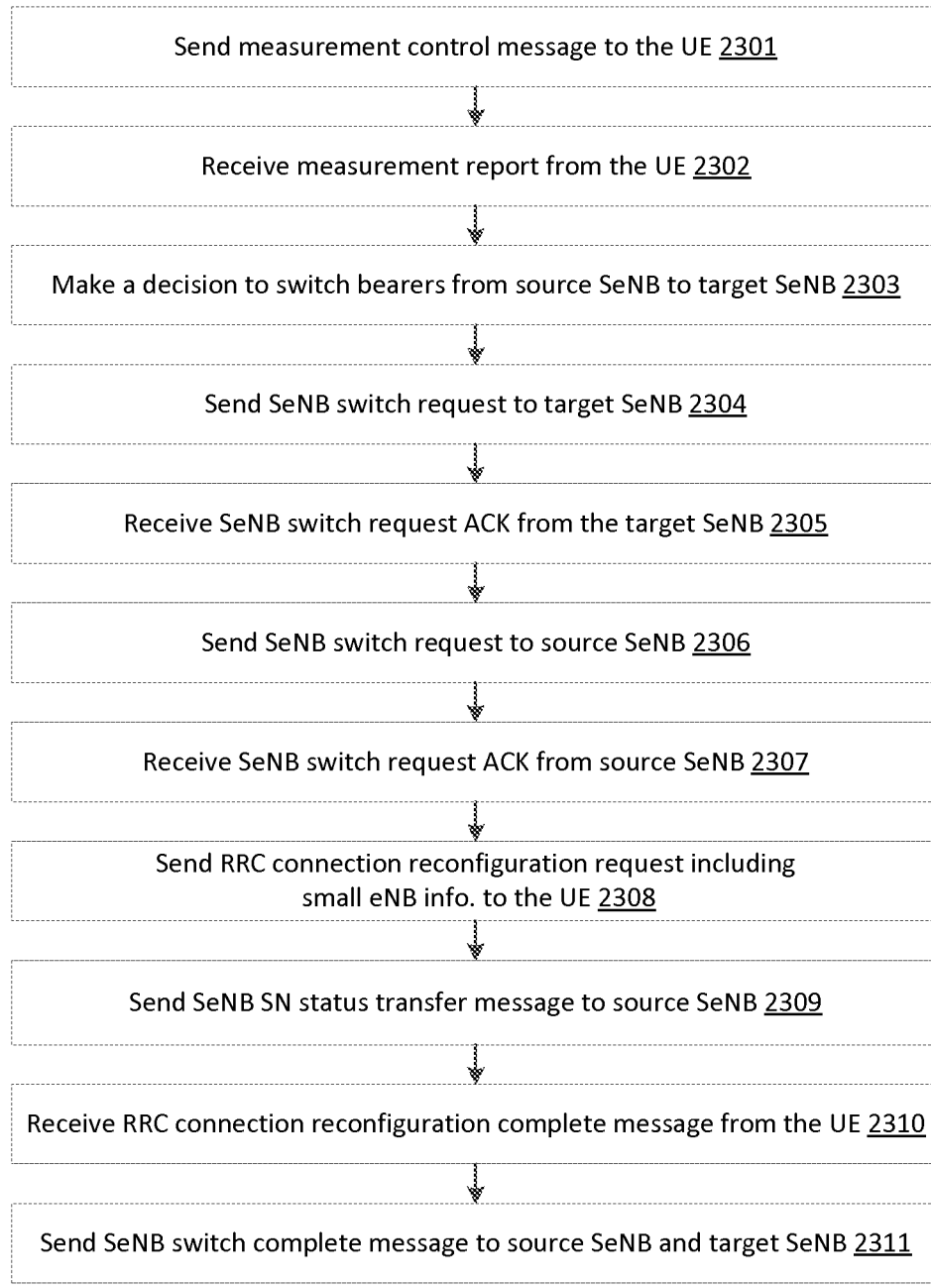
FIG. 23 illustrates an embodiment of a method for the MeNB of the wireless communication system to switch the bearer from the source SeNB to the target SeNB, based on the S1 approach.

FIG. 23 illustrates an embodiment of a method for the MeNB 202 of the wireless communication system 200 to switch the SeNB resources or the small cell by switching the bearer from the source SeNB 2030 to the target SeNB 2040, based on the S1 approach.

In some embodiments, based on the S1 approach, the UE 201 may communicate packet data with the core network system 204 over the DRB of the EPS bearer through the source SeNB 2030 of the source small cell. Under the dual connectivity, the UE 201 may communicate another packet data with the MeNB 202 over another DRB of another EPS bearer or communicate the signalling with the MeNB 202 over the SRB.

As illustrated in FIG. 23, in some embodiments, the communication module 212 or other device of the MeNB 202 may transmit the message related to measurement control to the UE 201, in block 2301. In some embodiments, the message may configure the UE measurement procedures according to area restriction information. Measurements provided by the MeNB 202 may assist the function controlling the UE's connection mobility. In block 2302, the communication module 212 or other device may receive the measurement report from the UE 201. In block 2303, based on the measurement report, the control module 222 of the MeNB 202 may make the decision of switching the SeNB resources or the small cell by switching the DRB from the source small cell to the target small cell. This may happen under certain circumstances, such as when the UE 201 moving from the source small cell to the target small cell. Although not being illustrated in FIG. 23, based on the measurement report, the MeNB 202 may make a different decision, i.e., not switching the small cell.

In some embodiments, in response to the decision of switching the SeNB resources or the small cell, the communication module 212 or other device may send the request of switching the SeNB resources or the small cell to the target SeNB 2040, in block 2304. The request may be embodied as the SeNB switch request or the small cell switch request (not illustrated in FIG. 23), and may include, without limitation, information necessary for preparing the DRB switch, such as elements (IE) like TYPE field indicating whether the SeNB receiving the message may add the DRB (i.e., the target SeNB) or release the DRB (i.e., the source SeNB), cause for the SeNB switch or the small cell switch, a list of E-RABs to be setup or released, characteristics of the E-RABs (such as E-RAB parameters, TNL address information, and/or others), a UE C-RNTI in the source small cell or the target small cell, UE security capabilities for S1 approach, security context for S1 approach, and/or others.

In some embodiments, in block 2305, the communication module 212 or other device may receive the message from the target SeNB 2040, if the target SeNB 2040 decides that the SeNB switch request or the small cell switch request (not illustrated in FIG. 23) is acceptable. The message may be embodied as the SeNB switch request ACK or the small cell switch request ACK (not illustrated in FIG. 23), and may include, without limitation, information such as the C-RNTI, the cause for the SeNB switch or the small cell switch, a list of admitted E-RABs including TNL address information for the respective E-RAB, a list of not admitted E-RABs, a transparent container to be sent to the UE for the SeNB release or the small cell release, and/or others.

In some embodiments, on the other hand, the communication module 212 or other device may send the SeNB switch request or the small cell switch request (not illustrated in FIG. 23) to the source SeNB 2030 in block 2306, and may receive the SeNB switch request ACK or the small cell switch request ACK (not illustrated in FIG. 23) from the source SeNB 2030 in block 2307.

In some embodiments, upon receipt of the acknowledgment messages from the source SeNB 2030 and the target SeNB 2040, the communication module 212 (e.g., RRC layer) or other device may transmit to the UE 201 the message of reconfiguring the RRC connection to switch the small cell by switching the DRB from the source SeNB 2030 to the target SeNB 2040, in block 2308. The request may be embodied as, without limitation, a RRCconnectionreconfiguration message and may include information necessary for switching the SeNB resources or the small cell, such as the source SeNB information, the source small cell information, the target SeNB information, the target small cell information and/or others.

In some embodiments, in order to trigger the delivery of buffered and in-transmit packet data from the source SeNB 2030 to the target SeNB 2040, the communication module 212 or other device may transmit the SeNB SN status transfer message or the small cell SN status transfer message (not illustrated in FIG. 23) to the source SeNB 2030 to request the transfer of the buffered and in-transit packet data to the target SeNB 2040, in block 2309. The SeNB SN status transfer message or the small cell SN status transfer message may include, without limitation, the UE RNTI in the target small cell, the target small cell information such as the target small cell identifier, the target SeNB information such as the target SeNB identifier, and/or others.

After UE 201 successfully synchronizes with the target SeNB 2040 and is able to access the target small cell, the communication module 212 (e.g., RRC layer) or other device may receive the RRCconnectionreconfiguration complete message from the UE 201 that may inform that the RRC connection reconfiguration has been completed and the SeNB resources or the small cell have been successfully switched, in block 2310. The communication module 212 or other device may then transmit the SeNB switch complete message or the small cell switch complete message (not illustrated in FIG. 23) to the source SeNB 2030 and the target SeNB 2040, in block 2311.

Other embodiments may implement other modifications and variations to on the method as depicted in FIG. 23. For example, in some embodiments, if the UE 201 sends the RRCconnectionreconfigurationcomplete message to the MeNB 202 as well as the target SeNB 2040, the SeNB switch complete message or the small cell switch complete message from the MeNB 202 to the target SeNB 2040 can be omitted. For another example, it may be the source SeNB 2030 rather than the MeNB 202 which makes the decision of switching the SeNB resources or the small cell. In such case, the SeNB release request or the small cell release request may be sent from the source SeNB 2030 to MeNB 202 as well as the target SeNB 2040, and the SeNB release ACK or the small cell release ACK may be sent from the MeNB 202 and the target SeNB 2040 to the source SeNB 2030. For yet another exmaple, the communication module 212 or other device may further transmit the path switch request to the MME 214 to request switching the downlink path of the EPS bearer from between the source SeNB 2030 and the core network system 204 to between the target SeNB 2040 and the core network system 204, wherein the DRB of the EPS bearer has already been switched from the source SeNB 2030 to the target SeNB 2040. The path switch request may include the list of the EPS bearer(s) whose DRB(s) have been switched. In some embodiments, the path switch request may further indicate to keep other bearer(s) unreleased, wherein the other bearer(s) may include those not listed in the request, such as the DRBs and/or the SRBs related to the MeNB 202.

Figure 24:
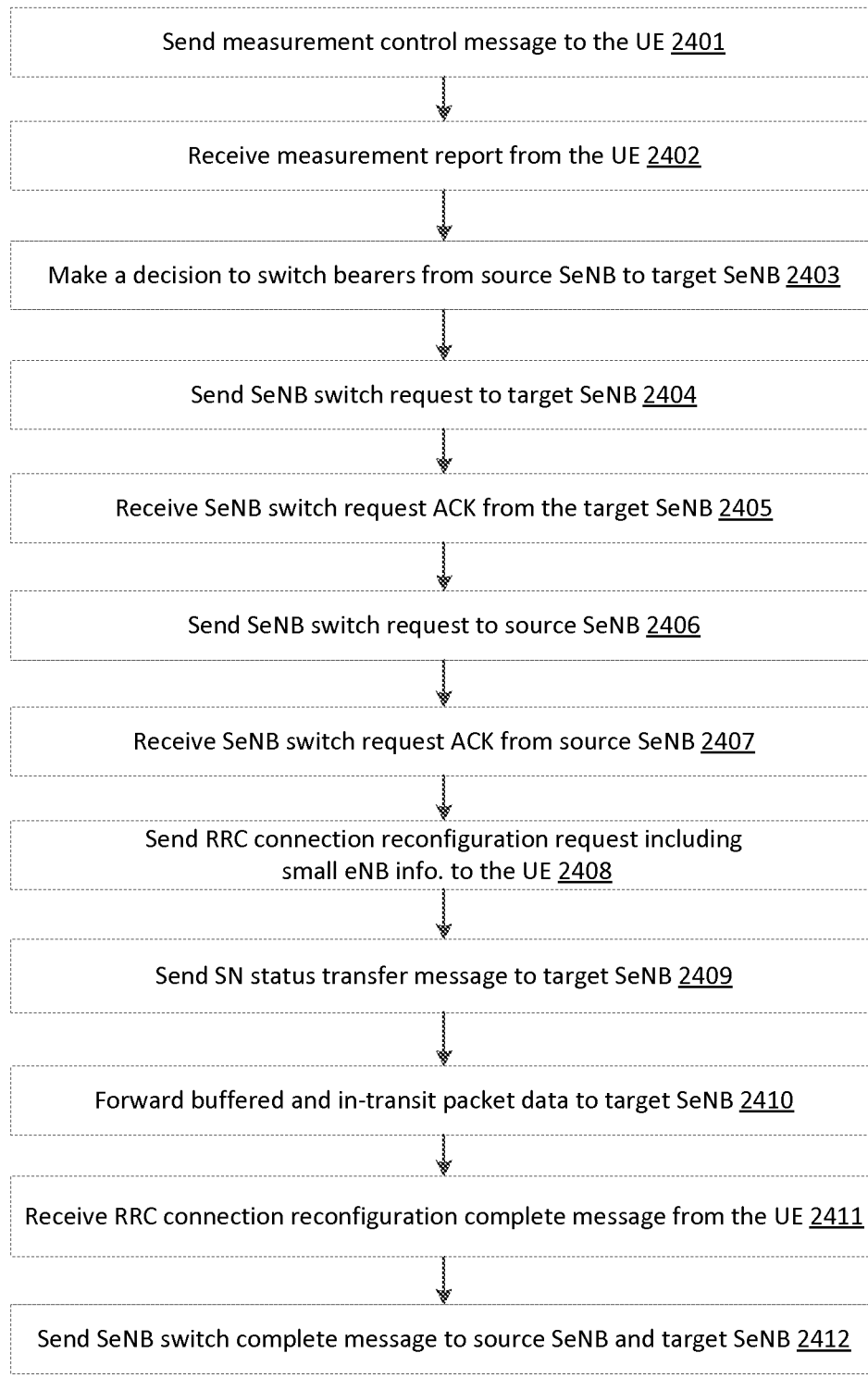
FIG. 24 illustrates an embodiment of the method for the MeNB of the wireless communication system to switch the bearer from the source SeNB to the target SeNB, based on the X2 approach.

FIG. 24 illustrates an embodiment of a method for the MeNB 202 of the wireless communication system 200 to switch the SeNB resources or the small cell by switching the bearer from the source SeNB 2030 to the target SeNB 2040, based on the X2 approach.

In some embodiments, the method of FIG. 24 may be similar as that of FIG. 23. For example, blocks 2401 to 2408 may be similar as blocks 2301 to 2308, and blocks 2411-2412 may be similar as blocks 2310-2311. However, due to the X2 approach, before switching the DRB of the EPS bearer from the source SeNB 2030 to the target SeNB 2040, the source SeNB 2030 may communicate the packet data with the core network system 204 through the MeNB 202.

Other embodiments may implement other modifications and variations to on the method as depicted in FIG. 24. For example, in some embodiments, if the UE 201 sends the RRCconnectionreconfigurationcomplete message to the MeNB 202 as well as the target SeNB 2040, the SeNB switch complete message or the small cell switch complete message (not illustrated in FIG. 24) from the MeNB 202 to the target SeNB 2040 can be omitted. For another example, it may be the source SeNB 2030 rather than the MeNB 202 which makes the decision of switching the SeNB resources or the small cell. In such case, the SeNB release request or the small cell release request (not illustrated in FIG. 24) may be sent from the source SeNB 2030 to the MeNB 202 as well as to the target SeNB 2040. Further, the SeNB release request ACK or the small cell release ACK (not illustrated in FIG. 24) may be sent from the MeNB 202 and the target SeNB 2040 to the source SeNB 2030.

Figure 25:
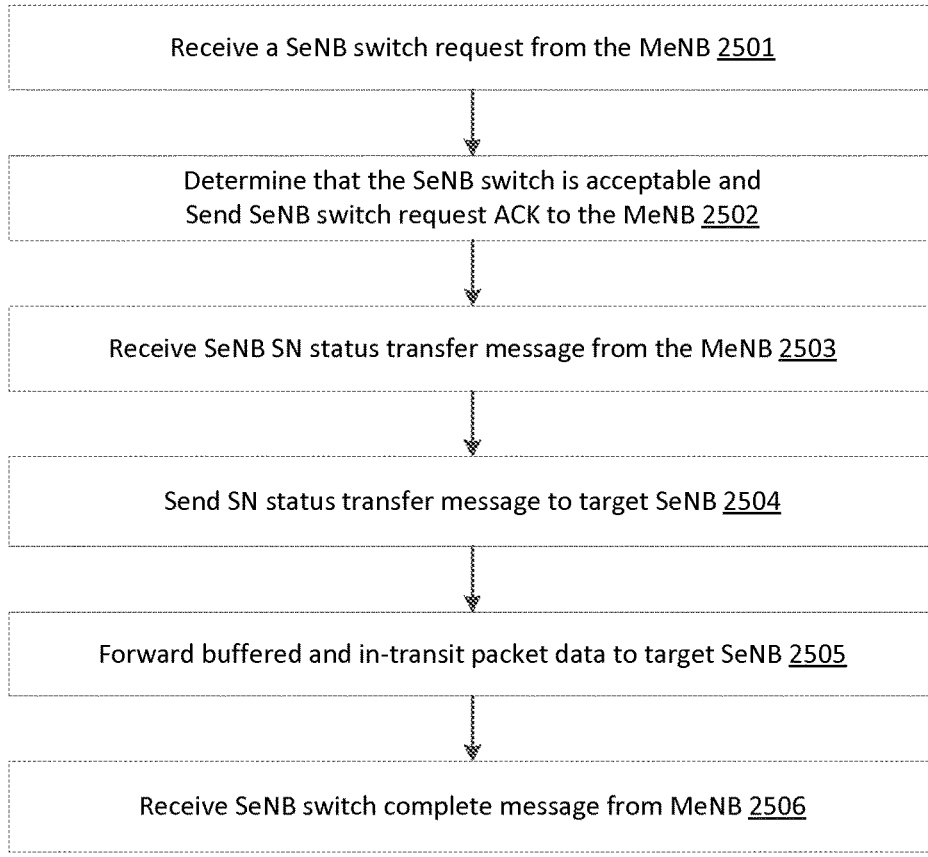
FIG. 25 illustrates an embodiment of a method for the source SeNB of the wireless communication system to switch the bearer from the source SeNB to the target SeNB, based on the S1 approach.

FIG. 25 illustrates an embodiment of a method for the source SeNB 2030 of the wireless communication system 200 to switch the SeNB resources or the small cell by switching the bearer from the source SeNB 2030 to the target SeNB, based on the S1 approach.

In some embodiments, based on the S1 approach, the UE 201 may communicate the packet data with the core network system 204 over the DRB of the EPS bearer through the source SeNB 2030 of the source small cell. Under the dual connectivity, the UE 201 may communicate another packet data with the MeNB 202 over another DRB of another EPS bearer or communicate the signalling with the MeNB 202 over the SRB.

In some embodiments, the MeNB 202 may make the decision of switching the SeNB resources or the small cell by switching the DRB from the source SeNB 2030 to the target SeNB 2040. This may happen under certain circumstances, such as when the UE 201 moving from the source small cell to the target small cell. In such case, the communication module 2031 or other device of the source SeNB 2030 may receive, from the MeNB 202, the request of switching the SeNB resources or the small cell, in block 2501. The request may be embodied as the SeNB switch request or the small cell switch request (not illustrated in FIG. 25), and may include, without limitation, information necessary for preparing the DRB switch, such as elements (IE) like TYPE field indicating whether the SeNB receiving the message may add the DRB (i.e., the target SeNB) or release the DRB (i.e., the source SeNB), cause for the SeNB switch or the small cell switch, a list of E-RABs to be setup or released, characteristics of E-RAB (such as E-RAB parameters, TNL address information, and/or others), a UE C-RNTI in the source small cell or the target small cell, UE security capabilities for S1 approach, security context for S1 approach, and/or others.

In block 2502, the communication module 2031 or other device may perform the admission control and determine that the request is acceptable. Moreover, in bock 2502, the communication module 2031 or other device may send the message to the MeNB 202, such as the SeNB switch request ACK or the small cell switch request ACK (not illustrated in FIG. 25). The SeNB switch request ACK or the small cell switch request ACK may include, without limitation, information such as the C-RNTI, the cause for the SeNB switch or the small cell switch, a list of admitted E-RABs including TNL address information for the respective E-RAB, a list of unadmitted E-RABs, a transparent container to be sent to the UE for the SeNB release or the small cell release, and/or others.

On the other hand, although not being illustrated in FIG. 25, it should be understood that the source SeNB 2030 may make a decision of not admitting the SeNB switch request or the small cell switch request, for example, when the measurement report indicates that the radio quality in the small cell is good enough In block 2503, the communication module 2031 or other device may receive, from the MeNB 202, the SeNB SN status transfer message or the small cell SN status transfer message (not illustrated in FIG. 25) which may trigger the delivery of buffered and in-transmit packet data from the source SeNB 2030 to the target SeNB 2040. In response to the SeNB SN status transfer message or the small cell SN status transfer message, the communication module 2031 or other device may send the SN status message to the target SeNB 2040. In some embodiments, the communication module 2031 or other device may convey uplink PDCP (packet data convergence protocol) SN receiver status and/or downlink PDCP SN transmitter status of E-RABs for which PDCP status preservation applies. Then, in block 2505, the communication module 2031 or other device may forward the buffered and in-transit packet data to the target SeNB 2040.

After the UE 201 detaches from the source small cell and synchronizes to the target small cell, the communication module 2031 or other device may receive, from the MeNB 202, the SeNB switch complete message or the small cell switch complete message (not illustrated in FIG. 25) in block 2506, which may inform that the SeNB switch or the small cell switch has been completed. In block 2507, the communication module 2031 or other device may receive, from the core network system 204 (e.g., S-GW 224), the End Marker indicating the end of downlink packet data transmission from the core network system 204 to the source SeNB 2030 on the old path. In block 2508, the communication module 2031 or other device may send, to the target SeNB 2040, the End Marker indicating the end of data forwarding from the source SeNB 2030 to the target SeNB 2040.

Other embodiments may implement other modifications and variations to on the method as depicted in FIG. 25. For example, it may be the source SeNB 2030 rather than the MeNB 202 which makes the decision of switching the small cell. In such case, the SeNB release request or the small cell release request may be sent from the source SeNB 2030 to MeNB 202 as well as to the target SeNB 2040, and the SeNB release ACK or the small cell release ACK may be sent from the MeNB 202 and the target SeNB 2040 to the source SeNB 2030.

Figure 26:
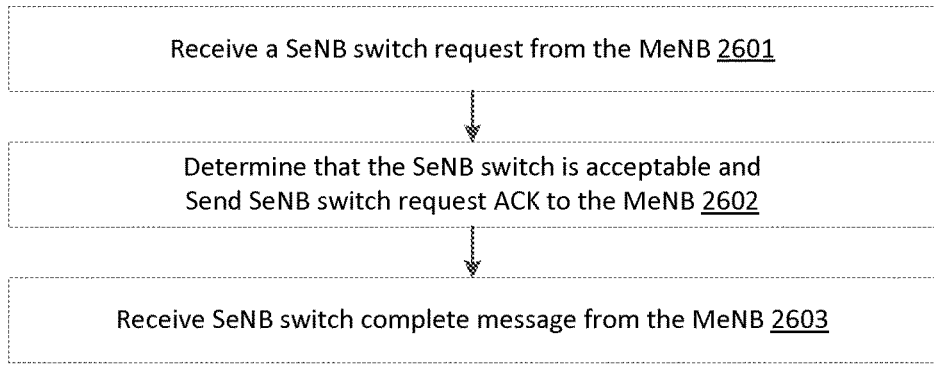
FIG. 26 illustrates an embodiment of a method for the source SeNB of the wireless communication system to switch the bearer from the source SeNB to the target SeNB, based on the X2 approach.

FIG. 26 illustrates an embodiment of a method for the source SeNB 2030 of the wireless communication system 200 to switch the bearer from the source SeNB 2030 to the target SeNB 2040, based on the X2 approach.

In some embodiments, due to the X2 approach, before switching the DRB of the EPS bearer from the source SeNB 2030 to the target SeNB 2040, the source SeNB 2030 may communicate the packet data between the UE 201 and the core network system 204 through the MeNB 202. In other words, the source SeNB 2030 may receive the packet data from the UE 201 and transmit it to the core network system 204 through the MeNB 202, and/or receive the packet data from the core network system through the MeNB 202 and transmit it to the UE 201. Further, under the dual connectivity, the UE 201 may communicate another packet data with the MeNB 202 over another DRB of another EPS bearer or communicate the signalling with the MeNB 202 over the SRB.

In some embodiments, the communication module 2031 or other device of the source SeNB 2030 may receive, from the MeNB 202, the request of switching the SeNB resources or the small cell in block 2601. The request may be embodied as the SeNB switch request or the small cell switch request (not illustrated in FIG. 26), and may include, without limitation, information necessary for preparing the DRB switch, such as elements (IE) like TYPE field indicating whether the SeNB receiving the message may add the DRB (i.e., the target SeNB) or release the DRB (i.e., the source SeNB), cause for the SeNB switch or the small cell switch, a list of E-RABs to be setup or released, characteristics of E-RAB (such as E-RAB parameters, TNL address information, and/or others), a UE C-RNTI in the source small cell or the target small cell, UE security capabilities for S1 approach, security context for S1 approach, and/or others.

In block 2602, the communication module 2031 or other device may perform the admission control and determine that the request is acceptable. Moreover, in bock 2602, the communication module 2031 may send the message to the MeNB 202, such as the SeNB switch request ACK or the small cell switch request ACK (not illustrated in FIG. 26). The SeNB switch request ACK or the small cell switch request ACK may include, without limitation, information such as the C-RNTI, the cause for the SeNB switch or the small cell switch, a list of admitted E-RABs including TNL address information for the respective E-RABs, a list of unadmitted E-RABs, a transparent container to be sent to the UE for the SeNB release or the small cell release, and/or others. On the other hand, although not being illustrated in FIG. 26, it should be understood that the source SeNB 2030 may make the decision of not admitting the SeNB switch request or the small cell switch request.

In some embodiments, after the UE 201 detaches from the source small cell and synchronizes to the target small cell, the communication module 2031 or other device may receive, from the MeNB 202, the SeNB switch complete message or the small cell switch complete message (not illustrated in FIG. 26) in block 2603, which may inform that the SeNB resources switch or the small cell switch has been completed.

Other embodiments may implement other modifications and variations to on the method as depicted in FIG. 26. For example, it may be the source SeNB 2030 rather than the MeNB 202 which makes the decision of switching the SeNB resources or the small cell. In such case, the SeNB release request or the small cell release request may be sent from the source SeNB 2030 to MeNB 202 as well as to the target SeNB 2040. Further, the SeNB release request ACK or the small cell release request ACK may be sent from the MeNB 202 and the target SeNB 2040 to the source SeNB 2030.

Figure 27:
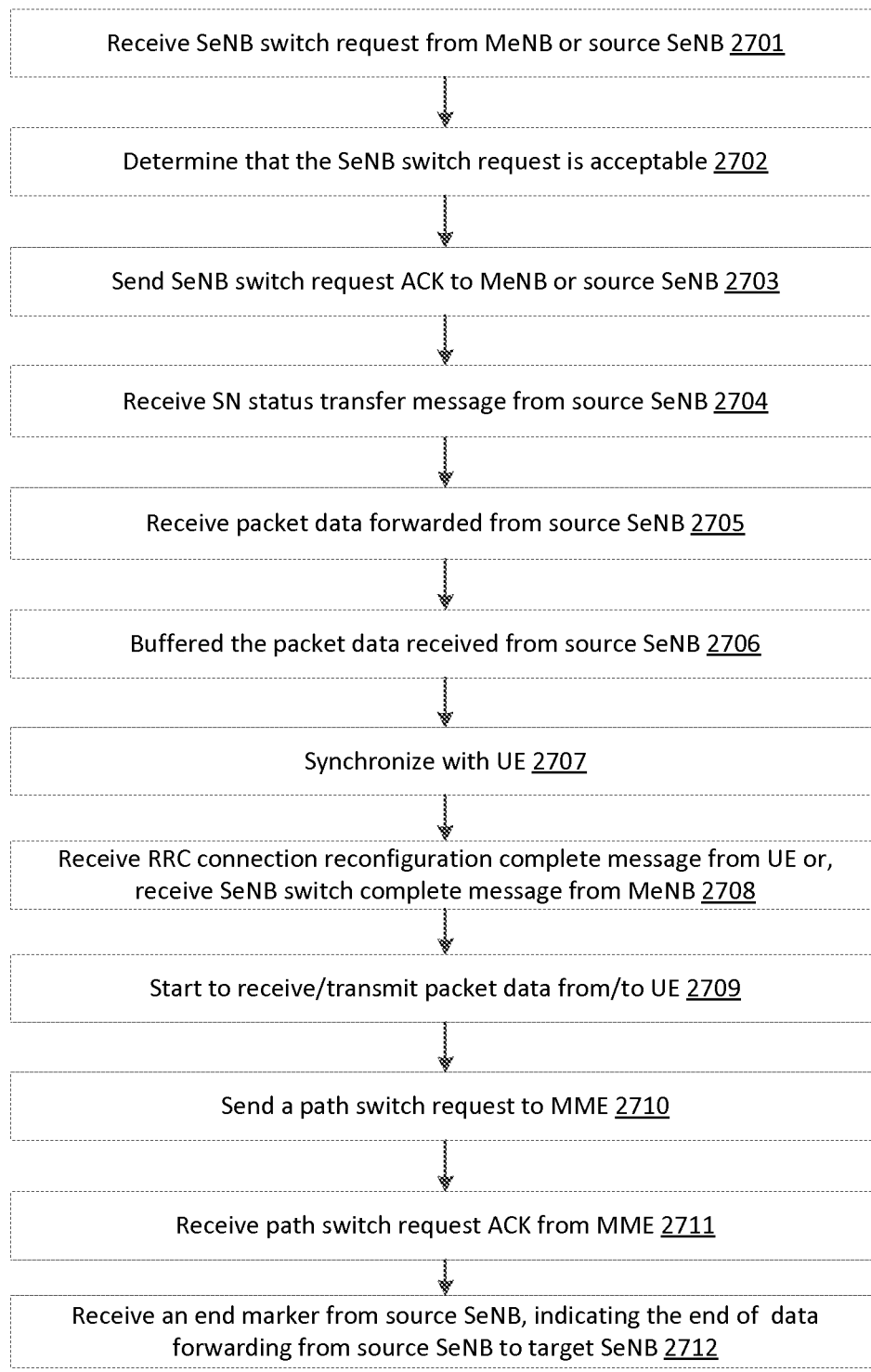
FIG. 27 illustrates an embodiment of a method for the target SeNB of the wireless communication system to switch the bearer from the source SeNB to the target SeNB, based on the S1 approach.

FIG. 27 illustrates an embodiment of a method for the target SeNB 2040 of the wireless communication system 200 to switch the bearer from the source SeNB 2030 to the target SeNB 2040, based on the S1 approach.

In some embodiments, based on the S1 approach, before switching the small cell, the UE 201 may communicate the packet data with the core network system 204 over the DRB of the EPS bearer through the source SeNB 2030 of the source small cell. Under the dual connectivity, the UE 201 may communicate another packet data with the MeNB 202 over another DRB of another EPS bearer or communicate the signalling with the MeNB 202 over the SRB.

In some embodiments, it may be decided to switch the SeNB resources or the small cell by switching the DRB from the source SeNB 2030 to the target SeNB 2040. This may happen under certain circumstances, such as when the UE 201 moving from the source small cell to the target small cell. In such case, the communication module 2041 or other device of the target SeNB 2040 may receive the request of switching the DRB from the MeNB 202 or the source SeNB 2030 in block 2701. The request may be embodied as the SeNB switch request or the small cell switch request (not illustrated in FIG. 27), and may include, without limitation, information necessary for preparing the DRB switch, such as elements (IE) like TYPE field indicating whether the SeNB receiving the message may add the DRB (i.e., the target SeNB) or release the DRB (i.e., the source SeNB), cause for the SeNB switch or the small cell switch, a list of E-RABs to be setup or released, characteristics of E-RAB (such as E-RAB parameters, TNL address information, and/or others), a UE C-RNTI in the source small cell or the target small cell, UE security capabilities for S1 approach, security context for S1 approach, and/or others.

In block 2702, the communication device 2041 or other device may perform the admission control and determine that the request is acceptable. In block 2703, the communication module 2041 or other device may send the message to the MeNB 202 or the source SeNB 2030, such as the SeNB switch request or the small cell switch request ACK (not illustrated in FIG. 27). The SeNB switch request ACK or the small cell switch request ACK may include, without limitation, information such as the C-RNTI, the cause for the SeNB switch or the small cell switch, a list of admitted E-RABs (such as E-RAB parameters, TNL address information, and/or others), a list of unadmitted E-RABs, a transparent container to be sent to the UE for the SeNB release or the small cell release, and/or others. On the other hand, although not being illustrated in FIG. 27, it should be understood that the target SeNB 2040 may make the decision of not admitting the SeNB switch request or the small cell switch request.

In some embodiments, in block 2704, the communication module 2041 or other device may receive the SeNB SN status transfer message or the small cell SN status transfer message (not illustrated in FIG. 27) from the source SeNB 2030. In some embodiments, the source SeNB 2030 may convey uplink PDCP (packet data convergence protocol) SN receiver status and/or downlink PDCP SN transmitter status of E-RABs for which PDCP status preservation applies. Then, in block 2705, the communication module 2041 or other device may receive the buffered and in-transit packet data from the source SeNB 2040, and in block 2706, the target SeNB 2040 may buffer the packet data, for example, in the memory or the data storage of the target SeNB 2040.

In some embodiments, in response to the RRCconnectionreconfiguration message, the UE 201 may reconfigure the RRC connection to detach from the source SeNB 2030 and synchronize with the target SeNB 2040 in order to switch the DRB from the source small cell to the target small cell, in block 2707. For example, the UE 201 may perform the synchronization to the target SeNB 2040 and access the target small cell via RACH, following a contention-free or contention-based procedure depending on whether a dedicated preamble was indicated or not.

After synchronizing with the UE 201 which may be able to access the target small cell, in block 2708, the communication module 2041 (e.g., RRC layer) or other device may receive the RRC connection reconfiguration complete message from the UE 201. Alternatively, the communication module 2041 (e.g., RRC layer) or other device may receive, from the MeNB 202, the SeNB switch complete message or the small cell switch complete message (not illustrated in FIG. 27), either of which may inform that the DRB has been successfully switched from the source small cell to the target small cell. When the UE 201 can access the target small cell, based on the S1 approach, the communication module 2041 or other device may receive/transmit packet data from/to the UE 201, in block 2709.

In some embodiments, in block 2710, the communication module 2041 or other device may further transmit the path switch request to the MME 214 to request switching the downlink path of the EPS bearer from between the source SeNB 2030 and the core network system 204 to between the target SeNB 2040 and the core network system 204, wherein the DRB of the EPS bearer has already been switched from the source SeNB 2030 to the target SeNB 2040. The path switch request may include a list of the EPS bearer(s) whose DRB(s) has been switched. In some embodiments, the path switch request may further indicate to keep other bearer(s) unreleased, wherein the other bearer(s) may include those not listed in the request, such as the DRBs and/or the SRBs related to the MeNB 202. Alternatively, the target SeNB 2040 or the MeNB 202 may send a separate request of keeping the other bearer(s) unreleased to the MME 214. In other embodiments, it may be the MeNB 202 rather than the target SeNB 2040 which may send the path switch request to the MME 214.

With modification of the downlink path of the EPS bearer to go through the target SeNB 2040, the target SeNB 2040 may be able to receive the packet data from the core network system 204, such as the S-GW 224. In this way, the communication path between the UE 201 and the core network system 204 through the target SeNB 2040 has been completed. Further, the communication module 2041 or other device may receive the acknowledgement message, such as the patch switch request ACK from the MME 214, in block 2711. In block 2712, the communication module 2041 or other device may receive the End Marker from the source SeNB 2030 indicating the end of data forwarding from the source SeNB 2030 to the target SeNB 2040.

Other embodiments may implement other modifications and variations to on the method as depicted in FIG. 27. For example, it may be the source SeNB 2030 rather than the MeNB 202 which makes the decision of switching the SeNB resources or the small cell. In such case, the SeNB release request or the small cell release request may be sent from the source SeNB 2030 to MeNB 202 as well as to the target SeNB 2040. Further, the SeNB release ACK or the small cell release ACK may be sent from the MeNB 202 and the target SeNB 2040 to the source SeNB 2030.

Figure 28:
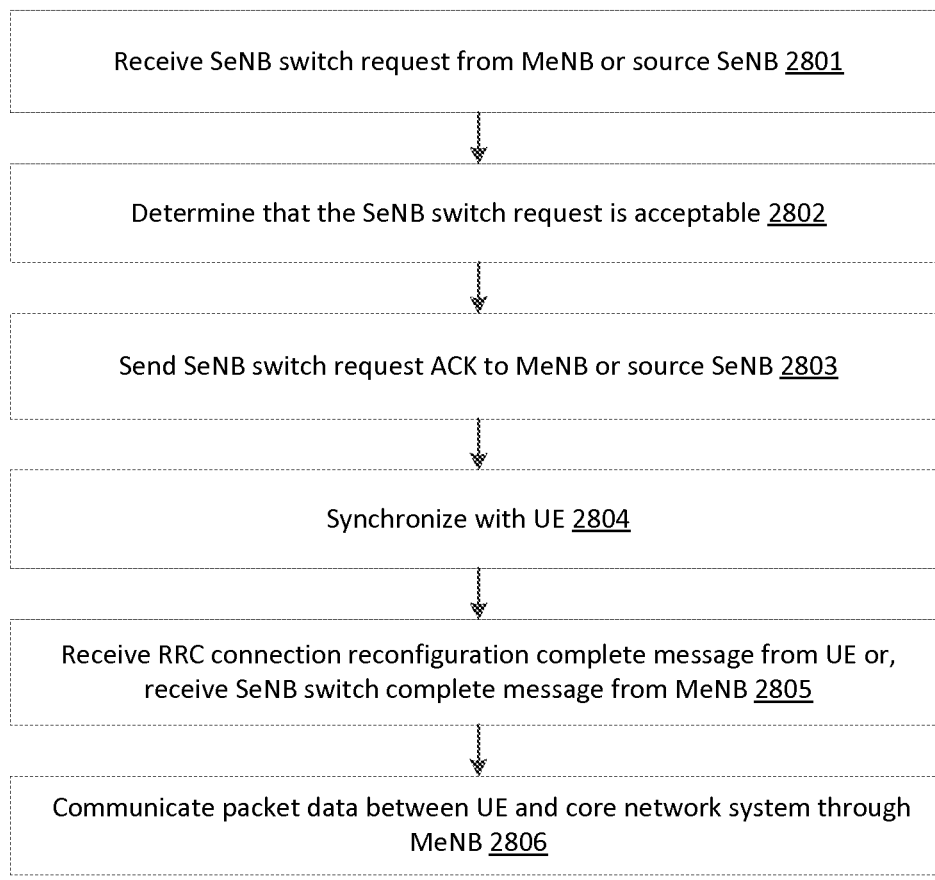
FIG. 28 illustrates an embodiment of a method for the target SeNB of the wireless communication system to switch the bearer from the source SeNB to the target SeNB, based on the X2 approach.

FIG. 28 illustrates an embodiment of a method for the target SeNB 2040 of the wireless communication system 200 to switch the SeNB resources or the small cell by switching the bearer from the source SeNB 2030 to the target SeNB 2040, based on the X2 approach.

In some embodiments, the method of FIG. 28 may be similar as that of FIG. 27. For example, blocks 2801 to 2803 and blocks 2804-2805 may be similar as blocks 2701 to 2703, and blocks 2707 to 2708. However, due to the X2 approach, before switching the DRB of the EPS bearer from the source SeNB 2030 to the target SeNB 2040, the source SeNB 2030 may communicate the packet data with the core network system 204 through the MeNB 202. Moreover, in some embodiments, after the completion of the RRC connection reconfiguration to switch the DRB from the source SeNB 2030 to the target SeNB 2040, the transmissions of the packet data between the target SeNB 2040 and the core network system 204 over the EPS bearer may still need to go through the MeNB 202. In this way, there may be no need to forward the buffer and in transit packet data from the source SeNB 2030 to the target SeNB 2040, or to request the core network system 204 to modify the downlink path of the EPS bearer from the SeNB 2030 to the target SeNB 2040. In other words, the blocks 2704-2706 and blocks 2710-2712 of FIG. 27 may be omitted from the FIG. 28.

Other embodiments may implement other modifications and variations to on the method as depicted in FIG. 28. For example, it may be the source SeNB 2030 rather than the MeNB 202 which makes the decision of switching the SeNB resources or the small cell. In such case, the SeNB release request or the small cell release request may be sent from the source SeNB 2030 to MeNB 202 as well as to the target SeNB 2040, and the SeNB release ACK or the small cell release ACK may be sent from the MeNB 202 and the target SeNB 2040 to the source SeNB 2030.

Figure 29:
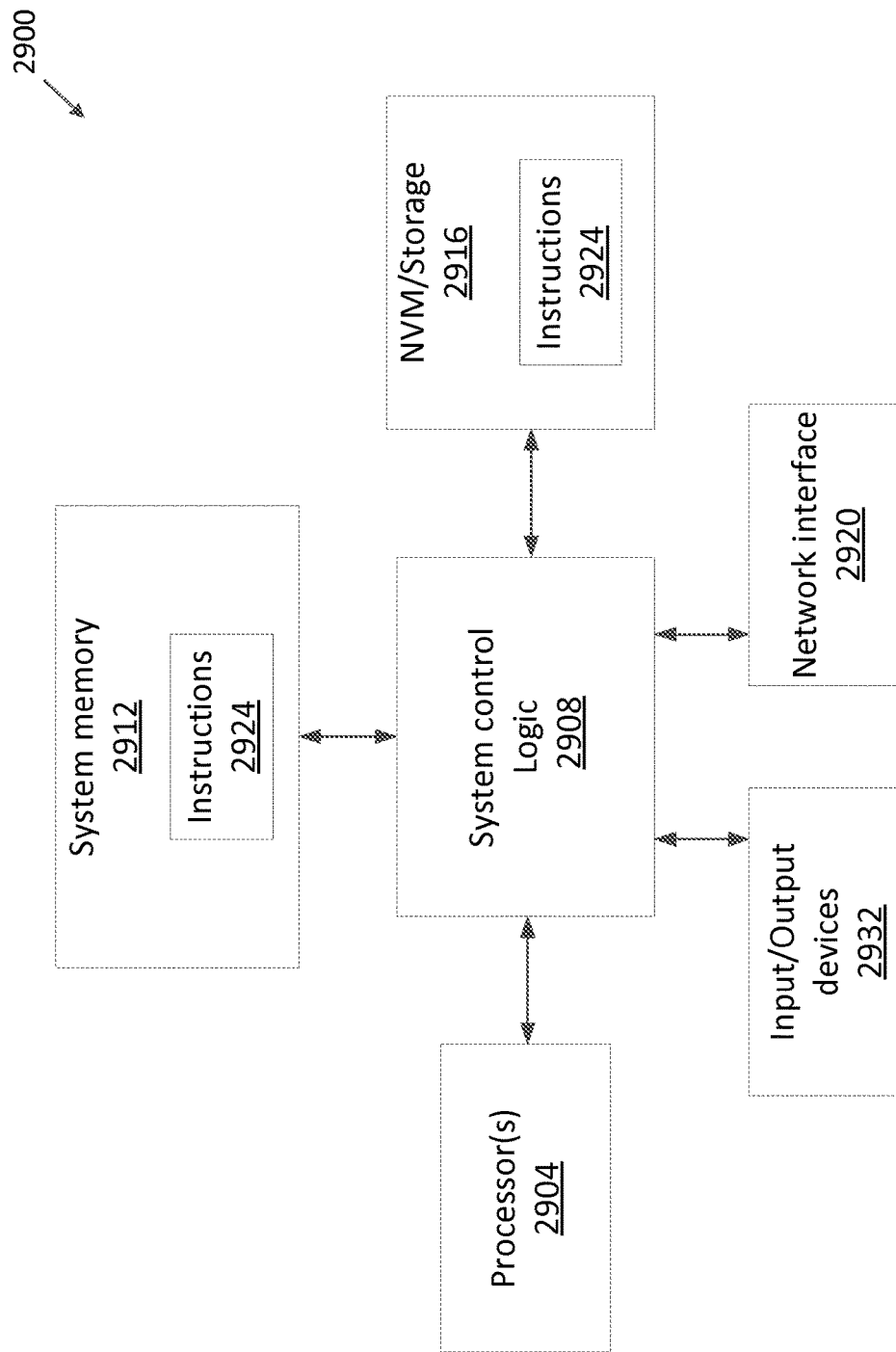
FIG. 29 illustrates an embodiment of an example system.

FIG. 29 schematically illustrates an example system 2900 in accordance with various embodiments. The system 2900 may comprise one or more processor(s) 2904, system control logic 2908 coupled with at least one of the processor(s) 2904, system memory 2912 coupled with system control logic 2908, non-volatile memory (NVM)/storage 2916 coupled with system control logic 2908, and a network interface 2920 coupled with system control logic 2908.

Processor(s) 2904 may include one or more single-core or multi-core processors. Processor(s) 2904 may include any combination of general-purpose processors and dedicated processors (e.g., graphics processors, application processors, baseband processors, etc.). In an embodiment in which the system 2900 implements the UE 201, processors(s) 2904 may be configured to execute one or more embodiment(s) as illustrated in FIG. 2-4, 6-8, 13-15, or 20-22 in accordance with various embodiments. In an embodiment in which the system 2900 implements the MeNB 202, processor(s) 2904 may be configured to execute one or more embodiment(s) as illustrated in FIG. 2-3, 5-7, 9-10, 13-14, 16-17, 20-21, or 23-24 in accordance with various embodiments. In an embodiment in which the system 2900 implements the SeNB 203, processor(s) 2904 may be configured to execute one or more embodiment(s) as illustrated in FIG. 2, 6-7, 11-14, or 18-19 in accordance with various embodiments. In an embodiment in which the system 2900 implements the source SeNB 2030, processor(s) 2904 may be configured to execute one or more embodiment(s) as illustrated in FIG. 2, 20-21 or 25-26 in accordance with various embodiments. In an embodiment in which the system 2900 implements the target SeNB 2040, processor(s) 2904 may be configured to execute one or more embodiment(s) as illustrated in FIG. 2, 20-21 or 27-28 in accordance with various embodiments.

System control logic 2908 for one embodiment may include any suitable interface controllers to provide for any suitable interface to at least one of the processor(s) 2904 and/or to any suitable device or component in communication with system control logic 2908.

System control logic 2908 for one embodiment may include one or more memory controller(s) to provide an interface to system memory 2912. System memory 2912 may be used to load and store data and/or instructions, for example, for system 2900. System memory 2912 for one embodiment may include any suitable volatile memory, such as suitable dynamic random access memory (DRAM), for example.

NVM/storage 2916 may include one or more tangible, non-transitory computer-readable media used to store data and/or instructions, for example. NVM/storage 2916 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 2916 may include a storage resource physically part of a device on which the system 2900 is installed or it may be accessible by, but not necessarily a part of, the device. For example, the NVM/storage 2916 may be accessed over a network via the network interface 2920.

System memory 2912 and NVM/storage 2916 may respectively include, in particular, temporal and persistent copies of instructions 2924. Instructions 2924 may include instructions that when executed by at least one of the processor(s) 2904 result in the system 2900 implementing one or more of method(s) as described with reference to FIGS. 4-5, 8-12, 15-19, and 22-28. In various embodiments, instructions 2924, or hardware, firmware, and/or software components thereof, may additionally/alternatively be located in the system control logic 2908, the network interface 2920, and/or the processor(s) 2904.

Network interface 2920 may have a transceiver (e.g., the communication module 211, 212 or 213 in FIG. 2, and the communication module 2031 or 2041 in FIGS. 20-21) to provide a radio interface for system 2900 to communicate over one or more network(s) and/or with any other suitable device. In various embodiments, the communication module 211, 212 or 213 may be integrated with other components of system 2900. For example, the communication module 211, 212, 213, 2031 or 2041 may include a processor of the processor(s) 2904, memory of the system memory 2912, NVM/Storage of NVM/Storage 2916, and/or a firmware device (not being illustrated) having instructions that when executed by at least one of the processor(s) 2904 result in the system 2900 implementing one or more of method(s) as described with reference to FIGS. 4-5, 8-12, 15-19, and 22-28.

Network interface 2920 may include any suitable hardware and/or firmware. Network interface 2920 may include a plurality of antennas to provide a multiple input, multiple output radio interface. Network interface 2920 for one embodiment may include, for example, a network adapter, a wireless network adapter, a telephone modem, and/or a wireless modem.

For one embodiment, at least one of the processor(s) 2904 may be packaged together with logic for one or more controller(s) of system control logic 2908. For one embodiment, at least one of the processor(s) 2904 may be packaged together with logic for one or more controllers of system control logic 2908 to form a System in Package (SiP). For one embodiment, at least one of the processor(s) 2904 may be integrated on the same die with logic for one or more controller(s) of system control logic 2908. For one embodiment, at least one of the processor(s) 2904 may be integrated on the same die with logic for one or more controller(s) of system control logic 2908 to form a System on Chip (SoC).

The system 2900 may further include input/output (I/O) devices 2932. The I/O devices 2932 may include user interfaces designed to enable user interaction with the system 2900, peripheral component interfaces designed to enable peripheral component interaction with the system 2900, and/or sensors designed to determine environmental conditions and/or location information related to the system 2900.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 2920 to communicate with components of a positioning network, e.g., a global positioning system (GPS) satellite.

In various embodiments, the system 2900 may be a mobile computing device such as, but not limited to, a laptop computing device, a tablet computing device, a netbook, a mobile phone, etc. In other embodiments, the system 2900 may be an eNB, such as, but not limited to, a master eNB, a secondary eNB, etc. In various embodiments, system 2900 may have more or less components, and/or different architectures.

The disclosure may include various example embodiments disclosed below.

In example embodiment 1, a method, apparatus or system to be employed by a user equipment (UE) may comprise a communication module to communicate with a core network on a first bearer through a first evolved Node B (eNB), receive, from the first eNB, a first message of reconfiguring a radio resource control (RRC) connection to establish a second bearer between the UE and the core network through a second eNB; synchronize, in response to the message, with the second eNB in order to establish the second bearer; and communicate with the core network on the second bearer, and continue communicating other with the core network on the first bearer.

In example embodiment 2, the first eNB according to the example embodiment 1 may be a master eNB (MeNB).

In example embodiment 3, the second eNB according to any of the example embodiments 1-2 may be a secondary eNB (SeNB).

In example embodiment 4, the communication module according to any of the example embodiments 1-3 may further transmit, to the first eNB, a second message informing that the RRC connection reconfiguration has been completed.

In example embodiment 5, the first message according to any of the example embodiments 1-4 may comprise bearer context information related to the second bearer and eNB information related to the second eNB information.

In example embodiment 6, the first message according to any of the example embodiments 1-5 may comprise a new cell-radio network temporary identifier (C-RNTI), security algorithm identifiers, dedicated RACH preamble for a second cell associated to the second eNB, and/or others.

In example embodiment 7, a method, apparatus or system to be employed by a first evolved Node B (eNB), may comprise a communication module to communicate with a user equipment (UE) and a core network on a first bearer through the first eNB; receive, from the UE or the core network, a first request of establishing a second bearer between the UE and the core network; transmit, to a second eNB, a second request of adding the second eNB for the second bearer; and receive, from the second eNB, a response to the second request to acknowledge that the second eNB can be added for the second bearer.

In example embodiment 8, the first eNB according to the example embodiment 7 may be a master eNB (MeNB).

In example embodiment 9, the second eNB according to any of the example embodiments 7-8 may be a secondary eNB (SeNB).

In example embodiment 10, the second request according to any of the example embodiments 7-9 may be a SeNB addition request comprising a cause for the SeNB addition, a list of bearers to be setup, UE security capabilities, security context, and/or others.

In example embodiment 11, the response according to any of the example embodiments 7-10 may be a SeNB addition acknowledgment message comprising a list of admitted bearers, a list of not admitted bearers, a transparent container to be sent to the UE for the SeNB addition, and/or others.

In example embodiment 12, the communication module according to any of the example embodiments 7-11 may further transmit, to or from the UE, a message of reconfiguring a radio resource control (RRC) connection to establish the second bearer, wherein the message includes bearer context information related to the second bearer and eNB information related to the second eNB.

In example embodiment 13, the message according to any of the example embodiments 7-12 may comprise a new cell-radio network temporary identifier (C-RNTI), security algorithm identifiers, dedicated random access channel (RACH) preamble for a second cell associated with the second eNB, and/or others.

In example embodiment 14, the communication module according to any of the example embodiments 7-13 may further receive, from the UE, another message informing that the RRC connection reconfiguration has been completed; and transmit, to the core network, another response to the first request to inform that the second bearer has been redirected to the second eNB.

In example embodiment 15, the first eNB according to any of the example embodiments 7-14 may continue communicating with the UE and the core network on the first bearer through the first cell, while the UE further communicates with the core network on the second bearer through the second eNB.

In example embodiment 16, a method, apparatus or system to be employed by a first evolved Node B (eNB), may comprise a communication module to receive, from a second eNB for a second cell, a request of adding the first eNB for a first bearer to be established between a user equipment (UE) and a core network; transmit, to the second eNB, a response to the first request to acknowledge that the first eNB can be added for the first bearer; synchronize with the UE in order to establish the first bearer; and communicate with the UE and the core network on the first bearer through the first eNB, wherein, the UE communicates with the core network on a second bearer through the second eNB.

In example embodiment 17, the first eNB according to the example embodiment 16 may be a secondary eNB (SeNB).

In example embodiment 18, the second eNB according to any of the example embodiments 16-17 may be a macro eNB (MeNB).

In example embodiment 19, the first request according to any of the example embodiments 16-18 may be a SeNB addition request comprising a cause for the SeNB addition, a list of bearers to be setup, UE security capabilities, security context, and/or others.

In example embodiment 20, the response according to any of the example embodiments 16-19 may be a SeNB addition acknowledgement message comprising a list of admitted bearers, a list of not admitted bearers, a transparent container to be sent to the UE for SeNB addition, and/or others.

In example embodiment 21, a method, apparatus or system to be employed by a user equipment (UE), may comprise a communication module to communicate with a core network on one or more data bearers through a first evolved Node B (eNB); receive, from the first eNB, a message of reconfiguring a radio resource control (RRC) connection to switch at least one of the one or more data bearers from the first eNB to a second eNB; synchronize with the second eNB, in response to the message; and communicate with the core network on the at least one of the data bearers through the second eNB, while communicating with the first eNB on a signaling bearer through the first eNB.

In example embodiment 22, the first eNB according to the example embodiment 21 may be a master eNB (MeNB).

In example embodiment 23, the second eNB according to any of the example embodiments 21-22 may be a secondary eNB (SeNB).

In example embodiment 24, the message according to any of the example embodiments 21-23 may be a RRCconnectionreconfiguration message comprising a new cell-radio network temporary identifier (C-RNTI), second eNB security algorithm identifiers and optionally dedicated random access channel (RACH) preamble, second eNB system information blocks, and/or others.

In example embodiment 25, the communication module according to any of the example embodiments 21-24 may further continue communicating with the core network on a remaining data bearer of the data bearers which hasn't been switched from the first eNB to the second eNB.

In example embodiment 26, the communication module according to any of the example embodiments 21-25 may further transmit, to the first eNB or the second eNB, another message informing that the RRC connection reconfiguration has been completed.

In example embodiment 27, a method, apparatus or system to be employed by a first evolved Node B (eNB), may comprise a communication module to communicate with a user equipment (UE) and a core network on one or more data bearers through the first eNB; transmit, to a second eNB, a first request of adding a second SeNB by switching at least one of the data bears from the first eNB to the second eNB; receive, from the second eNB, a first message to acknowledge that the second eNB can be added; transmit, to the UE, a second message of reconfiguring a radio resource control (RRC) connection to switch the at least one data bearer; and communicate with the UE on a signaling bearer through the first eNB, while the UE communicates with the core network on the at least one data bearer through the second eNB.

In example embodiment 28, the first eNB according to the example embodiment 27 may be a master eNB (MeNB).

In example embodiment 29, the second eNB according to any of the example embodiments 27-28 may be a secondary eNB (SeNB).

In example embodiment 30, the communication module according to any of the example embodiments 27-29 may further continue communicating with the UE and the core network on a remaining data bear of the data bears which hasn't been switched from the first eNB to the second eNB.

In example embodiment 31, the communication module according to any of the example embodiments 27-30 may further receive, from the UE, a third message informing that the RRC connection reconfiguration has been completed.

In example embodiment 32, the communication module according to any of the example embodiments 27-31 may further transmit, to the second eNB, a fourth message informing that the second SeNB has been added.

In example embodiment 33, the communication module according to any of the example embodiments 27-32 may further transmit, to the core network, a second request of switching a downlink path of an evolved packet system (EPS) bearer from between the first eNB and the core network to between the second eNB and the core network, wherein a data bearer of the EPS bearer has been switched from the first eNB to the second eNB.

In example embodiment 34, the communication module according to any of the example embodiments 27-33 may further transmit, to the core network, an indication to keep at least one EPB bearer not listed in the second request unreleased.

In example embodiment 35, the first request according to any of the example embodiments 27-34 may be a SeNB addition request comprising cause for a list of bearers to be setup, UE security capabilities, security context, and/or others.

In example embodiment 36, the first message according to any of the example embodiments 27-35 may be a SeNB addition acknowledgement message comprising a list of admitted bearers, a list of not admitted bearers, a transparent container to be sent to the UE for the SeNB addition, and/or others.

In example embodiment 37, the communication module according to any of the example embodiments 27-36 may further receive, from the UE, a measurement report about UE connection mobility; and determine, based on the measurement report, to add the second SeNB.

In example embodiment 38, a method, apparatus or system to be employed by a first evolved Node B (eNB), may comprise a communication module to receive, from a second eNB, a first request of adding the first eNB by switching at least one of one or more data bearers from the second eNB to the first eNB, wherein a user equipment (UE) communicated with a core network on the data bears through the second eNB; transmit, to the second eNB, a first message to acknowledge that the first eNB can be added; synchronize with the UE in order to establishing the at least one data bearer between the UE and the second eNB; communicate with the UE and the core network on the at least one data bearer through the first eNB, while the UE communicates with the second eNB on a signalling bearer through second eNB.

In example embodiment 39, the first eNB according to the example embodiment 38 may be a secondary eNB (MeNB).

In example embodiment 40, the second eNB according to any of the example embodiments 38-39 may be a master eNB (SeNB).

In example embodiment 41, the UE according to any of the example embodiments 38-40 may continue communicating with the core network on a remaining data bear of the data bearers which hasn't been switched from the second eNB to the first eNB.

In example embodiment 42, the communication module according to any of the example embodiments 38-41 may further transmit, to the core network, a second request of switching a downlink data path of the at least one data bearer from between the second eNB and the core network to between the first eNB and the core network; receive, from the core network, a second message to acknowledge that the downlink data path of the at least one data bearer has been switched.

In example embodiment 43, the communication module according to any of the example embodiments 38-42 may further transmit, to the core network, an indication of keeping a remaining data bearer of the data bearers, which hasn't been switched from the second eNB to the first eNB, unreleased.

In example embodiment 44, the first request according to any of the example embodiments 38-43 may be a SeNB addition request comprising cause for a list of bearers to be setup, UE security capabilities, security context, and/or others.

In example embodiment 45, the first message according to any of the example embodiments 38-44 may be a SeNB addition acknowledgement message comprising a list of admitted bearers, a list of not admitted bearers, a transparent container to be sent to the UE for the SeNB addition, and/or others.

In example embodiment 46, a method, apparatus, or system to be employed by a user equipment (UE), may comprise a communication module to communicate with a first evolved Node B (eNB) on a first bearer through the first eNB; communicate with a second eNB on a second bearer through a second eNB; receive, from the second eNB, a first message of reconfiguring a radio resource control (RRC) connection to switch the first bearer from the first eNB to the second eNB; detach from the first eNB, in response to the first message; communicate on the first bear through the second eNB, while continuing communicating on the second bearer through the second eNB.

In example embodiment 47, the first eNB according to the example embodiment 46 may be a secondary eNB (MeNB).

In example embodiment 48, the second eNB according to any of the example embodiments 46-47 may be a master eNB (SeNB).

In example embodiment 49, the first message according to any of the example embodiments 46-48 may be a RRCconnectionreconfiguration message comprising a SeNB release information to inform the UE that the second SeNB is going to be released.

In example embodiment 50, the communication module according to any of the example embodiments 46-49 may further transmit, to the second eNB, a second message informing that the RRC connection reconfiguration is completed.

In example embodiment 51, a method, apparatus or system to be employed by a first evolved node B (eNB), may comprise a communication module to communicate with a user equipment (UE) on a first bearer through the first eNB, while the UE communicates with a second eNB on a second bearer through the second eNB; transmit or receive, to or from a second eNB, a first request of releasing the second eNB; receive or transmit, from or to the second eNB, a first message to acknowledge that the second eNB can be released; and transmit, to the UE, a second message of reconfiguring a radio resource control (RRC) connection to switch the second bearer from the second eNB to the first eNB.

In example embodiment 52, the first eNB according to the example embodiment 51 may be a macro eNB (MeNB).

In example embodiment 53, the second eNB according to any of the example embodiments 51-52 may be a secondary eNB (SeNB).

In example embodiment 54, the first request according to any of the example embodiments 51-53 may be a SeNB release request including at least one of a cause for the SeNB release, a list of bearers to be switched, a UE cell-radio network temporary identifier (C-RNTI) in a second cell associated with the second eNB, UE security capabilities, security context, and/or others.

In example embodiment 55, the first message according to any of the example embodiments 51-54 may be a SeNB release acknowledgment message including at least one of a UE cell-radio network temporary identifier (C-RNTI), a cause for the SeNB release, a list of admitted bearers, a list of not admitted bearers, a transparent container to be sent to the UE for the cell release, and/or others.

In example embodiment 56, the first bearer according to any of the example embodiments 51-55 may be a signalling bearer and/or a data bearer, and the second bearer is a data bearer.

In example embodiment 57, the communication module according to any of the example embodiments 51-56 may further receive, from the UE, a third message informing that the RRC connection reconfiguration is completed; and transmit, to the second eNB, a fourth message informing that the second bearer has been released.

In example embodiment 58, the communication module according to any of the example embodiments 51-57 may further transmit, to a core network, a second request of switching a downlink path of the second bearer from between the second eNB and the core network to between the first eNB and the core network, wherein the second request further indicates not to release a bearer associated with the UE and not listed in the second request.

In example embodiment 59, the communication module according to any of the example embodiments 51-58 may further receive, from the core network, a fifth message to acknowledge that the downlink data path of the second bearer is switched.

In example embodiment 60, a method, apparatus or system to be employed by a first evolved Node B (eNB), may comprise a communication module to communicate with a user equipment (UE) on a first bearer through the first eNB, wherein the UE further communicates on a second bearer through a second eNB; receive or transmit, from or to a second eNB, a first request of releasing the first SeNB by switching the first bearer from the first eNB to the second eNB; transmit or receive, to or from the second eNB, a first message to acknowledge that the first SeNB can be released in response to a determination that the first request is acceptable; and detach from the UE in order to release the first bearer.

In example embodiment 61, the first eNB according to the example embodiment 60 may be a secondary eNB (MeNB).

In example embodiment 62, the second eNB according to any of the example embodiments 60-61 may be a master eNB (SeNB).

In example embodiment 63, the first request according to any of the example embodiments 60-62 may be a SeNB release request including at least one of a cause for the SeNB release or the small cell release, a list of bearers to be switched, a UE cell-radio network temporary identifier (C-RNTI) in a second cell associated with the second eNB, UE security capabilities, security context, and/or others.

In example embodiment 63, the first message according to any of the example embodiments 60-62 may be a SeNB release acknowledgment message including at least one of a UE cell-radio network temporary identifier (C-RNTI), a cause for the SeNB release, a list of admitted bearers, a list of not admitted bearers, a transparent container to be sent to the UE for the SeNB release, and/or others.

In example embodiment 64, the communication module according to any of the example embodiments 60-63 may further transmit, to a core network, a second request of switching a downlink path of the first bearer from between the first eNB and the core network to between the second eNB and the core network, wherein the second request further indicates not to release a bearer associated with the UE and not listed in the second request.

In example embodiment 65, the communication module according to any of the example embodiments 60-64 may further receive, from the core network, a second message to acknowledge that the downlink data path of the first bearer is switched.

In example embodiment 66, a method, apparatus, or system to be employed by a user equipment (UE), may comprise a communication module to communicate with a first evolved Node B (eNB) on a first bearer through a first eNB; communicate with a second eNB on a second bearer through a second eNB; receive, from the first eNB, a first message of reconfiguring a radio resource control (RRC) connection to switch the second bearer from the second eNB to a third eNB; detach from the second eNB and synchronizing with the third eNB, in response to the first message; communicate with the third eNB on the second bearer through the third eNB, while continuing communicating with the first eNB on the first bearer through the first eNB.

In example embodiment 67, the first eNB according to the example embodiments 66 may be a master eNB (MeNB).

In example embodiment 68, the second eNB according to any of the example embodiments 66-67 may be a source secondary eNB (SeNB).

In example embodiment 69, the third eNB according to any of the example embodiments 66-68 may be a target secondary eNB (SeNB).

In example embodiment 70, the first message according to any of the example embodiments 66-69 may be a RRCconnectionreconfiguration message comprising at least one of second eNB information, third eNB information and others.

In example embodiment 71, the communication module according to any of the example embodiments 66-70 may further transmit, to the first eNB or the third eNB, a second message informing that the RRC connection reconfiguration is completed.

In example embodiment 72, the first bearer according to any of the example embodiments 66-71 may be a data bearer and/or a signalling bearer, and the second bearer is another data bearer.

In example embodiment 73, a method, apparatus or system to be employed by a first evolved Node B (eNB), may comprise a communication module to communicate with a user equipment (UE) on a first bearer through the first eNB, wherein the UE further communicates with a second eNB on a second bearer through the second eNB; transmit or receive, to or from a second eNB, a first request of switching the second eNB by switching the second bearer from the second eNB to a third eNB; and receive or transmit, from or to the second eNB, a first message to acknowledge that the second eNB can be switched.

In example embodiment 74, the first eNB according to the example embodiment 73 may be a master eNB (MeNB).

In example embodiment 75, the second eNB according to any of the example embodiments 73-74 may be a source secondary eNB (SeNB).

In example embodiment 76, the third eNB according to any of the example embodiments 73-75 may be a target secondary eNB (SeNB).

In example embodiment 77, the first request according to any of the example embodiments 73-76 may be a SeNB switch request including at least one of a TYPE field indicating whether an eNB receiving the first request adds the second bearer or release the second bearer, a cause for the SeNB switch, a list of bearers to be setup or released, a UE cell-radio network temporary identifier (C-RNTI) in a second cell associated with the second eNB or a third cell associated with the third eNB, UE security capabilities, security context, and/or others.

In example embodiment 78, the first message according to any of the example embodiments 73-77 may be a SeNB switch request acknowledgement message comprising at least one of cell-radio network temporary identifier (C-RNTI), a cause for the SeNB switch, a list of admitted bearers, a list of not admitted bearers, a transparent container to be sent to the UE for the SeNB switch, and/or others.

In example embodiment 79, the communication module according to any of the example embodiments 73-78 may further transmit, to the third eNB, a second request of switching the second eNB by switching the second bearer from the second cell to the third cell; and receive, from the third eNB, a second message to acknowledge that the second eNB can be switched.

In example embodiment 80, the second request according to any of the example embodiments 73-79 may be a SeNB switch request comprising at least one of a TYPE field indicating whether an eNB receiving the message adds the second bearer or release the second bearer, a cause for the small cell switch, a list of bearers to be setup or released, a UE cell-radio network temporary identifier (C-RNTI) in a second cell associated with the second eNB or a third cell associated with the third eNB, UE security capabilities, security context, and/or others.

In example embodiment 81, the second message according to any of the example embodiments 73-80 may be a SeNB switch acknowledgement message comprising at least one of a cell-radio network temporary identifier (C-RNTI), a cause for the SeNB switch, a list of admitted bearers, a list of unadmitted bearers, a transparent container to be sent to the UE for SeNB switch, and/or others.

In example embodiment 82, the communication module according to any of the example embodiments 73-81 may further transmit, to the UE, a third message of reconfiguring a radio resource control (RRC) connection by switching the second bearer from the second eNB to the third eNB.

In example embodiment 83, the third message according to any of the example embodiments 73-82 may be a RRC-connectionreconfiguration message comprising at least one of second Enb information, third eNB information and/or others.

In example embodiment 84, the communication module according to any of the example embodiments 73-83 may further receive, from the UE, a fourth message informing that the RRC connection reconfiguration is completed; and transmit, to the second eNB and/or the third eNB, a fifth message informing that the second eNB switch is completed.

In example embodiment 85, the communication module according to any of the example embodiments 73-84 may further transmit, to the second eNB, a third request of transferring a sequence number (SN) status from the second eNB to the third eNB.

In example embodiment 86, the communication module according to any of the example embodiments 73-85 may further transmit, to a core network, a fourth request of switching a downlink path of the second bearer from between the second eNB and the core network to between the third eNB and the core network.

In example embodiment 87, the fourth request according to any of the example embodiments 73-86 may further indicate not to release a bearer associated with the UE and not listed in the second request.

In example embodiment 88, the communication module according to any of the example embodiments 73-87 may further continue communicating with the UE on the first bearer through the first eNB, while the UE further communicates with the third eNB on the second bearer through the second eNB.

In example embodiment 89, a method, apparatus or system to be employed by a first evolved Node B (eNB), may comprise a communication module to communicate with a user equipment on a first bearer through the first eNB, wherein the UE further communicates with a second eNB on a second bearer through the second eNB; receive or transmit, from or to the second eNB, a first request of switching the first eNB by switching the first bearer from the first eNB to a third eNB; and transmit or receive, to or from the second eNB, a first message to acknowledge that the first eNB can be switched.

In example embodiment 90, the first eNB according to the example embodiments 89 may be a source secondary eNB (SeNB).

In example embodiment 91, the second eNB according to any of the example embodiments 89-90 may be a master eNB (MeNB).

In example embodiment 92, the third eNB according to any of the example embodiments 89-91 may be a target secondary eNB (SeNB).

In example embodiment 93, the first request according to any of the example embodiments 89-92 may be a SeNB switch request comprising at least one of a TYPE field indicating whether an eNB receiving the message adds the first bearer or release the first bearer, a cause for the SeNB switch, a list of bearers to be setup or released, a UE cell-radio network temporary identifier (C-RNTI) in a first cell associated with the first eNB or a third cell associate with the third eNB, UE security capabilities, security context, and/or others.

In example embodiment 94, the first message according to any of the example embodiments 89-93 may be a SeNB switch request acknowledgement message comprising at least one of cell-radio network temporary identifier (C-RNTI), a cause for the SeNB switch, a list of admitted bearers, a list of not admitted bearers, a transparent container to be sent to the UE for the SeNB switch, and/or others.

In example embodiment 95, the communication module according to any of the example embodiments 89-94 may further receive, from the second eNB, a second message of transferring a sequence number (SN) status from the first eNB to the third eNB; and forward, in response to the second message, a buffered and in transit data to the third eNB.

In example embodiment 96, the communication module according to any of the example embodiments 89-95 may further transmit, to a core network, a third request of switching a downlink path of the first bearer from between the first eNB and the core network to between the third eNB and the core network.

In example embodiment 97, the third request according to any of the example embodiments 89-96 may further indicate not to release a bearer associated with the UE and not listed in the third request.

In example embodiment 98, a method, apparatus or system to be employed by a first evolved Node B (eNB), may comprise a communication module to communicate with a user equipment on a first bearer through the first eNB, wherein the UE further communicates with a second eNB on a second bearer through the second eNB; transmit, to a third eNB, a first request of switching the first eNB by switching the first bearer from the first eNB to the third eNB; and receive, from the third eNB, a first message to acknowledge that the first eNB can be switched.

In example embodiment 99, the first eNB according to the example embodiments 98 may be a source secondary eNB (SeNB).

In example embodiment 100, the second eNB according to any of the example embodiments 98-99 may be a master eNB (MeNB).

In example embodiment 101, the third eNB according to any of the example embodiments 98-100 may be a target secondary eNB (SeNB).

In example embodiment 102, the first request according to any of the example embodiments 98-101 may be a SeNB switch request comprising at least one of a TYPE field indicating whether an eNB receiving the message adds the first bearer or release the first bearer, a cause for the SeNB switch, a list of bearers to be setup or released, a UE cell-radio network temporary identifier (C-RNTI) in a first cell associated with the first eNB or a third cell associated with the third eNB, UE security capabilities, security context, and/or others.

In example embodiment 103, the first message according to any of the example embodiments 98-102 may be a SeNB switch request acknowledgement message comprising at least one of cell-radio network temporary identifier (C-RNTI), a cause for the SeNB switch, a list of admitted bearers, a list of not admitted bearers, a transparent container to be sent to the UE for the SeNB switch, and/or others.

In example embodiment 104, the communication module according to any of the example embodiments 98-103 may further transmit, to the second eNB, a second request of switching the first eNB by switching the first bearer from the first eNB to the third eNB; and receive, from the second eNB, a second message to acknowledge that the first eNB can be switched.

In example embodiment 105, the second request according to any of the example embodiments 98-104 may be a SeNB switch request comprising at least one of a TYPE field indicating whether an eNB receiving the message adds the first bearer or release the first bearer, a cause for the SeNB switch, a list of bearers to be setup or released, a UE cell-radio network temporary identifier (C-RNTI) in the second cell or the third cell, UE security capabilities, security context, and/or others.

In example embodiment 106, the second message according to any of the example embodiments 98-105 may be a small cell switch request acknowledgement message comprising at least one of cell-radio network temporary identifier (C-RNTI), a cause for the cell switch, a list of admitted bearers, a list of not admitted bearers, a transparent container to be sent to the UE for the small cell switch, and/or others.

In example embodiment 107, the communication module according to any of the example embodiments 98-106 may further receive, from the second eNB, a third message of transferring a sequence number (SN) status from the first eNB to the third eNB; and forward, in response to the third message, a buffered and in transit data to the third eNB.

In example embodiment 108, the communication module according to any of the example embodiments 98-101 may further transmit, to a core network, a third request of switching a downlink path of the first bearer from between the first eNB and the core network to between the third eNB and the core network.

In example embodiment 109, the third request according to any of the example embodiments 98-108 may further indicate not to release a bearer associated with the UE and not listed in the third request.

In example embodiment 110, a method, apparatus or system to be employed by a first eNB, may comprise a communication module to receive, from a second eNB or a third eNB, a first request of switching a third eNB by switching a first bearer from the third eNB to the first eNB, wherein a user equipment (UE) communicates with the third eNB on the first bearer through the third eNB and communicates with the second eNB on a second bearer through the second eNB; transmit, to the second eNB or the third eNB, a first message to acknowledge that the third eNB can be switched; synchronize with the user equipment (UE) to establish the first bearer through the first eNB; and communicate with the UE on the first bearer through the first eNB.

In example embodiment 111, the first eNB according to the example embodiment 110 may be a target secondary eNB (SeNB).

In example embodiment 112, the second eNB according to any of the example embodiments 110-111 may be a master eNB (MeNB).

In example embodiment 113, the third eNB according to any of the example embodiments 110-112 may be a source secondary eNB (SeNB).

In example embodiment 114, the first request according to any of the example embodiments 110-113 may be a SeNB switch request comprising at least one of a TYPE field indicating whether an eNB receiving the message adds the first bearer or release the first bearer, a cause for the SeNB switch, a list of bearers to be setup or released, a UE cell-radio network temporary identifier (C-RNTI) in a first cell associated with the first eNB or a third cell associated with the third eNB, UE security capabilities, security context, and/or others.

In example embodiment 115, the first message according to any of the example embodiments 110-114 may be a SeNB switch request acknowledgement message comprising at least one of cell-radio network temporary identifier (C-RNTI), a cause for the SeNB switch, a list of admitted bearers, a list of not admitted bearers, a transparent container to be sent to the UE for the SeNB switch, and/or others.

In example embodiment 116, the communication module according to any of the example embodiments 110-115 may further transmit, to a core network, a second request of switching a downlink path of the first bearer from between the third eNB and the core network to between the first eNB and the core network.

In example embodiment 117, the third request according to any of the example embodiments 110-116 may further indicate not to release a bearer associated with the UE and not listed in the second request.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus, to be employed by a user equipment (UE), comprising:
   memory having instructions;
   processing circuitry coupled with the memory to execute the instructions to cause the UE to:
      communicate with a core network on one or more evolved packet system (EPS) bearers through a master evolved Node B (MeNB);
      receive, from the MeNB, a radio resource control (RRC) connection reconfiguration message to switch at least one of the one or more EPS bearers from the MeNB to a secondary eNB (SeNB);
      synchronize with the SeNB, in response to the RRC connection reconfiguration message; and
      communicate with the core network on the at least one of the EPS bearers through the SeNB; and
      keep communication with the MeNB on a signaling radio through the MeNB.

2. The apparatus of claim 1, wherein the processing circuitry is further to execute the instructions to cause the UE to communicate with the core network on a default EPS bearer of the EPS bearers via the MeNB.

3. An apparatus, to be employed by a master evolved Node B (MeNB), comprising:
   memory having instructions; and
   processing circuitry coupled to the memory to execute the instructions to cause the MeNB to:
      communicate with a user equipment (UE) and a core network on one or more evolved packet system (EPS) bearers through the MeNB;
      transmit, to a secondary eNB (SeNB), an addition request of switching at least one of the EPS bearers from the MeNB to the SeNB;
      receive, from the SeNB, an acknowledgment message to acknowledge that the at least one of the EPS bearers can be switched from the MeNB to the SeNB;
      transmit, to the UE, a radio resource control (RRC) connection reconfiguration message to switch the at least one of the EPS bearers;
      communicate with the UE on a signaling radio bearer through the MeNB, while the UE further communicates with the core network on the at least one of the EPS bearers through the SeNB; and
      continue to communicate with the UE and the core network on a default EPS bearer of the EPS bearers.

4. The apparatus of claim 3, wherein the addition request comprises characteristics of the at least one of the EPS bearers, UE security capabilities, or security context.

5. The apparatus of claim 3, wherein the processing circuitry is further to execute the instructions to cause the MeNB to transmit, to a mobility management entity (MME), a path switch request of switching a downlink path of an EPS bearer from between the MeNB and the core network to between the SeNB and the core network.

6. The apparatus of claim 3, wherein the processing circuitry is further to execute the instructions to cause the MeNB to deliver in-transit packet data buffered at the MeNB to the SeNB.

7. The apparatus of claim 3, wherein the processing circuitry is further to execute the instructions to cause the MeNB to convey an uplink packet data convergence protocol (PDCP) serial number receiver status or a downlink PDCP serial number receiver status to the SeNB to preserve the uplink PDCP serial number receiver status or the downlink PDCP serial number receiver status.

8. The apparatus of claim 3, wherein the addition request comprises an information element to convey a list of evolved universal terrestrial radio access network radio access bearers (E-RABs) to be set up by the SeNB, and wherein the acknowledgment message comprises a list of admitted E-RABs including transport network layer address information for the respective admitted E-RAB.

9. The apparatus of claim 3, wherein the acknowledgment message comprises a transparent container to be sent to the UE, wherein said transparent container includes a cell-radio network temporary identifier (C-RNTI) for identifying the UE by the SeNB.

10. One or more non-transitory, computer-readable media having instructions that, when executed, cause a secondary evolved Node B (SeNB) to:
   process an addition request, received from a master eNB (MeNB), the addition request to request switching of at least one of one or more evolved packet system (EPS) bearers from the MeNB to the SeNB, wherein a user equipment (UE) communicates with a core network on the EPS bearers through the MeNB;
   transmit, to the MeNB, a message to acknowledge that the at least one of the EPS bearer can be switched;
   synchronize with the UE in order to establish the at least one of the EPS bearer through the SeNB;
   communicate with the UE and the core network on the at least one of the EPS bearer through the SeNB, while the UE further communicates with the MeNB on a signaling bearer through MeNB.

11. The apparatus of claim 10, wherein the addition request comprises characteristics of the at least one of the EPS bearers, UE security capabilities, or security context.

12. The one or more non-transitory, computer-readable media of claim 10, wherein the instructions, when executed, further cause the SeNB to buffer in-transit packet data received from the MeNB.

13. The one or more non-transitory, computer-readable media of claim 10, wherein the instructions, when executed, further cause the SeNB to process an uplink packet data convergence protocol (PDCP) serial number receiver status or a downlink PDCP serial number receiver status from the MeNB to preserve the uplink PDCP serial number receiver status or the downlink PDCP serial number receiver status.

14. The one or more non-transitory, computer-readable media of claim 10, wherein the instructions, when executed, further cause the SeNB to transmit, to a mobility management entity (MME), a path switch request of switching a downlink path of the EPS bearer from between the MeNB and the core network to between the SeNB and the core network.

* * * * *